US012424281B2

(12) United States Patent
Vegesna et al.

(10) Patent No.: US 12,424,281 B2
(45) Date of Patent: Sep. 23, 2025

(54) DEVICES AND METHODS FOR OPERATING A MEMRISTIVE ELEMENT

(71) Applicant: TechIFab GmbH, Radeberg (DE)

(72) Inventors: Sahitya Varma Vegesna, Jena (DE); Heidemarie Schmidt, Dresden (DE)

(73) Assignee: TECHIFAB GMBH, Dresden (DE)

( * ) Notice: Subject to any disclaimer, the term of this patent is extended or adjusted under 35 U.S.C. 154(b) by 180 days.

(21) Appl. No.: 18/374,693

(22) Filed: Sep. 29, 2023

(65) Prior Publication Data

US 2024/0120005 A1 Apr. 11, 2024

(30) Foreign Application Priority Data

Sep. 30, 2022 (DE) ..................... 10 2022 125 361.9

(51) Int. Cl.
*G11C 11/00* (2006.01)
*G11C 13/00* (2006.01)
(Continued)

(52) U.S. Cl.
CPC ........ *G11C 13/0069* (2013.01); *G11C 13/004* (2013.01); *H03K 19/0021* (2013.01); *H04L 9/0869* (2013.01)

(58) Field of Classification Search
CPC .............. G11C 13/0069; G11C 13/004; G11C 11/1675; G11C 13/0007;
(Continued)

(56) References Cited

U.S. PATENT DOCUMENTS 9,336,870 B1 5/2016 Mickel et al.
2011/0119036 A1 5/2011 Pino et al.
(Continued)

FOREIGN PATENT DOCUMENTS

DE 112011102156 A1 5/2013
DE 102020206790 A1 12/2021
WO 2012029007 A1 3/2012

OTHER PUBLICATIONS

German Search Report issued for the corresponding German patent application No. 10 2022 125 361.9, dated Jul. 20, 2023, 12 pages (for informational purposes only).
(Continued)

*Primary Examiner* — Hien N Nguyen
(74) *Attorney, Agent, or Firm* — Synergy IP Group AG Natalie A. Albrecht

(57) ABSTRACT

A device includes a memristive element; and a write circuit to write the memristive element into a memristive state of a plurality of memristive states by a write operation, wherein the memristive state has a characteristic flux and/or a characteristic charge; wherein the characteristic flux corresponds to a characteristic voltage drop over the memristive element applied for a saturation time and wherein the characteristic charge corresponds to a characteristic current through the memristive element applied for a saturation time; wherein the write operation includes: causing a write voltage drop over the memristive element that is greater than the characteristic voltage drop associated with the memristive state or causing a write current through the memristive element that is higher than the characteristic write current associated with the memristive state, each for a total write time that is shorter than the saturation time.

18 Claims, 44 Drawing Sheets

(51) Int. Cl.
*H03K 19/00* (2006.01)
*H04L 9/08* (2006.01)

(58) Field of Classification Search
CPC .... G11C 2013/0078; G11C 2013/0092; H03K 19/0021; H04L 9/0869; H04L 2209/12; H04L 9/0866
See application file for complete search history.

(56) References Cited

U.S. PATENT DOCUMENTS

| | | | | |
|---|---|---|---|---|
| 2011/0182104 | A1 | 7/2011 | Kim et al. | |
| 2013/0235651 | A1* | 9/2013 | Perner | G11C 13/0007 365/148 |
| 2016/0351259 | A1 | 12/2016 | Jeon et al. | |
| 2017/0213590 | A1 | 7/2017 | Muralimanohar et al. | |
| 2017/0249987 | A1 | 8/2017 | Jeon et al. | |
| 2018/0316493 | A1 | 11/2018 | Kvatinsky et al. | |
| 2019/0122730 | A1 | 4/2019 | Schmidt et al. | |
| 2020/0295920 | A1 | 9/2020 | Du et al. | |
| 2021/0193222 | A1* | 6/2021 | Merced Grafals | G11C 11/5685 |
| 2023/0090726 | A1 | 3/2023 | Du et al. | |

OTHER PUBLICATIONS

Xi, Jane et al., "Temperature Dependence Model", Chapter 12, 2003, pp. 12-1 to 12-10, BSIM 4.3.0, UC Berkeley.

Copetti, T. S. et al., "Validating a DFT Strategy's Detection Capability regarding Emerging Faults in RRAMs", IEEE, Oct. 4-7, 2021, 6 pages, 2021 IFIP/IEEE 29th International Conference on Very Large Scale Integration (VLSI-SoC), Singapore.

Blasco, J. et al., "Equivalent circuit modeling of the bistable conduction characteristics in electroformed thin dielectric films", Microelectronics Reliability, 2015, 14 pages, Issue 55, Elsevier.

European Search Report issued for the parallel European patent application No. 23 20 0840, dated Mar. 1, 2024, 12 pages (for informational purposes only).

Garcia-Redondo, Fernando et al., "A Thermal Adaptive Scheme for Reliable Write Operation on RRAM Based Architectures", IEEE, 2015, pp. 367-374, 2015 33rd IEEE International Conference on Computer Design (ICCD).

Li, Haitong et al., "A Spice Model of Resistive Random Access Memory for Large-Scale Memory Array Simulation", IEEE, Feb. 2014, pp. 211-213, IEEE Electron Device Letters, vol. 35, No. 2.

European Search Report issued for the parallel European patent application No. 23 20 0825, dated Mar. 1, 2024, 13 pages (for informational purposes only).

Office Action issued for the parallel German patent application No. 10 2022 125 340.6, dated Jun. 19, 2023, 7 pages (for informational purposes only).

Office Action issued for the parallel German patent application No. 10 2022 125 356.2, dated Jul. 11, 2023, 9 pages (for informational purposes only).

Office Action issued for the parallel German patent application No. 10 2022 125 361.9, dated Jul. 20, 2023, 12 pages (for informational purposes only).

Nan Du, et al., Practical guide for validated memristance measurements, Review of Scientific Instruments, 2013, Issue 84, 023903.

* cited by examiner

| Probe | Modellierte Zustand-Parameter Zweig 1 | | | | | | | |
|---|---|---|---|---|---|---|---|---|
| | n2 Zweig 4 | K2 Zweig 4 ($V^{-1}$) | IS2 Zweig 4 (nA) | n1 Zweig 2 | K1 Zweig 2 ($V^{-1}$) | Rs2,max (kOhm) | log[Is1[I] (nA)]/ log[I (A)] | log (Rs2[I] (100kOhm)]/ log[I (A)] |
| 252 | 99598.3972 | 0.07840 | 3.23179 | 0.01573 | 5037.88903 | 55636.1772 | 0.41335 | -1.0126 |
| 254 | 96652.8172 | 0.04857 | 10.64204 | 34.67950 | 0.00233 | 90721.7042 | 0.00010 | -0.7648 |
| 256 | 99853.3234 | 0.12109 | 0.01216 | 30.73051 | 9.05993 | 26155651.2432 | 0.00010 | -0.7779 |

$$V = V_1 + V_2$$

Zweig 1: V1>0, V2>0, I>0

$$I = -I_{s2,Branch4}\left(e^{\frac{-qV_2}{k_B T(n_2+K_2V_2)}} - 1\right) + \frac{\boldsymbol{V_2}}{R_{s2}[I]}$$

$$V = n_1 \frac{k_B T}{q} log\left(\frac{I}{I_{s1}[I]} + 1\right)\left(1 + K_1 \frac{k_B T}{q} log\left(\frac{I}{I_{s1}[I]} + 1\right)\right) + \boldsymbol{V}2$$

FIG. 2K

| Probe | Modellierte Zustand-Parameter Zweig 3 | | | | | | | |
|---|---|---|---|---|---|---|---|---|
| | n1 Zweig 2 | K1 Zweig 2 ($V^{-1}$) | IS1 Zweig 2 (nA) | n2 Zweig 4 | K2 Zweig 4 ($V^{-1}$) | Rs1,max (kOhm) | log(Is2[I] (nA))/ log[I (A)] | log (Rs1[I] (100kOhm))/ log[I (A)] |
| 252 | 5.0000 | 90.6852 | 42.43795 | 2.76614 | 24.1512 | 56054.4353 | 0.28201 | -0.8344 |
| 254 | 725.70451 | 10.1009 | 0.02267 | 13.80486 | 17.9911 | 1554097078480.7656 | 0.48522 | -0.9111 |
| 256 | 22827.01734 | 2.2878 | 3.17620 | 2.81884 | 28.7478 | 2544.1962 | 0.08265 | -0.4525 |

$$V = V_1 + V_2$$

Zweig 3: V1<0, V2<0, I<0

$$I = +I_{s1,Branch2}\left(e^{\frac{+qV_1}{k_BT(n_1-K_1V_1)}} - 1\right) + \frac{\boldsymbol{V_1}}{R_{s1}[I]}$$

$$V = -n_2\frac{k_BT}{q}log\left(\frac{I}{I_{s2}[I]}+1\right)\left(1+K_2\frac{k_BT}{q}log\left(\frac{I}{I_{s2}[I]}+1\right)\right)+V1$$

Zweig 1 von 0...+6V

Zweig 1 von 0...+7V

Zweig 1 von 0...+8V

FIG. 3H

| Probe | Modellierte Zustand-Parameter Zweig 1 | | | | | | | |
|---|---|---|---|---|---|---|---|---|
| | n2 Zweig 4 | K2 Zweig 4 ($V^{-1}$) | IS2 Zweig 4 (nA) | n1 Zweig 2 | K1 Zweig 2 ($V^{-1}$) | Rs2,max (kOhm) | log[Is1[I] (nA)]/ log[I (A)] | log [Rs2[I] (100kOhm)]/ log[I (A)] |
| Zweig 1: 0..+6 V | 309.5470 | 0.00098 | 4.1413 | 0.0076 | 16234.1025 | 9999996372003.135 | 0.5616 | -0.8599 |
| Zweig 1: 0..+7 V | 313.3212 | 0.00099 | 4.3980 | 0.0053 | 14672.2454 | 9999944012608.498 | 0.5598 | -0.8707 |
| Zweig 1: 0..+8 V | 227.0454 | 0.00101 | 3.2507 | 0.1309 | 1031.7340 | 9999656959995.543 | 0.5157 | -0.9034 |

$$V = V_1 + V_2$$

Zweig 1: V1>0, V2>0, I>0

$$I = -I_{s2,Branch4}\left(e^{\frac{-qV_2}{k_B T(n_2+K_2V_2)}} - 1\right) + \frac{V_2}{R_{s2}[I]}$$

$$V = n_1 \frac{k_B T}{q} log\left(\frac{I}{I_{s1}[I]} + 1\right)\left(1 + K_1 \frac{k_B T}{q} log\left(\frac{I}{I_{s1}[I]} + 1\right)\right) + V2$$

$$V = V_1 + V_2$$

Zweig 1: V1>0, V2>0, I>0

$$I = -I_{s2,Branch4}\left(e^{\frac{-qV_2}{k_BT(n_2+K_2V_2)}} - 1\right) + \frac{V_2}{R_{s2}[I]}$$

$$V = n_1\frac{k_BT}{q}log\left(\frac{I}{I_{s1}[I]}+1\right)\left(1+K_1\frac{k_BT}{q}log\left(\frac{I}{I_{s1}[I]}+1\right)\right)+V2$$

| | Fläche A (mm²) | Modellierte Zustand-Parameter Zweig 1 | | | | | | | |
|---|---|---|---|---|---|---|---|---|---|
| | | n2 Zweig 4 | K2 Zweig 4 ($V^{-1}$) | IS2 Zweig 4 (nA) | n1 Zweig 2 | K1 Zweig 2 ($V^{-1}$) | Rs2,max (kOhm) | log(Is1[I] (nA))/ log[I (A)] | log (Rs2[I] (100kOhm))/ log[I (A)] |
| 814 | 0,091 | 72033.1679 | 0.045 | 0.141 | 0.0083 | 11176.842 | 2836841.023 | 0.5737 | -0.983 |
| 816 | 0,102 | 843.0903 | 0.049 | 0.167 | 0.0195 | 4190.082 | 1224140.729 | 0.5156 | -0.975 |
| 818 | 0,221 | 840.4934 | 0.048 | 0.306 | 0.0183 | 4524.532 | 1032613.704 | 0.5245 | -0.975 |
| 820 | 0,454 | 767.8050 | 0.055 | 0.526 | 0.1142 | 0.0001 | 516069.568 | 0.3425 | -0.916 |

FIG. 8C

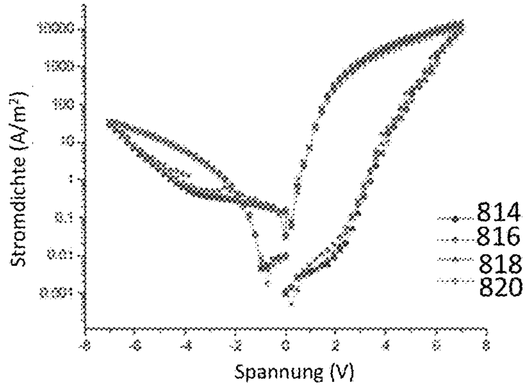

$$V = V_1 + V_2$$

Zweig 1: V1>0, V2>0, I/A>0

$$\frac{I}{A} = \frac{-I_{s2,Branch4}}{A}\left(e^{\frac{-qV_2}{k_B T(n_2+K_2V_2)}} - 1\right) + \frac{V_2}{R_{s2}|I|A}$$

$$V = n_1 \frac{k_B T}{q} log\left(\frac{I/A}{I_{s1}|I|/A} + 1\right)\left(1 + K_1 \frac{k_B T}{q} log\left(\frac{I/A}{I_{s1}|I|/A} + 1\right)\right) + V2$$

| | Fläche A (mm²) | Modellierte Zustand-Parameter Zweig 1 | | | | | | Berechnete Zustand-Parameter Zweig 1 | | | |
|---|---|---|---|---|---|---|---|---|---|---|---|
| | | n2 Zweig 4 | K2 Zweig 4 (V⁻¹) | IS2/A Zweig 4 (nA/mm²) | n1 Zweig 2 | K1 Zweig 2 (V⁻¹) | Rs2,max* A (kOhm*m m²) | IS2 Zweig 4 (nA) | Rs2,max (kOhm) | log(Is1[I] (nA))/ log[I (A)] | log (Rs2[I] (100kOhm))/ log[I (A)] |
| 814 | 0,091 | 72033.16 79 | 0.045 | 1.549 | 0.0083 | 11176.8 42 | 2836841. 023 | 0.141 | 2836841.023 | 0.5737 | -0.983 |
| 816 | 0,102 | 843.0903 | 0.049 | 1.637 | 0.0195 | 4190.08 2 | 1224140. 729 | 0.167 | 1224140.729 | 0.5156 | -0.975 |
| 818 | 0,221 | 840.4934 | 0.048 | 1.385 | 0.0183 | 4524.53 2 | 1032613. 704 | 0.306 | 1032613.704 | 0.5245 | -0.975 |
| 820 | 0,454 | 767.8050 | 0.055 | 1.159 | 0.1142 | 0.0001 | 516069.5 68 | 0.526 | 516069.568 | 0.3425 | -0.916 |

252

254

256

252

254

256

252

254

256

DEVICES AND METHODS FOR OPERATING A MEMRISTIVE ELEMENT

CROSS-REFERENCE TO RELATED APPLICATIONS

This application claims priority to German application DE 10 2022 125 361.9, filed on Sep. 30, 2022, the entire content of which is incorporated herein by reference.

TECHNICAL FIELD

Various aspects relate to devices and methods for operating a memristive element based on physical modelling.

BACKGROUND

In general, various data processing applications may rely on transistor technologies. However, it was found that resistor arrays may be useful for some data processing applications as well. Such resistor-based technologies were further developed to allow for a selective reconfiguration of an electric resistance of resistors. Such devices having a non-volatile, reconfigurable electric resistance, may be referred to as memristive devices or memristors, for example. Memristor crossbar arrays were developed to replace transistors and memory cells in some data processing and data storage applications. However, an occurrence of leakage currents in memristor based crossbar arrays may limit a scalability of such structures. Therefore, several types of memristors with nonlinear resistance behavior have been proposed to reduce leakage currents when reconfiguring and reading selective memristors over nonselective memristors. These include so-called complementary resistance switches, which include two memristive structures connected in series, wherein a disadvantage of this technology may be that the state of the complementary resistance can be only reconfigured in a predictable manner after an initialization step and, therefore, the complementary resistance switch has to be initialized before every reconfiguration step. An approach for a reconfiguration of the resistance state in a predictable manner of a complementary resistive switch may be based on tracking the resistance state of the complementary resistive switch before and after reconfiguration. A complementary resistive switch may include a two-layer memristive structure with strong nonlinear resistive behavior and a single-layer memristive structure with strong nonlinear resistive behavior.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which:

FIG. 3H shows correspondingly determined slope values;

FIG. 8A shows a writing scheme for reconfiguring the resistance state of the memristive structure and dynamic state parameters of the memristive structure associated with a memristive state the memristive structure resides in, FIGS. 8B and 8C show measured characteristics and correspondingly determined values of exemplary static state parameters.

DESCRIPTION

Figure 1A:
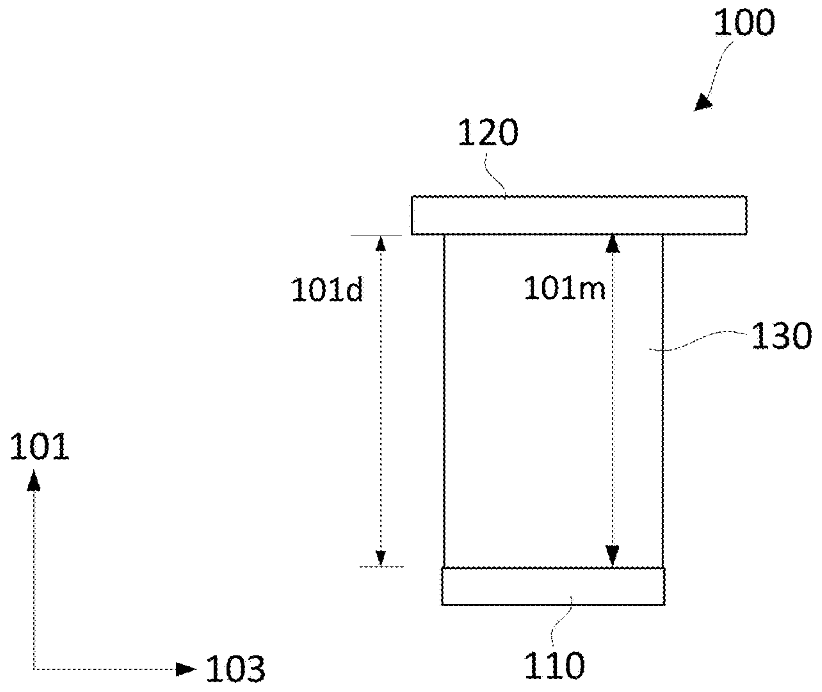
FIGS. 1A to 1D schematically show various aspects of a memristive structure.

The following detailed description refers to the accompanying drawings that show, by way of illustration, specific details, and aspects in which the invention may be practiced. These aspects are described in sufficient detail to enable those skilled in the art to practice the invention. Other aspects may be utilized and structural, logical, and electrical changes may be made without departing from the scope of the invention. The various aspects are not necessarily mutually exclusive, as some aspects can be combined with one or more other aspects to form new aspects. Various aspects are described in connection with methods and various aspects are described in connection with devices (e.g., arrangements). However, it may be understood that aspects described in connection with methods may similarly apply to the devices, and vice versa.

The terms "at least one" and "one or more" may be understood to include any integer number greater than or equal to one, i.e., one, two, three, four, [ . . . ], etc. The term "a plurality" may be understood to include any integer number greater than or equal to two, i.e., two, three, four, five, [ . . . ], etc. The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The phrase "unambiguously assigned" may be used herein to mean a one-to-one-assignment (e.g., allocation, e.g., correspondence) or a bijective assignment. As an example, a first element being unambiguously assigned to a second element may include that the second element is unambiguously assigned to the first element. As another example, a first group of elements being unambiguously assigned to a second group of element may include that each element of the first group of elements is unambiguously assigned to a corresponding element of the second group of elements and that that corresponding element of the second group of elements is unambiguously assigned to the element of the first group of elements.

The term "coupled" may be used herein with respect to nodes, circuit elements, and the like, to mean a, e.g. direct or indirect, connection and/or interaction. Several elements may, for example, be coupled together along an interaction chain (e.g., an electrically conductive path), along which the interaction (e.g., electrical charges) may be transmitted. For example, two elements coupled together may interact with each other.

The term "connected" or "connection" may be used herein with respect to nodes, circuit elements, and the like, to mean electrically connected, which may include a direct connection or an indirect connection, wherein an indirect connection may only include additional structures in the current path that do not influence the substantial functioning of the described circuit or device. The term "electrically conductively connected" that is used herein to describe an electrical connection between one or more terminals, nodes, regions, contacts, etc., may be understood as an electrically conductive connection with, for example, ohmic behavior, e.g., provided by a metal or degenerate semiconductor in absence of p-n junctions in the current path. The term "electrically conductively connected" may be also referred to as "galvanically connected."

In some aspects, two physical and/or chemical properties (e.g., time, an electrical voltage, an electrical current, an electrical conductance, an electrical charge, an electrical flux, a thickness, an electrical conductivity, a doping concentration, as examples) may be compared with one another by relative terms such as "greater", "higher", "lower", "less", or "equal", for example. It is understood that, in some aspects, a comparison may include a sign (positive or negative) of a value representing the physical and/or chemical properties or, in other aspects, the absolute values are considered for the comparison. However, a comparison of measurement values representing a physical and/or chemical property may usually include a measurement of such measurement values by the same measurement principle or at least by comparable measurement principles.

According to various aspects, a memristive structure in an array of memristive structures (e.g., within a crossbar array) may be addressable, e.g. by being unambiguously assigned to a logic address. The addressability and the logic addresses may be provided by the architecture of the control lines connected to a respective memristive structure. In a crossbar array, two sets of control lines (e.g., a set of word-lines and a set of bit-lines) may be utilized to address an array of memristive structures. According to various aspects, an analog memristive structure may be written/reconfigured in one of various memristive states (also referred to as resistance states) associated therewith. As an example, the actual electrical resistance (or conductivity) associated with a memristive structure can be determined via a read operation to evaluate in which of the distinct memristive states the memristive structure is residing in. As another example, the actual electrical resistance (or conductivity) associated with a memristive structure can be utilized in a neuronal network configuration to influence a data or signal processing.

In some aspects, a plurality of memristive structures may be arranged in a crossbar configuration. In such a crossbar configuration, a memristive material portion (also referred to as memristor or memristive device) can be addressed by a corresponding cross-point formed by input-lines and output-lines of the crossbar arrangement. Neuromorphic and/or analog computing technologies, only as examples, may utilize an ideal analog switching of a memristive structure.

FIG. 1A to FIG. 1D show various aspects of a memristive structure 100. As illustrated in FIG. 1A, according to various aspects, the memristive structure 100 may include a first electrode 110 and a second electrode 120. The first electrode 110 and/or the second electrode 120 may include any suitable electrically conductive material, e.g., Al, Cu, Ti, AlCu, TiN, W, Ta, only as examples. The memristive structure 100 may further include a memristive material portion 130 (e.g., a memristive element). The memristive material portion 130 may be disposed between the first electrode 110 and the second electrode 120. Illustratively, the region in which the first electrode 110 and the second electrode 120 overlap one another may be (e.g., partially or completely) filled with memristive material. According to various aspects, the memristive material portion 130 may be in electrical contact and in direct physical contact with both the first electrode 110 and the second electrode 120. Therefore, a dimension 101*m* (e.g., a height or a thickness) of the memristive material portion 130 may be defined by a distance 101*d* from the first electrode 110 to the second electrode 120. The distance 101*d* from the first electrode 110 to the second electrode 120 may be understood as a shortest distance measure, for example, perpendicular to the planes in which the electrodes are formed. According to various aspects, the dimension (e.g., the height) of the memristive material portion 130 may be in a predefined range such that the memristive structure 100 has a substantially symmetric read characteristic and/or at least one curvature change in the read characteristic. The first electrode 110 and the second electrode 120 may be planar electrodes.

Figure 1B:
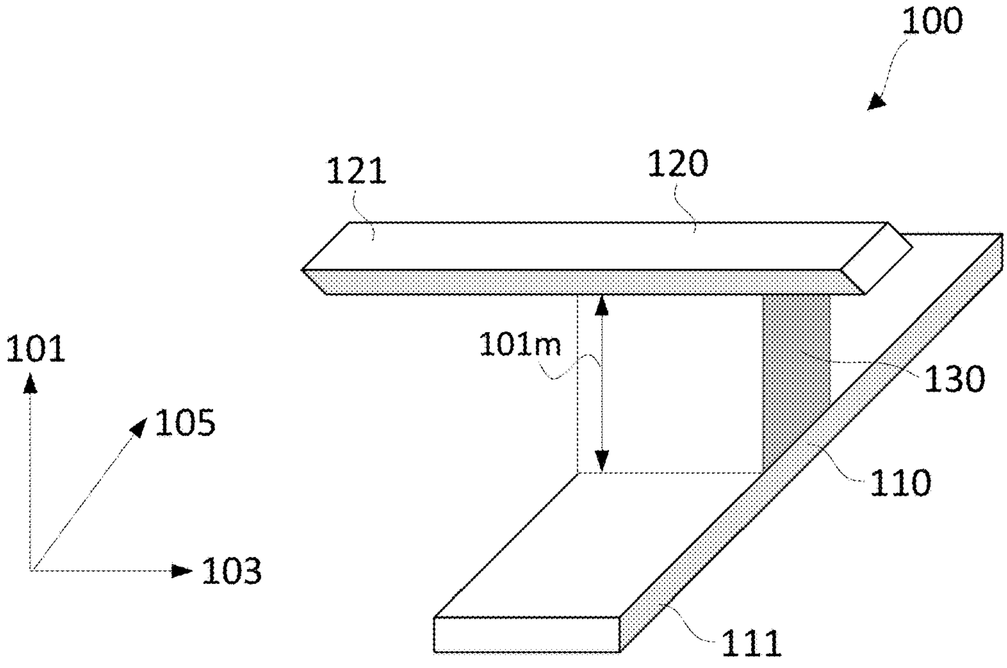

According to various aspects, the memristive structure 100 may be a memristive cross-point structure included in a memristive crossbar array. The first electrode 110 and the second electrode 120 may be each a portion of a corresponding crossbar control line. As an example, a crossbar array may include a set of first control lines and a set of second control lines in a crossbar configuration, and the first electrode 110 may be a portion of a first control line 111 of the set of first control lines and the second electrode 120 may be a portion of a second control line 121 of the set of second control lines, as illustrated in FIG. 1B. In this example, the memristive material portion 130 may be in direct physical contact with both the first control line 111 and the second control line 121, and the memristive material portion 130 may be disposed between both the first control line 111 and the second control line 121. Accordingly, a memristive structure 100 can be provided in each of various cross-point regions of the crossbar array.

Figure 1C:
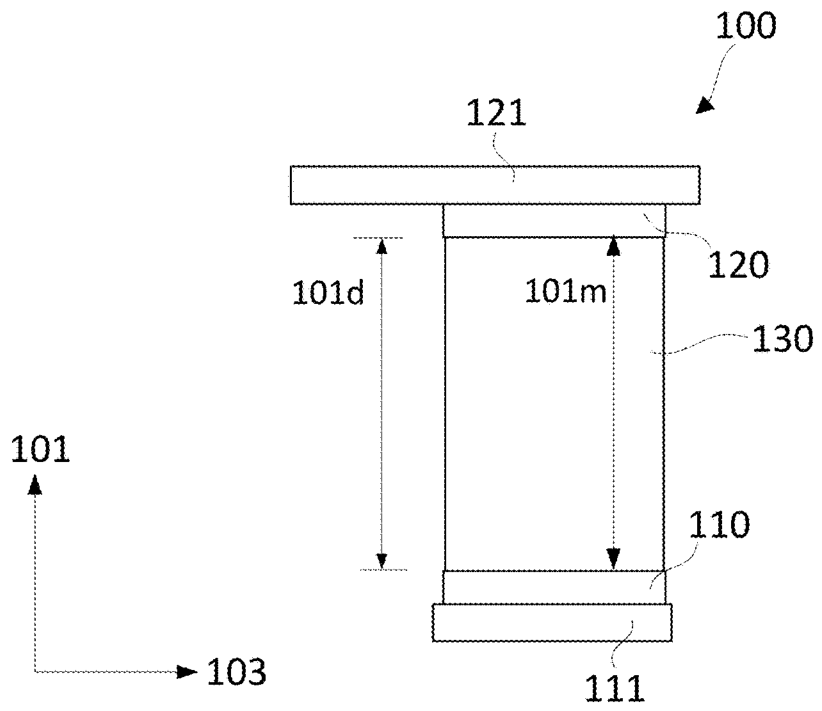
Figure 1D:
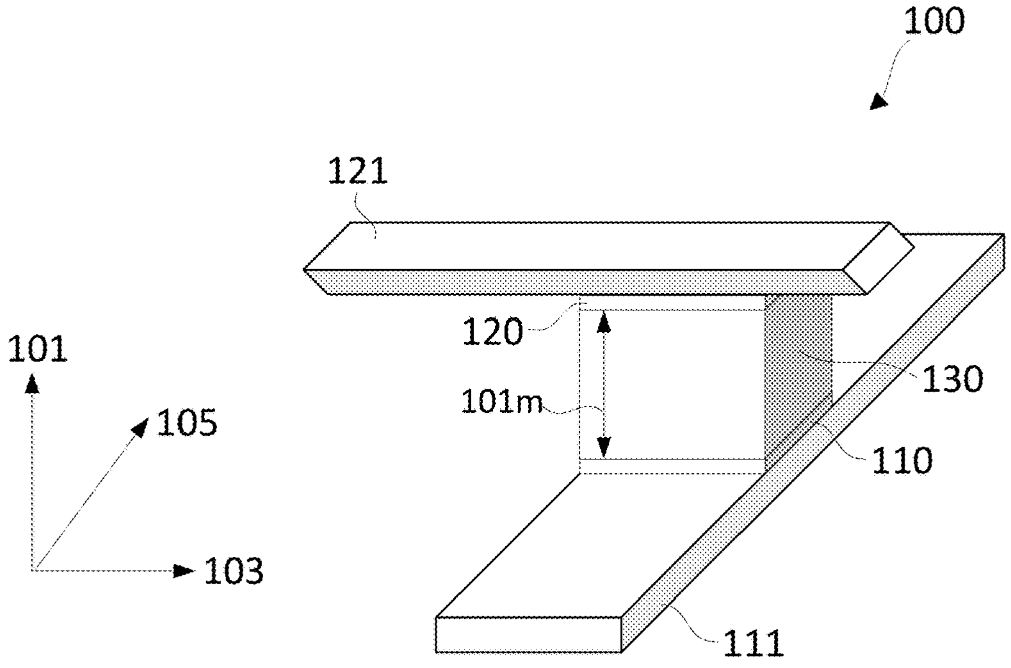

In other aspects, the first electrode 110 may be coupled to (e.g., electrically conductively connected to, e.g., in direct physical contact with) a corresponding first control line (e.g., a first control line of a crossbar array) and the second electrode 120 may be coupled to (e.g., electrically conductively connected to, e.g., in direct physical contact with) a corresponding second control line (e.g., a second control line of a crossbar array). As an example, a crossbar array may include a set of first control lines and a set of second control lines in a crossbar configuration, and the first electrode 110 may be coupled to (e.g., electrically conductively connected to, e.g., in direct physical contact with) a first control line 111 of the set of first control lines and the second electrode 120 may be coupled to (e.g., electrically conductively connected to, e.g., in direct physical contact with) a second control line 121 of the set of second control lines, as illustrated in FIG. 1C and FIG. 1D. In this example, the memristive material portion 130 may not be in direct physical contact with the first control line 111 and the second control line 121. But the first electrode 110 may be in direct physical contact with the first control line 111 and the second electrode 120 may be in direct physical contact with the second control line 121. The first electrode 110, the second electrode 120, and the memristive material portion 130 may be disposed between the first control line 111 and the second control line 121. Accordingly, a memristive structure 100 can be provided in each of various cross-point regions of a crossbar array.

According to various aspects, a crossbar array may define lateral (e.g., in plane) dimensions, e.g., along lateral directions 103, 105 shown in the figures. As an example, each control line (e.g., first control line 111) of a set of first control lines of the crossbar array may extend along a first lateral direction 105 and each control line (e.g., second control line 121) of a set of second control lines of the crossbar array may extend along a second lateral direction 103. The first lateral direction 105 may be perpendicular to the second lateral direction 103. A height direction 101 may be perpendicular to the first lateral direction 105 and/or the second lateral direction 103. The height direction 101 may be perpendicular to a planar surface of the first electrode 110 facing the memristive material portion 130 and/or perpendicular to a planar surface of the second electrode 120 facing the memristive material portion 130.

The dimension 101*m* (e.g., a height or a thickness) of the memristive material portion 130 may be defined along a direction parallel to the height direction 101. Accordingly, the distance 101*d* between the first electrode 110 and the second electrode 120 may be defined along a direction parallel to the height direction 101. The dimension 101*m* of the memristive material portion 130 may be greater than 150 nm. Accordingly, the distance 101*d* from the first electrode 110 to the second electrode 120 may be greater than 150 nm.

As explained above, the first control line 111 and the second control line 121 may be in a crossbar configuration to allow for an electrical addressing of the memristive structure 100 (i.e., the memristive material portion 130) via the first control line 111 and the second control line 121. An electrical addressing of the memristive structure 100 may be used to read information stored in the memristive structure 100 and/or to write (e.g., store) information into the memristive structure 100. In other words, an electrical addressing of the memristive structure 100 may be used to determine a state (e.g., a memristive state) in which the memristive structure 100 is residing and/or to set (e.g., keep or change) a (e.g., a memristive) state of the memristive structure 100.

In some aspects, the memristive material portion 130 may be patterned. Since the electric field between the first electrode 110 and the second electrode 120 may be substantially formed in the overlap region between the respective electrodes 110, 120, it may be sufficient to provide the memristive material only in the overlap region to form the memristive material portion 130, see, for example, FIGS. 1A to 1D. In this case, according to various aspects, the memristive material portion 130 has an aspect ratio of greater than 1, e.g., greater than 2, greater than 5, greater than 10. The aspect ratio may be defined by the height (e.g., the dimension along the height direction 101) of the memristive material portion 130 divided by a width (e.g., along one of the lateral directions 103, 105) of the memristive material portion 130. A sufficiently great height of the memristive material portion 130 and therefore a comparatively high aspect ratio may be essential to provide a memristive material portion 130 with ideal analog read properties. However, since due to manufacturing aspects, it may be difficult to form such a memristive material portion 130 with a comparatively high aspect ratio, the memristive material portion 130 may be provided by a non-patterned layer of a memristive material and/or the memristive material portion 130 may have a greater lateral extension than the overlap region between the electrodes 110, 120. However, a sufficiently great height of the memristive material portion 130 may be realized in any cases to achieve ideal analog read properties.

Possible materials that can be used to form the memristive material portion 130 may be, for example, a ternary oxide, a quaternary oxide, and/or a quinary oxide. Examples for ternary oxides are perovskite oxides with a base structure ABO3 or bixbyite with a base structure of A2O3 or B2O3 or mixtures thereof. Further, mixtures may include different impurities at the A or B site. Examples of elements for A may include La3+, Ce, Nd, Sm, Eu, Gd, Tb, Dy, Ho, Er, Yp, Lu, Ca, Pr, Pm, Tm, Tl, Pb, Bi, Sr, Y, Ba, Cr, Pu (e.g., all 3+ like La3+). Examples of elements for B may include A13+, Cr, Fe, Ga, In, Sc, V, Ti, Mn, Co, Ni, Sn (e.g., all 3+ like Al3+). Examples of impurities at the A site may include Ca, La, Ce, Nd, Sm, Eu, Gd, Tb, Dy, Ho, Er, Yb, Lu, Pr, Pm, Tm, Tl, Pb, Bi, Sr, Y, La, Ba, Cr Pu, Al, Cr, Fe, Ga, In, Sc, V, Ti, Mn, Co, Ni, Sn, e.g., with a different valence than 3+. Examples of impurities at the B site may include Al, Cr, Fe, Ga, In, Sc, V, Ti, Mn, Co, Ni, Sn, Ca, La, Ce, Nd, Sm, Eu, Gd, Tb, Dy, Ho, Er, Yb, Lu, Pr, Pm, Tm, Tl, Pb, Bi, Sr, Y, La, Ba, Cr, Pu, e.g., with a different valence than 3+. Perovskite oxides may be present in different phases like for example a rhombohedral alpha phase, an orthorhombic beta phase, a hexagonal phase, and/or a cubic bixbyite phase. Examples of suitable crystalline materials may include the ternary oxides CaTiO3, BaTiO3, PbTiO3, LaNiO3, NdAlO3, and/or PrAlO3. The memristive material portion 130 may be or may include one or more of the following materials and/or material combinations: Al2O3/TaOx, SiOx:Ag/TiOx, TaO, HfAlyOx/TaO, Pr0.7Ca0.3MnO3 (PCMO), Si—In—Zn—O/ion gel, SiInZnO, SiN/TaN, SrFeO3, only as examples.

In some aspects, at least a portion of the memristive material portion 130 may be modified, e.g., to cause a vacancy doping V+ or V−. In some aspects, the memristive material portion 130 may include an n-type memristive material that has a positive vacancy doping V+, e.g. anion vacancy. In other aspects, the memristive material portion 130 may include a p-type memristive material that has a negative vacancy doping V−, e.g. cation vacancy. In the case that the memristive material that form the memristive material portion 130 is an oxide, e.g., BiFeyOx, the vacancy doping V+ may be cause by oxygen vacancies VO+. In some aspects, at least a portion of the memristive material portion 130 may be modified, e.g., to cause traps, T. Accordingly, the memristive material portion 130 may include traps T. As an example, the traps T may be caused by introduction of metal iones (e.g., titanium ions) into the memristive material. A function of the memristive material portion 130 may be understood in terms of movable vacancies V+ that can be locally trapped in regions of the memristive material portion 130. The traps T may be introduced adjacent to the first electrode 110 and second electrode 120 and the movable vacancies V+ may selectively move either into the region adjacent to the first electrode 110 or into the region adjacent to the second electrode 120 and trapped there accordingly in an electric field. This may allow for generating selectively a Schottky-type diode either with maximum barrier height at the first electrode 110 or with maximum barrier height at the second electrode 120 such that the memristive structure 100 exhibit a nonlinear switching behavior and is self-rectifying.

Figure 2A:
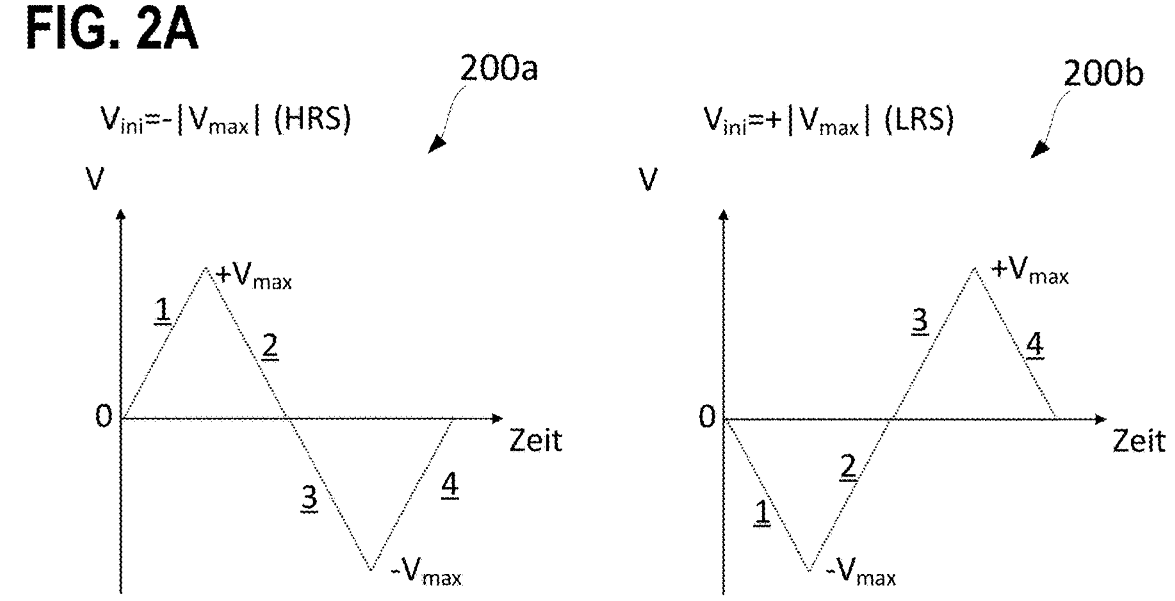
FIGS. 2A to 2F show aspects of electric characteristics corresponding to barrier switching of a memristive structure, FIGS. 2G to 2I each show measured IV-characteristics for different exemplary memristive structures.
Figure 2B:
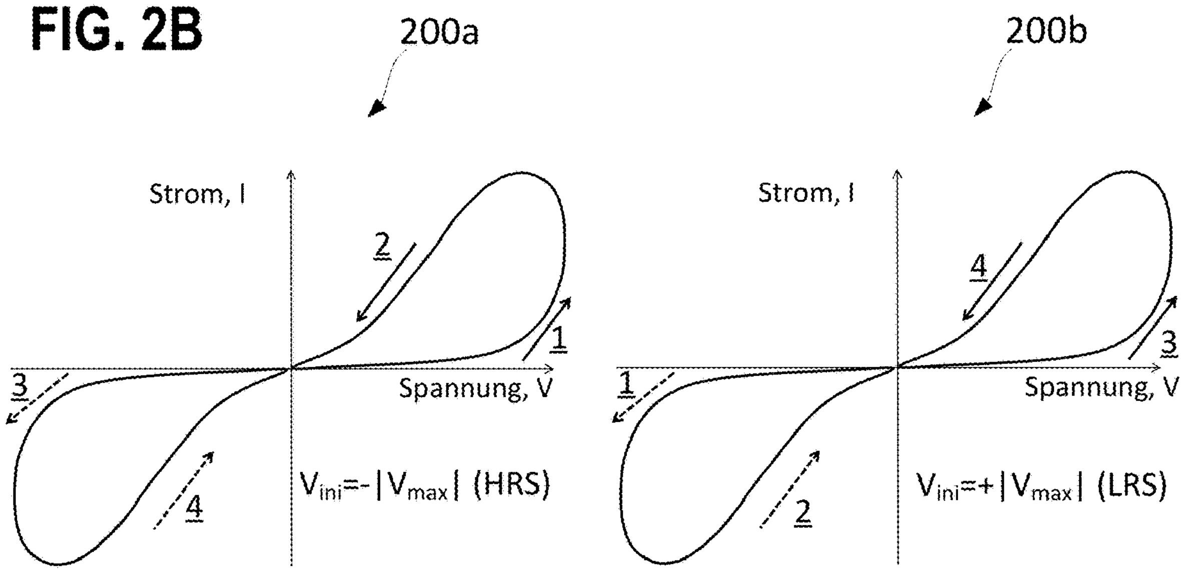

A memristive structure (also referred to as memristive device, memristive element, resistive switch, memristor, memristor element, or memristor structure) may be regarded as an analog memristive structure in the case that the memristive structure exhibits a continuous change in current (e.g., in the write current $I_{write}$) when (e.g., linearly) ramping the applied voltage (e.g., from 0 V to $+V_{max}$ and from $+V_{max}$ to 0 V and from 0 V to $-V_{max}$ and from $-V_{max}$ to 0 V), as illustrated, for example, in FIG. 2A and FIG. 2B. This current may be associated with a current through the memristive structure 100. In the following various aspects are described with reference to the memristive structure 100; it is noted that this serves for illustration and that other memristive structures may be used accordingly.

Up to now, a memristive structure was set either into a high resistive state (HRS) or a low resistive state (LRS). This process of setting the memristive structure into the high resistive state (HRS) or the low resistive state (LRS) was often referred to as writing a memristive state of the memristive structure. However, it is found that the high resistive state (HRS) (Branch 1 and Branch 3 in FIG. 2B) is always associated with a writing operation which changes the memristive state and that the low resistive states (LRS) (Branches 2 and Branches 4 in FIG. 2B) are always associated with a reading operation which does not change the memristive state. This finding is exploited to define two different operation modes of the memristive structure: a writing mode (Branch 1 and Branch 3 in FIG. 2B) and a reading mode (Branches 2 and Branches 4 in FIG. 2B). In this case, aspects of an applied write signal (e.g., a maximum applied voltage value or a maximum applied current value, a shape of the write signal, etc.) may define the memristive state into which the memristive structure is written in (e.g., in the case of a voltage signal, the memristive state after reducing the voltage to 0 V). There exists a single curve (Branch 1 and Branch 3) which indicates the relation between sourcing voltage and writing current or sourcing current and writing voltage. This curve associated with changing the memristive states may be denoted as dynamic state curve. It is found that all dynamic state curves (branch 1 and branch 3) are superimposed for the same sourcing voltage and for the same sourcing current. Further, it is found that each memristive (static) state is associated with a corresponding resistance-characteristic curve (branch 2 and branch 4 in FIG. 2B) such that information about the resistance-characteristic curve (branch 2 and branch 4 in FIG. 2B) allows to conclude the memristive state the memristive structure resides in. Analysis of the last voltage/current point (i.e., the point having the highest absolute voltage value) of branch 1 allows to conclude in which state the memristive structure is when subsequently ramping the voltage/current on branch 2, i.e. at smaller values than the end point of branch 1. Analysis of the last voltage/current point of branch 3 allows to conclude in which state the memristive structure is when subsequently ramping the voltage/current on branch 4, i.e. at smaller voltage values than the last point of branch 3. Hence, each voltage/current point on branch 1 and branch 3 of the resistance-characteristic curve may be unambiguously assigned to a respective memristive (static) state in branch 2 and branch 4. This relation between voltage/current points in the resistance-characteristic curve of branch 2 and branch 4 may be independent on how the memristive structure was set (e.g., written via the write curve) into the corresponding memristive state. As described in the following, these findings allow to use various kinds of writing schemes to write the memristive dynamic state of the memristive structure 100 and also allows to use a less complex reading scheme. The described writing and/or reading schemes allow, for example, to differentiate between more than 100 (e.g., more than 500, e.g., more than 1000) different memristive states. The described writing and/or reading schemes allow, for example to ramp real-numbered writing voltages or writing currents and to ramp real-numbered reading voltages or reading currents. Hence, as compared to two memristive states (HRS or LRS), the memristive structure 100 is not only digital (such as in the case of being either HRS or LRS) but may be in any memristive state between the high memristive state (HRS) and the low memristive state (LRS), such as in one of more than 100 (e.g., more than 500, e.g., more than 1000) memristive states enhancing the number of bits associated with the memristive structure 100 significantly and allowing for real-number processing. In the following, various writing schemes for writing a memristive state are exemplarily described for the memristive structure 100. It is understood that any memristive structure may be written using one or more of these writing schemes and that any kind of device which includes at least one memristive structure may employ any of these writing schemes. According to an example, the device may include a write circuit configured to write the memristive state of the at least one memristive structure. According to another example, the device may be (e.g., for analysis) coupled to another device which is configured to apply a measurement signal to the memristive structure in order to write the memristive state of the at least one memristive structure.

According to various aspects, a (e.g., measurement) signal may be applied to the memristive structure to set a memristive state and/or to read a prior set memristive state. The (e.g., measurement) signal to read a memristive state (branch 2 and branch 4) may be, for example, a signal pulse. The set memristive state (viz., the memristive state set via branch 1 or branch 3) is determined by the last voltage/current point on branch 1 or branch 3 and can be determined by recording the write voltage/current. The memristive structure 100 may be addressed via a voltage-driven mode or a current-driven mode. In the case of the voltage-driven mode, a voltage signal (e.g., a voltage pulse) may be applied to the memristive structure 100 and an induced current through the memristive structure 100 may be determined (e.g., measured). In the case of the current-driven mode, a current signal (e.g., a current pulse) may be applied to the memristive structure 100 and an induced voltage may be determined (e.g., measured). Herein, various aspects of memristive structures, of various reading schemes, and of writing schemes are described for the voltage-driven mode (e.g., in the case of the shown IV-characteristics). It is noted that this serves for illustration and that other modes, such as the current-driven mode, can be used accordingly.

Figure 2C:
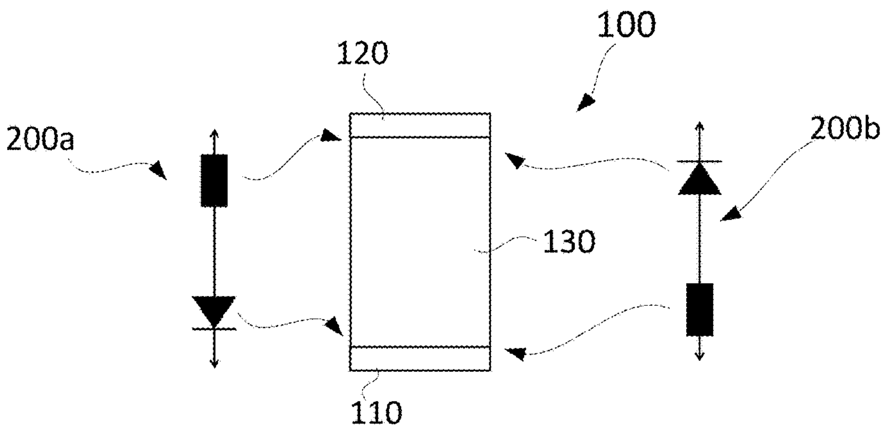

FIG. 2A shows a first exemplary ramping scheme 200*a* that can be used to reconfigure/write the memristive structure 100 (which has been initialized in the high resistance state (HRS) for positive voltage values) into a (positive) low resistive state (LRS). After initializing the HRS (by applying $-|V_{max}|$) the memristive structure 100 may be reconfigured (e.g., written via branch 1) (1 in 200*a*) into a low resistance state (LRS); subsequently the low resistance state (LRS) may be read (2 in 200*a*) (e.g., by measuring at least a portion of branch 2); subsequently the memristive structure 100 may be reconfigured (e.g., written via branch 3) into a (negative) low resistance state (LRS) (3 in 200*a*); and subsequently the (negative) low resistance state (LRS) may be read (2 in 200*a*) (e.g., by measuring at least a portion of branch 4) (4 in 200*a*). FIG. 2A also shows a second exemplary ramping schemes 200*b* that can be used to reconfigure/write the memristive structure 100 (which has been initialized in a low resistive state (LRS) for positive voltage values) into the (negative) low resistive state (LRS). After initializing the LRS for positive voltage values (by applying $+|V_{max}|$) the memristive structure 100 may be reconfigured (e.g., written via branch 3) (1 in 200*b*) into the (negative) low resistance state (LRS); subsequently this LRS may be read (2 in 200*b*); subsequently the memristive structure 100 may be reconfigured/written into a (positive) low resistance state (LRS) (3 in 200*b*); and subsequently the (positive) low resistance state (LRS) may be read (4 in 200*b*). Reconfiguration of the resistive state may be realized by applying a writing bias of opposite polarity to the initialization bias. FIG. 2B shows an exemplary current/voltage (I/V) characteristic of the memristive structure 100 obtained via the two exemplary ramping schemes 200*a*, 200*b*, according to various aspects. Ramping scheme 200*a* illustrates the reconfiguration of the memristive structure 100 which has been initialized in the HRS from HRS to LRS (branch 1 in scheme 200*a*) and the reconfiguration of the memristive structure 100 which has been initialized in the LRS from LRS to HRS (branch 3 in scheme 200*a*). Ramping scheme 200*b* illustrates the reconfiguration of the memristive structure 100 which has been initialized in the LRS from LRS to HRS (branch 1 in scheme 200*b*) and the reconfiguration of the memristive structure 100 from HRS to LRS (branch 3 in scheme 200*b*). FIG. 2C shows two equivalent circuits representing the electrical condition of a memristive structure after initialization in HRS and after initialization into LRS. The memristive structure 100 may be in a self-rectifying configuration. The self-rectifying configuration and/or the desired switching behavior may be caused by a formation of a diode (e.g., a Schottky contact) and a resistor at the interfaces between the first electrode 110 and the memristive element 130 and between the second electrode 120 and the memristive element 130 (the memristive element 130 may be a memristive material portion). The diode and the resistor are coupled to one another in a series connection and provide the described HRS and LRS states for a defined polarity. The switching of the memristive structure 100 and therefore the presence of a diode-contact or a resistive contact at the respective electrode regions may be defined by the memristive material, e.g., by presence and/or absence of oxygen vacancies in the electrode regions.

It is understood that the IV-characteristics shown in FIG. 2B are exemplary and schematically serving for illustration and that the IV-characteristic of a memristive structure may be different. In particular, many different types of IV-characteristics are possible for various kinds of memristive structures (e.g., depending on the material, the size, the thickness of the layers, etc.).

Herein, various aspects refer to a high resistance state (HRS) or a low resistance state (LRS). It is understood that the first quadrant may be associated with a HRS (in some aspects referred to as positive HRS) and with a LRS (in some aspects referred to as positive LRS) and that the third quadrant may be associated with a HRS (in some aspects referred to as negative HRS) and with a LRS (in some aspects referred to as negative LRS). The term "positive" may refer to positive voltage values and the term "negative" may refer to negative voltage values. As shown herein for various IV-loops, the positive HRS may correspond to the negative LRS and the negative HRS may correspond to the positive LRS. For example, in the case that the memristive structure 100 is written into a positive LRS (i.e., set in a positive memristive state), when applying a voltage having a positive voltage value the IV-characteristic may follow the resistance-characteristic curve corresponding to the written memristive state and when applying a voltage having a negative voltage value the IV-characteristic may follow the (negative) write curve in branch 3. For example, in the case that the memristive structure 100 is written into a positive HRS (i.e., set in a negative memristive state), when applying a voltage having a negative voltage value the IV-characteristic may follow the resistance-characteristic curve corresponding to the written memristive state and when applying a voltage having a positive voltage value the IV-characteristic may follow the (positive) write curve in branch 1.

Figure 2D:
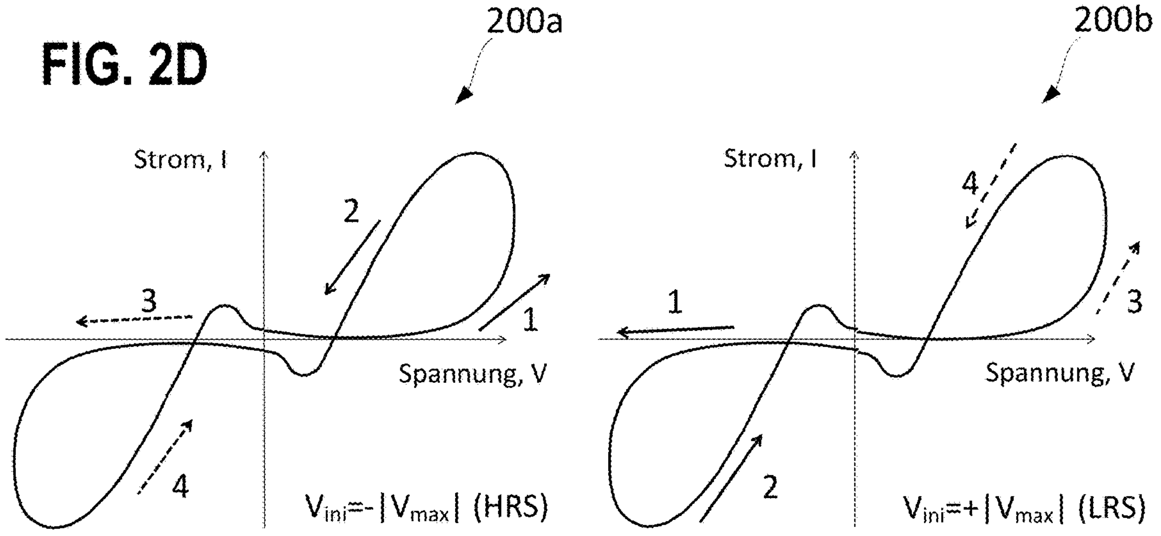
Figure 2E:
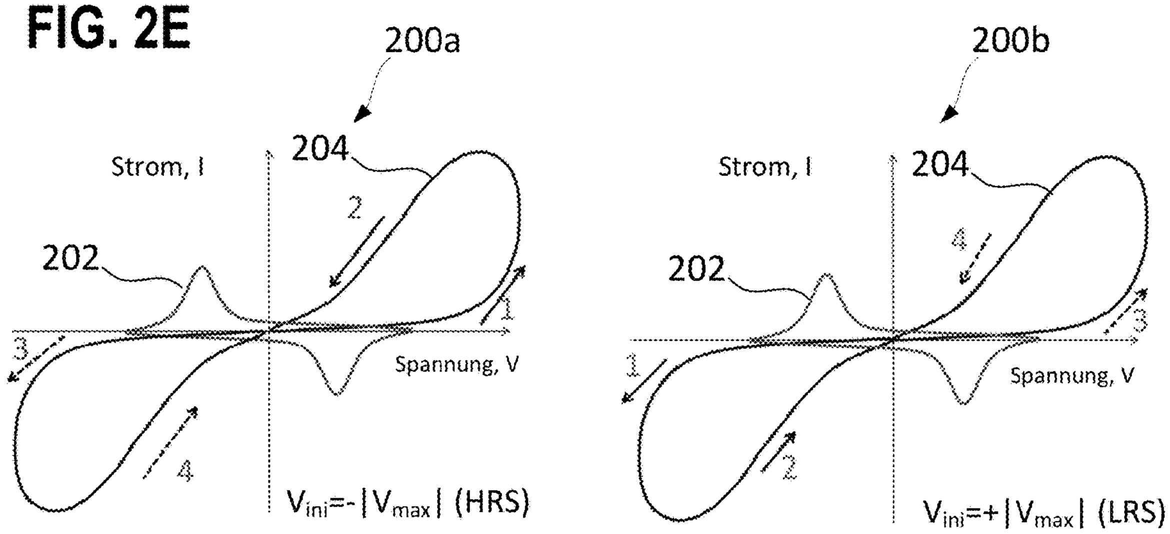
Figure 2F:
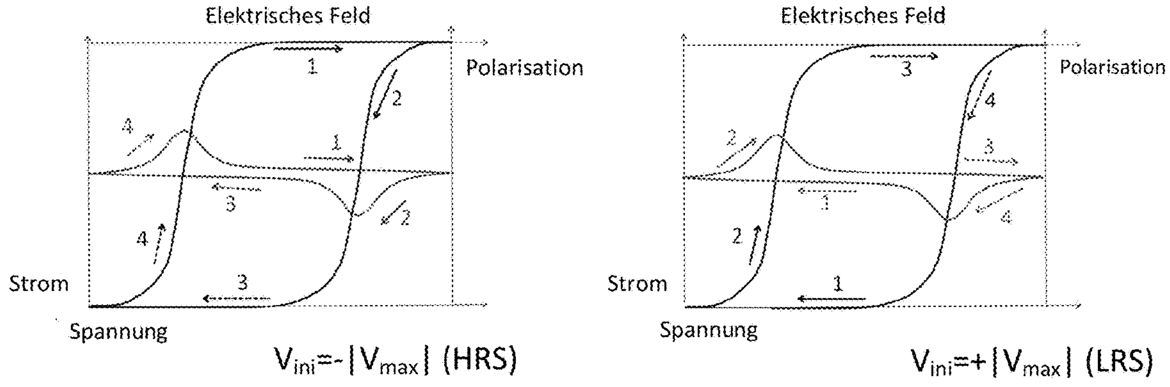

The IV-characteristics may show ferroelectric and interface switching current. Exemplary IV-characteristics which include ferroelectric and/or interface switching effects are shown in FIG. 2D as obtained via the first exemplary ramping scheme 200*a* and via the second exemplary ramping scheme 200*b*. According to various aspects, these effects may be subtracted from the IV-characteristics. For example, the ferroelectric current may be subtracted from the IV-characteristics to obtain corrected IV-characteristics. FIG. 2E exemplarily shows a ferroelectric current 202 which may be subtracted from the IV-characteristics shown in FIG. 2D to obtain the corrected IV-characteristics 204. FIG. 2F shows the corresponding electric field vs. polarization behavior. In contrast to ferroelectric switching, when using barrier switching information about properties can be obtained by means of the polarity of the voltage signal. The IV-characteristics described herein may refer to such corrected IV-characteristics.

Figure 2G:
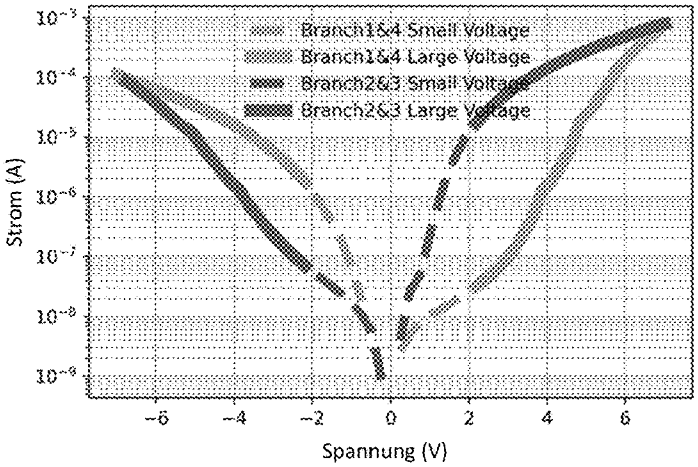
FIGS. 2J and 2K show dynamic state parameters determined by fitting the measured IV-characteristics of the different exemplary memristive structures using a physical model.
Figure 2H:
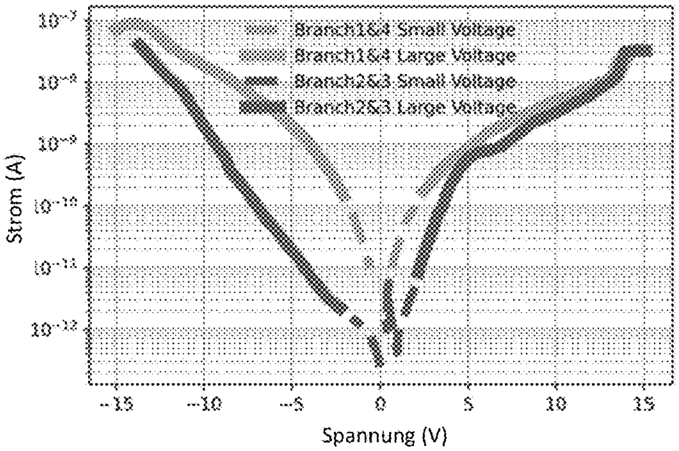
Figure 2I:
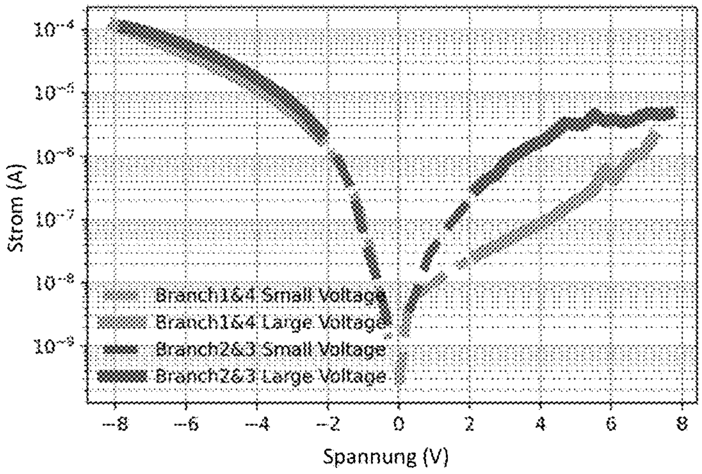

FIG. 2G to FIG. 2I show exemplarily measured IV-characteristic curves of respective memristive structures.

FIG. 2G shows a measured IV-characteristic curve of a memristive structure 252 with a hysteresis in positive and in negative ramping bias/current. Here, the ramping scheme 200*a* was used.

FIG. 2H shows measured IV-characteristic curve of a memristive structure 254 with a hysteresis in negative ramping bias/current and with nearly no hysteresis in positive ramping bias/current. Here, the ramping scheme 200*a* was used.

FIG. 2I shows measured IV-characteristic curve of a memristive structure 256 with a hysteresis in positive ramping bias/current and with nearly no hysteresis in negative ramping bias/current. Here, the ramping scheme 200*a* was used.

For example, in FIG. 2H and FIG. 2I, the reconfiguration into the (negative) low resistance state (LRS) (branch 3) may be represented by two Schottky contacts at the top electrode and at the bottom electrode with the Schottky barrier at the bottom electrode being smaller than the Schottky barrier at the top electrode.

Up to now, the memristive structure 100 may be set into a well-defined memristive state by applying an initialization voltage, $V_{ini}$, (e.g., as write voltage) and subsequently applying a desired write voltage scheme to set a memristive state in which the memristive structure 100 is residing in after the write voltage has been applied.

The resistance state of the memristive structure 100 may be reconfigured by applying a positive writing voltage in the case that the memristive structure is in (negative) HRS or by applying a negative writing voltage in the case that the memristive structure is in (positive) LRS. Here, the voltage, V, may be ramped up to a maximum positive voltage value, $+V_{max}$, and up to a maximum negative voltage value, $-V_{max}$. In an example, the respective maximum voltage, $|V_{max}|$, may be the highest voltage that can be applied such that no breakdown (e.g., of the diode described with reference to FIG. 2C) occurs. In another example, the respective maximum voltage, $|V_{max}|$, may have any voltage value different from 0. However, as described above, these complex writing schemes may not be necessary by employing the findings that the high resistive state (HRS) is always associated with changing memristive states (branches 1 and 3 in FIG. 2A and branches 1 and 3 in FIG. 2B) and that each memristive state is associated with a corresponding resistance-characteristic curve (branches 2 and 4 in FIG. 2A and branches 2 and 4 in FIG. 2B).

Figure 3A:
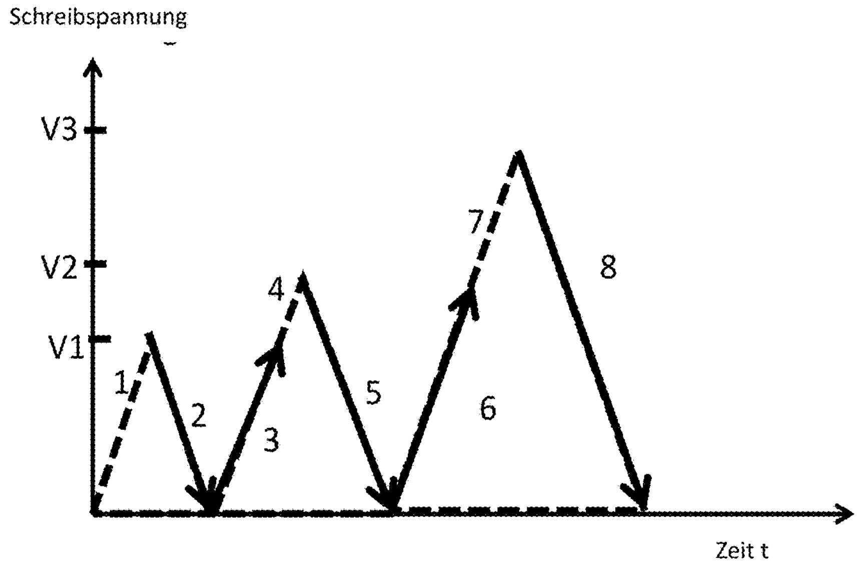
FIG. 3A shows a bias ramping scheme according to various aspects and FIG. 3B shows a schematic IV-characteristic of a memristive structure responsive to applying the bias ramping scheme.
Figure 3B:
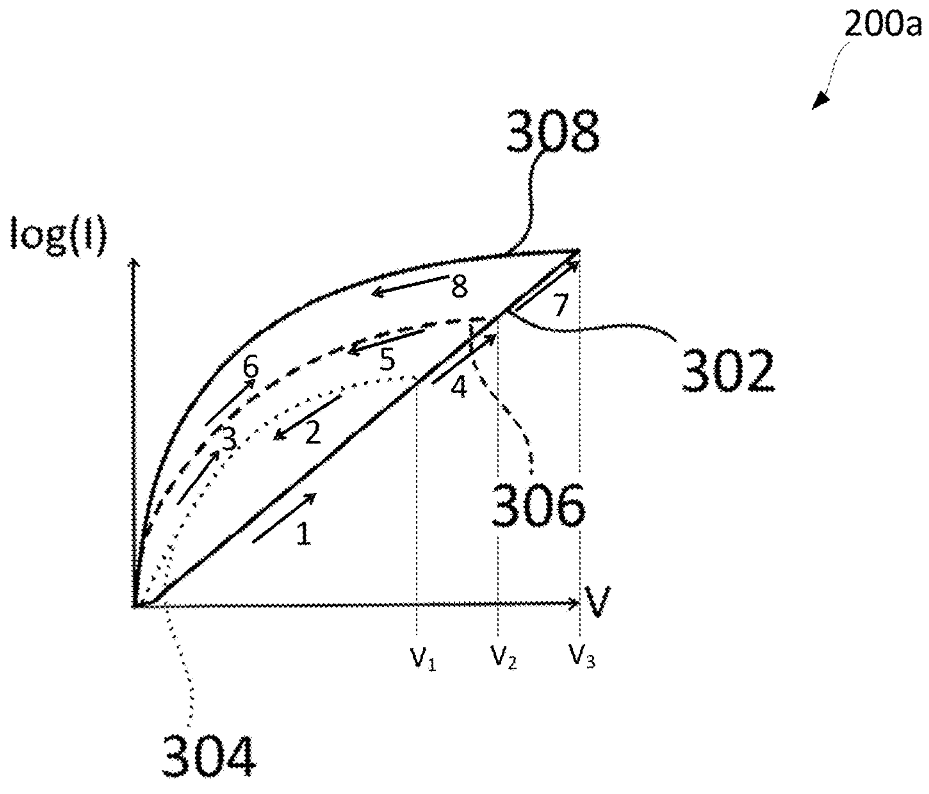

FIG. 3A shows a bias ramping scheme applied to the memristive structure 100 which has been initialized into a high resistance state (HRS) before ramping the bias from 0 to $+V_1$ (1), from $+V_1$ to 0 (2), from 0 to $+V_2$ (3,4), from $+V_2$ to 0 (5), and from 0 to $+V_3$ (6,7), from $+V_3$ to 0 (8). FIG. 3B shows a schematic IV-characteristic of the memristive structure 100 exemplarily for the first quadrant of the IV-diagram where the bias has been ramped according to the ramping scheme shown in FIG. 3A. The memristive state of the memristive structure 100 is reconfigured/written in bias ranges 1,4, and 7. In those bias ranges the operation is called write operation (indicated as dashed lines). The memristive state of the memristive structure 100 is read in bias ranges 2,3,5,6, and 8 (indicated as solid lines). In those bias ranges the operation is called read operation.

Figure 3C:
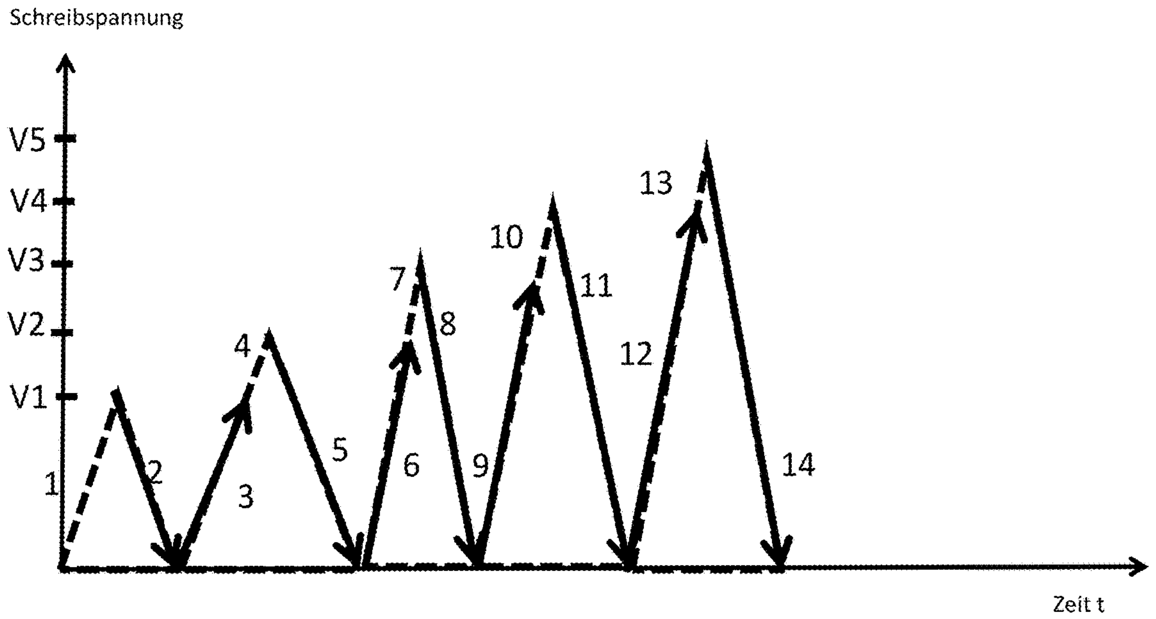
FIG. 3C shows a bias ramping scheme according to various aspects.
Figure 3D:
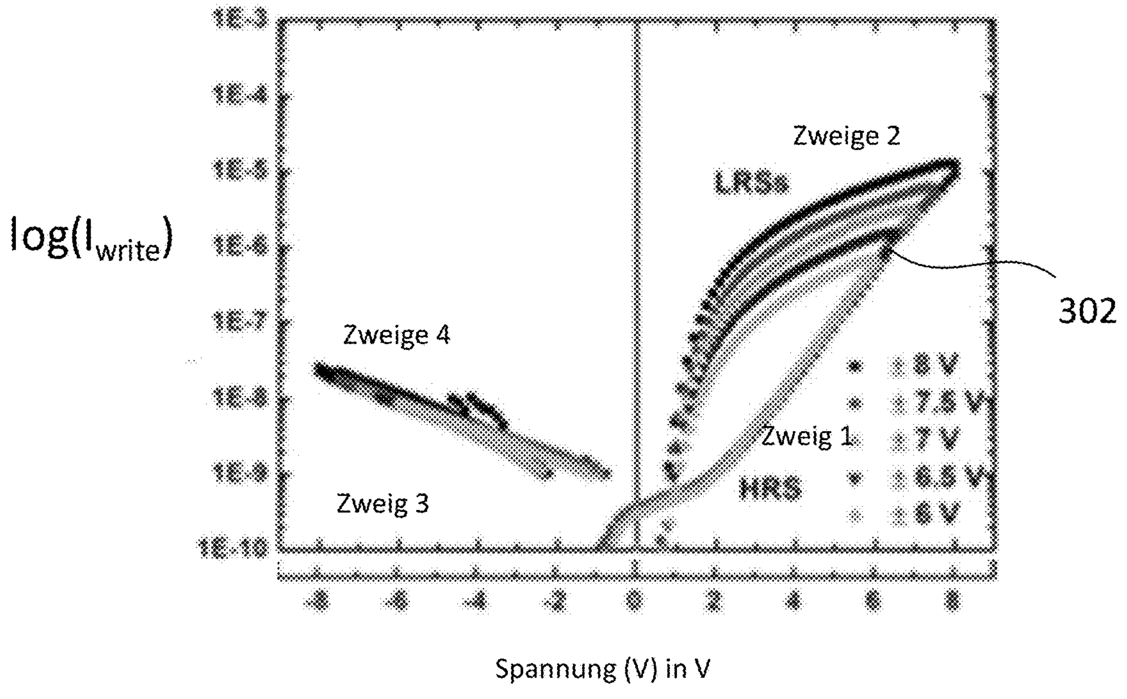
FIG. 3D shows a schematic IV-characteristic of a memristive structure responsive to applying the bias ramping scheme.

The following description may apply similarly to the third quadrant. For example, the first quadrant and the third quadrant may be associated with a respective writing curve (branch 1 in first quadrant and branch 3 in third quadrant). Also, the first quadrant (i.e., positive applied voltages) may be associated with a plurality of (positive) memristive states (reading branches 2 in first quadrant) and the third quadrant (i.e., negative applied voltages) may be associated with a plurality of (negative) memristive states (writing branches 4 in third quadrant). It is understood that, in some aspects, the described behavior may be only present in either the first quadrant or the third quadrant. As an example, the IV-characteristic curves of the memristive structure 100 with a hysteresis in positive bias/current range and with negligible hysteresis in negative bias/current range is shown. The ramping scheme may follow the voltage time characteristics shown in FIG. 3C. The memristive state of the memristive structure 100 is reconfigured/written in bias ranges 1,4, 7, and 13. In those bias ranges the operation is called write operation (indicated as dashed lines). The memristive state of the memristive structure 100 is read in bias ranges 2, 3, 5, 6, 8, 9, 11, 12, and 14 (indicated as solid lines). The current/voltage characteristics of the memristive structure reveal have been taken with $V_1$=+6.0 V, $V_2$=+6.5 V, $V_3$=+7.0 V, $V_4$=+7.5 V, and $V_5$=+8.0 V. FIG. 3D shows an exemplary schematic IV-characteristic of the memristive structure 100 where the bias has been ramped according to the ramping scheme shown in FIG. 3C. As exemplarily shown for the first quadrant, the writing curve 302 (branch 1) may be associated with changing the resistivity of the memristive structure 100 (e.g., via moving traps T), thereby changing the memristive state, $m_s$. Each current-voltage (I-V) data point, I(V), on the writing curve 302 may be associated with a corresponding memristive state, $1 \leq m_s \leq M$ (with M being any integer number equal to or greater than one (e.g., equal to or greater than 100, e.g., equal to or greater than 200, etc.), of the memristive structure 100. This writing curve 302 may be associated with the HRS state. As described herein, it is found that, when setting the memristive structure into a respective memristive state, this writing curve 302 is similar for all memristive states (since each current/voltage data point of the writing curve 302 corresponds to a respective memristive state). Hence, a memristive structure 100 has one writing curve 302. The last point on the writing curve 302 may indicate the final memristive state. When subsequently a positive bias is ramped between largest writing bias (from +Vi to 0, i=1 . . . 5), various intermediate memristive states (LRS branches) from a lowest memristive state, $m_s$=1, to a highest memristive state, $m_s$=M=5.

Figure 3E:
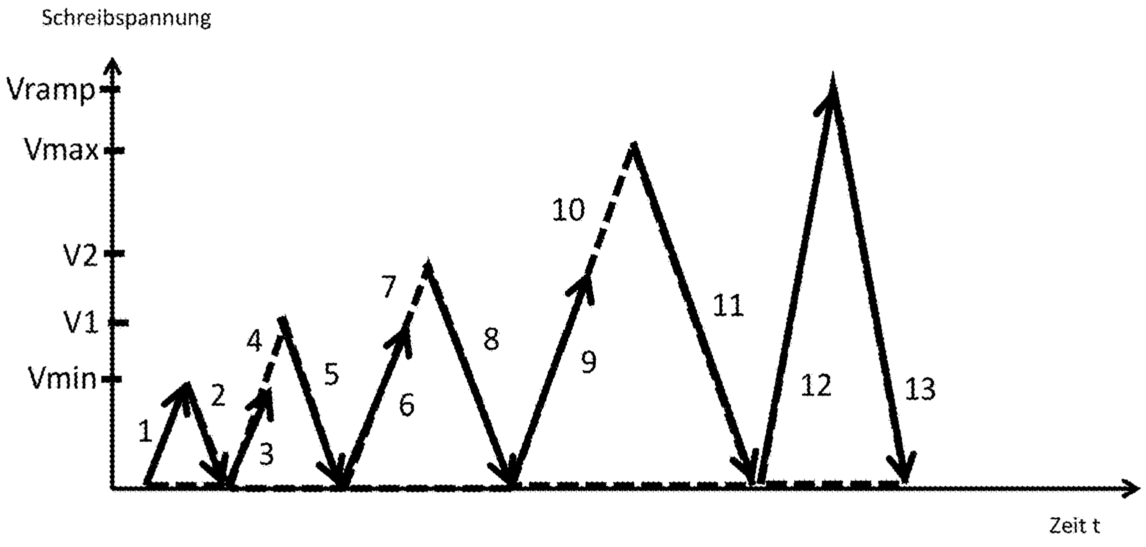
FIG. 3E shows a bias ramping scheme according to various aspects and FIG. 3F shows a schematic IV-characteristic of a memristive structure responsive to applying the bias ramping scheme.
Figure 3F:
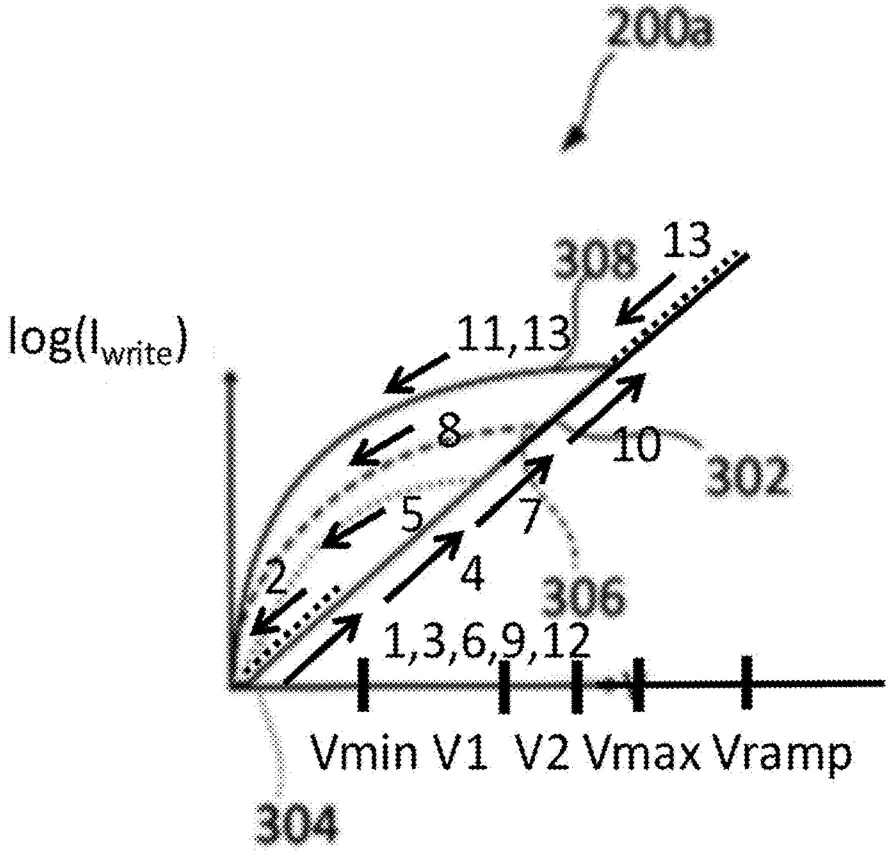

For illustration, a small bias range, an intermediate bias range, and a large bias range of the writing curve 302 are schematically shown in FIG. 3F. A corresponding ramping scheme is shown in FIG. 3E. The writing curve 302 herein shown is (substantially) linearly in the large bias range. It is understood that the writing curve 302 may have any course depending the memristive structure. However, it is noted that there may be a highest memristive state, $m_s$=M, associated with a corresponding highest memristive state ramping voltage value $V_{max}$. Further, it is noted that there may be a smallest memristive state associated with a corresponding lowest memristive state ramping voltage value $V_{min}$. For illustration, it may be distinguished between an ultra-large voltage range ($V>V_{max}$), a large voltage range ($V_{min}<V<V_{max}$) and a small voltage range ($V<V_{min}$). In the case that the ramp voltage is smaller than the lowest memristive state ramping voltage value $V_{min}$, the slope of the current/voltage curve does not change when the bias is ramped back from $V_{min}$ to 0 (2 in FIG. 3F). In the small bias range, the reading curve (branch 2 in FIG. 3F) is superimposed on the writing curve (branch 1 in FIG. 3F) when the voltage is ramped back from the largest voltage in the ultra-large bias range to the largest voltage of the large bias range. In the case that the ramping voltage is larger than the highest memristive state ramping voltage value $V_{max}$, the slope of the current/voltage curve does not change when the voltage is ramped back from $+V_{ramp}$ to $V_{max}$ (branch 13 in FIG. 3F). In the ultra-large bias range, the reading curve (branch 13 in FIG. 3F) is superimposed on the writing curve when the voltage is ramped back from the largest voltage in the ultra-large bias range to the largest voltage of the large bias range. In the case that the ramp voltage lies between $V_{max}$ and $V_{min}$, then the slope of the current/voltage curve changes if the voltage is ramped back to $V_{min}$. The reading curves (branches 5, 8, and 11 in FIG. 3F) are not superimposed on the writing curve. Within the same quadrant (e.g., the first or the third quadrant), the memristive states (from $m_s=2$ to $m_s=M-1$) between the lowest memristive state, $m_s=1$, and the highest memristive state, $m_s=M$, may be referred to as intermediate memristive states. When applying a voltage having a voltage value greater than the voltage value $V_{max}$ corresponding to the highest memristive state, $m_s=M$, the memristive structure 100 may be set into the highest memristive state. In this case, the writing curve 302 may, at the voltage value corresponding to the highest memristive state, (e.g., slowly) change from the linear behavior into saturation (hence a substantially stable current). It is understood that by further increasing the voltage value beyond that ultra-large bias range, the current value may increase significantly due to the diode character of the memristive structure 100 (hence, a breakthrough of the Schottky-type diode).

As described herein, each memristive state (thus, each data point, I(V)), on the writing curve 302) may be associated with (e.g., unambiguously assigned to) a corresponding resistance-characteristic curve (branch 2 in the case of the branch 1 writing curve or branch 4 in the case of the branch 3 writing curve) (as understood up to the highest memristive state). This resistance-characteristic curve may be characteristic for a corresponding memristive state (hence characteristic for the resistance corresponding to the memristive state). A resistance-characteristic curve may be understood as a respective characteristic LRS curve for each memristive state. FIG. 3A schematically shows a first resistance-characteristic curve 304 (e.g., a first LRS curve) corresponding to a first memristive state, a second resistance-characteristic curve 306 (e.g., a second LRS curve) corresponding to a second memristive state different from the first memristive state, and a third resistance-characteristic curve 308 (e.g., a third LRS curve) corresponding to a third memristive state different from both, the first memristive state and the second memristive state. FIG. 3D shows the writing curve 302 (HRS curve) with different maximum ramping voltages (6 V, 6,5 V, 7 V, 7,5 V, and 8 V) and different reading curves (hence, respective LRS curve) for five different memristive states.

Thus, depending on the memristive state the memristive structure resides in, the IV-characteristic of branch 2 may follow the writing curve 302 (in the case of changing the memristive state) or may follow the resistance-characteristic curve corresponding to a current memristive state (in the case of keeping (i.e., not changing) the memristive state), e.g. in the large bias range where writing branch 1 and reading branch 2 are superimposed. Hence, a measured IV-characteristic may depend on a current memristive state of the memristive structure 100. To program a memristive state and/or to determine the current memristive state of the memristive structure 100, a (e.g., measurement) signal may be applied to the memristive structure 100. For example, the measurement signal may be a measurement pulse (e.g., a voltage pulse or a current pulse).

As detailed above, herein the measurement source/input signal (in some aspects referred to as measurement signal) is described as a time dependent voltage pulse for illustration and the measurement output signal is described as corresponding time dependent current pulse for illustration. Exemplary courses and shapes of one or more voltage pulses are shown in FIG. 4A and FIG. 4D to FIG. 4F. For simplicity, the voltage pulses are shown rising from and falling to 0 V as base voltage. Furthermore, for simplicity we may assume that the writing voltage lies in the intermediate bias range, i.e. $V_{min}=0$ and $V_{write}<V_{max}$. It is understood that the base voltage may have any suitable voltage value. According to some aspects, the voltage may be applied to one of the first electrode 110 or the second electrode 120 and that the base voltage may be applied to the other one of the first electrode 110 or the second electrode 120. According to other aspects, a respective voltage (different from the base voltage) may be applied the first electrode 110 and to the second electrode 120. In this case, the voltage values of herein described voltages (e.g., the maximum positive write voltage value, $+V_{write,max}$, the maximum negative write voltage value, $+V_{write,max}$, etc.) may be voltage drops over the memristive structure 100 (hence a voltage difference between the voltage applied at the first electrode 110 and the voltage applied at the second electrode 120).

Figure 4A:
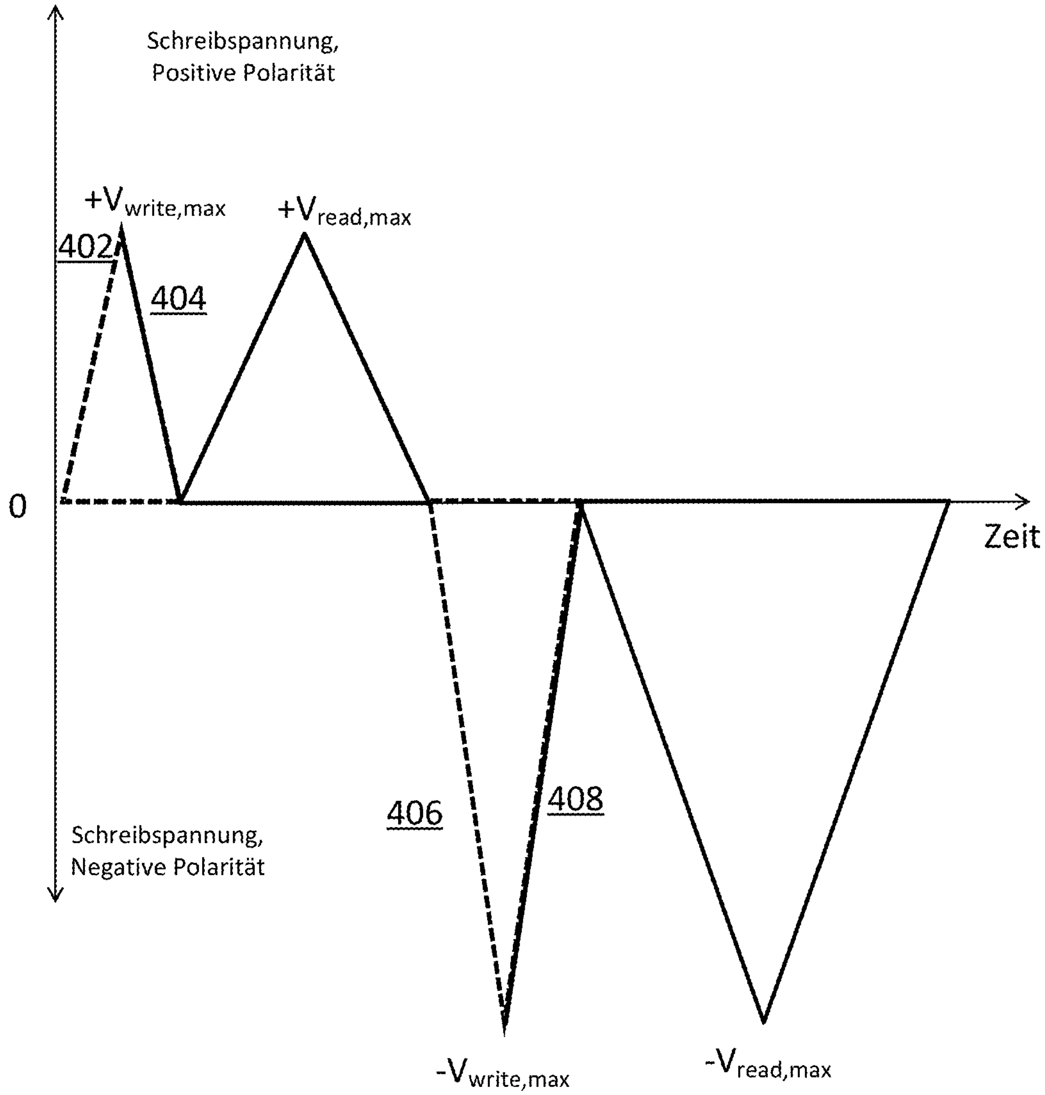
FIG. 4A shows a writing-reading scheme according to various aspects.
Figure 4B:
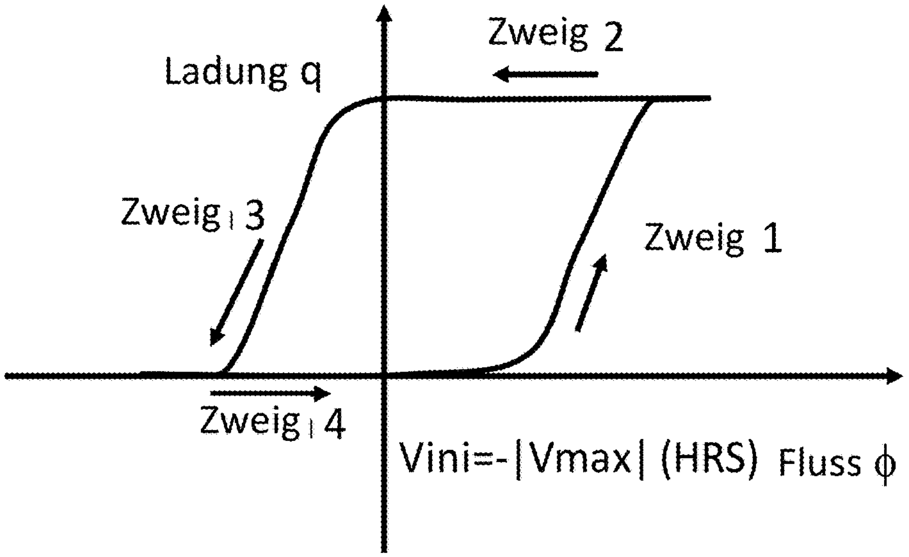
FIG. 4B and FIG. 4C each show a respective charge/flux curve which corresponds to a memristive state of a memristive structure according to various aspects.
Figure 4C:
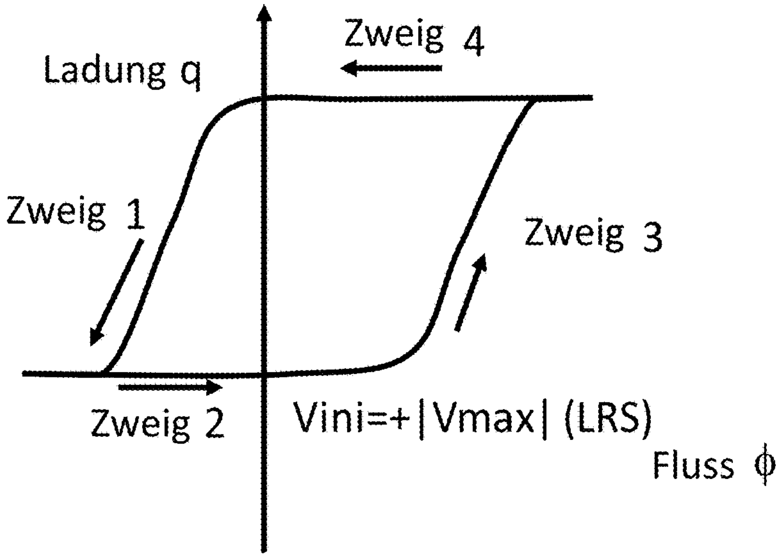
Figure 4D:
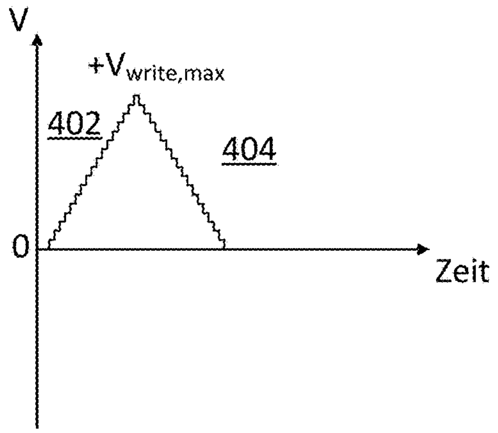
FIGS. 4D to 4F each shows a respective exemplary voltage pulse used for writing a memristive structure.
Figure 4E:
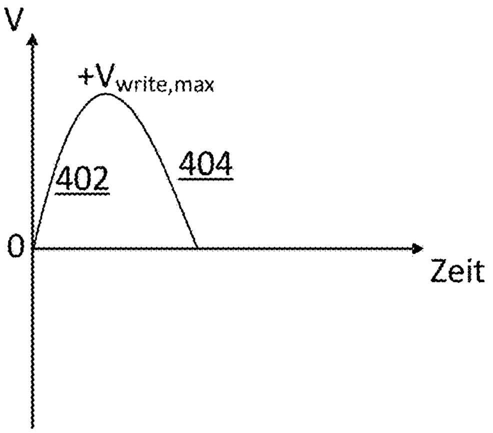
Figure 4F:
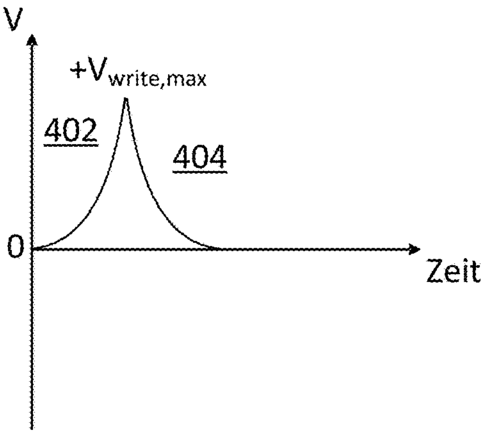
Figure 5A:
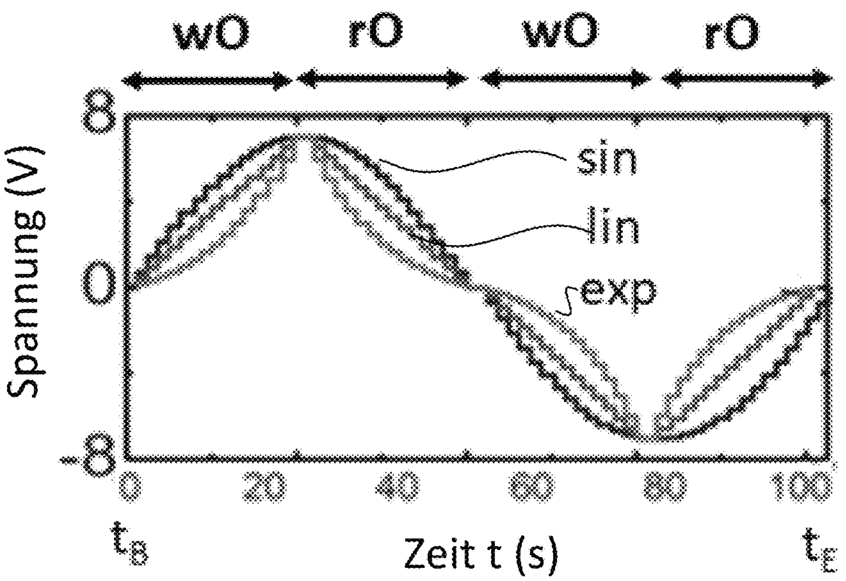
FIG. 5A shows a time dependent voltage and FIGS. 5B and 5C each a time dependent current of a memristive structure with a hysteresis on positive current/bias range and negligible hysteresis in negative current/bias range.
Figure 5B:
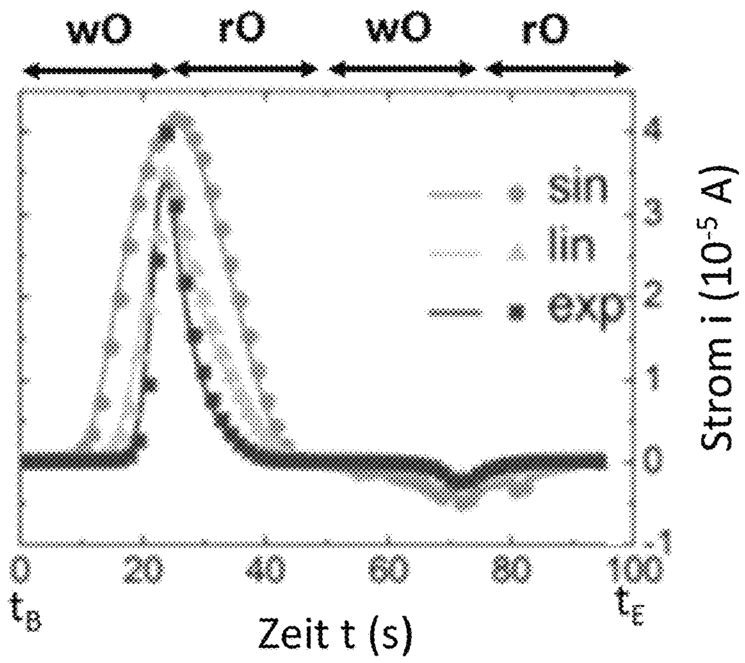
FIG. 5D shows a corresponding charge/flux curve.
Figure 5C:
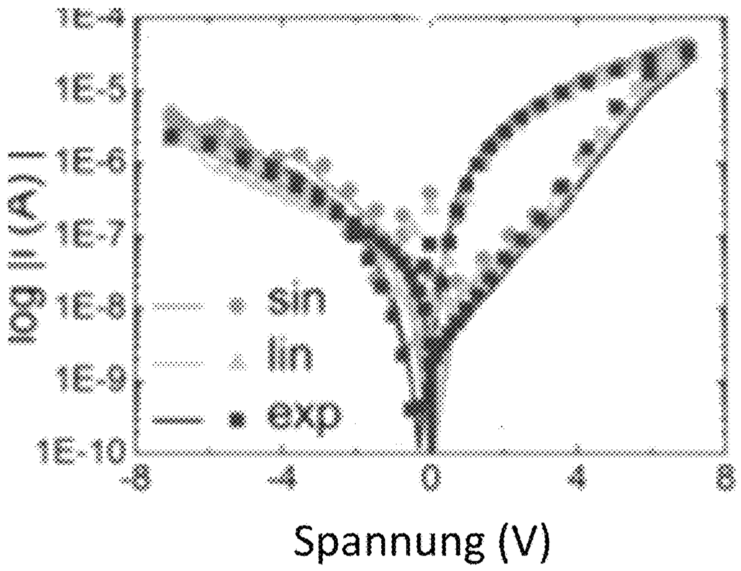

The voltage time curve of a memristive structure with a hysteresis on positive current/bias range and negligible hysteresis in negative current/bias range is shown in FIG. 5A on a logarithmic current scale and in FIG. 5B on a linear current scale for a stepwise triangular course (see, for example, FIG. 4D), a sinusoidal course (see, for example, FIG. 4E), or an exponentially falling/rising course (see, for example, FIG. 4F). Within the same ramping bias range in the same ramping time, the charge and the flux is largest for the sinusoidal course and smallest for the exponential course. In FIG. 5C the corresponding charge/flux curve is plotted after initialization of the memristive structure in high resistance state (HRS). The memristive state (memristance) changes during writing operation (wO). The memristance does not change during reading operation (rO). The polarity of ramp voltage determines whether the ramp voltage is a write voltage or a read voltage. As shown in FIG. 5A if, after initialization of a memristive structure 100, the memristive structure 100 is in high resistive state (HRS), then the current/voltage curve of a positive ramp voltage between $+V_{min}$ and $+V_{max}$ is a write branch with an initial memristive state and with a final memristive state. We relate the corresponding charge/flux curve with the change of memristive state during write operation (wO) and with no change of memristive state during reading operation (rO). Two write operations are applied: from t=0 s to t=25 s and from t=50 s to t=75 s. Two reading operations are applied: from t=25 s to t=50 s and from t=75 s to t=100 s. The time dependent voltage is shown in FIG. 5A. The time dependent current is shown in FIG. 5B. The corresponding flux (φ) is determined by integrating the time dependent voltage ($\Phi=\int_{t_B}^{t_E} V(t)dt$) and the corresponding charge (q) is obtained by integrating the corresponding current ($q=f_{t_B}^{t_E}(t)dt$). The integration time runs from the beginning of the time dependent current/ voltage ramping ($t_B$) to the end of the time dependent current/voltage ramping ($t_E$). Two schematic charge/flux curves are shown in FIG. 4B and FIG. 4C with branch 1 and branch 3 in write operation (wO) and with branch 2 and branch 4 in reading operation (rO). The two write operations (wO) and the two reading operations are also indicated in FIG. 5A and in FIG. 5B and in FIG. 5C. The memristive state changes when the slope of the charge/flux curve changes. The memristive state does not change when the slope of the charge/flux curve does not change. We may use the slope of the charge/flux curve to relate the change of slope of the charge/flux curve during write operations (wO) with a change of memristive state during write operation and to relate the zero-very small slope of the charge/flux curve with no-very small change of the memristive state during reading operations (rO). Any point on the charge/flux curve at time t is related with a memristive state at time t. After initialization of the memristive structure into high resistance state (HRS) at the beginning time t=tB the charge/flux curve of all three different time dependent ramping voltages starts at the same charge/flux point (Q,Φ)=(0,0). During write operation from t=tB to t=25 s the flux and charge is larger for the sinusoidal input signal than the flux and charge of the linear input signal of the same maximum voltage $V_{max}$ (FIG. 5A). And the charge and flux of the linear input signal is larger than the charge and flux of the exponential input signal of the same maximum voltage $V_{max}$ (FIG. 5A). The different charge/flux point at the end of the first write operation (t=25 s) is related with the different integral of the time dependent voltage. For a given $V_{max}$ there is always a minimum time a given voltage has to be applied or for a given maximum current Imax there is always a maximum time a given current has to be sourced to reach the maximum possible point on the charge/flux curve.

The memristive element can be written by a write circuit into a memristive state of a plurality of memristive states by a write operation (wO). The memristive state to be written may be defined by a change in flux or change in charge in the memristive element between a high resistance state and a low resistance state. The write operation may cause a flux change in the memristive element with the flux change being representative of the memristive state to be written. The write operation may cause a charge change in the memristive element, the charge change being representative of the memristive state to be written.

Every point on the charge/flux curve corresponds to a memristive state of the memristive structure: the memristance (M). The memristance is determined by the derivative of the flux with respect to charge $$\left(M = \frac{d\Phi}{dQ}\right).$$

A memristive element can be written by a write circuit into a memristive state of a plurality of memristive states (e.g., from an initial memristive state of a plurality of memristive states into a final memristive state of a plurality of memristive states) by a write operation (wO), wherein the memristive state has a corresponding point on the charge/flux curve. The characteristic flux corresponds to a characteristic voltage drop over the memristive element applied for a saturation time. The characteristic charge may correspond to a characteristic current through the memristive element applied for a saturation time. The write operation (wO) may cause a write voltage drop over the memristive element that is greater than the characteristic voltage drop associated with the memristive state for a total write time that is shorter than the saturation time; or it causes a write current through the memristive element that is higher than the characteristic write current associated with the memristive state for a total write time that is shorter than the saturation time.

Figure 5D:
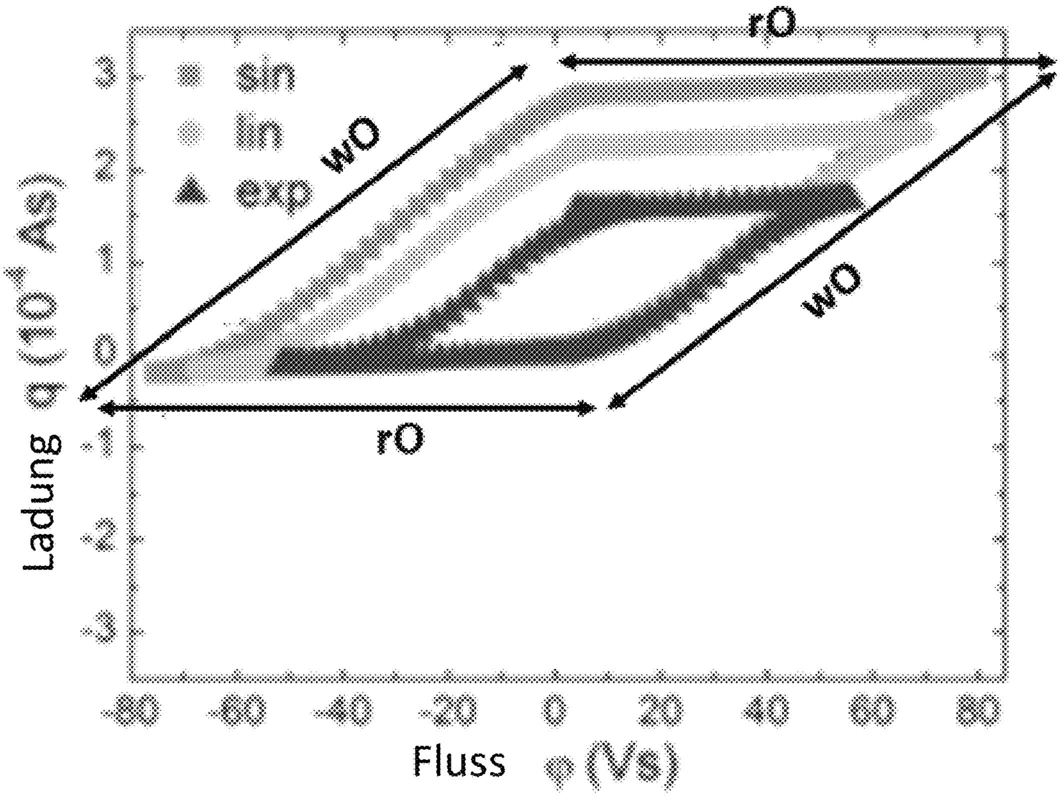

The state (memristance) may be determined by the derivative of the flux with respect to charge. As illustrated in FIG. 5D, in the case that the memristive structure is initialized into high resistance state (HRS), then the memristive state is changed during write operations (wO) and the memristive state does not change during read operations (rO).

The polarity of a ramp voltage may constitute whether the ramp voltage is a write voltage or a read voltage. As shown in FIG. 4A if, after initialization of a memristive structure 100, the memristive structure 100 is in the high resistive state (HRS), then the current/voltage curve of a positive ramp voltage between $+V_{min}$ and $+V_{max}$ is a write branch with a final state which depends on the charge/flux curve. A schematic charge/flux curve is shown in FIG. 4B and in FIG. 4C. Any point on the charge/flux curve may correspond to a memristive state of the memristive structure. The memristive state (e.g., the memristance) may be determined by the derivative of the flux with respect to charge. As illustrated in FIG. 4B, in the case that the memristive structure 100 is initialized into the high resistance state (HRS), then the state is changed in branch 1, the state does not change in branch 2, the state is changed in branch 3, and the state is not changed in branch 4. As illustrated in FIG. 4C, in the case that the memristive structure is initialized into the low resistance state (LRS), then the state is changed in branch 1, the state does not change in branch 2, the state is changed in branch 3, and the state is not changed in branch 4.

A voltage pulse may have a linear triangular course (see, for example, FIG. 4A), a stepwise triangular course (see, for example, FIG. 4D), a sinusoidal course (see, for example, FIG. 4E), or an exponentially falling/rising course (see, for example, FIG. 4F), as examples. It is understood that any other course and/or shape may be used. Even though these voltage pulses are described as write signals, it is understood that a read signal may have a similar course and/or shape. A voltage pulse may be characterized by a rising edge from the base voltage (e.g., 0 V) to a maximum write voltage value and a falling edge from the maximum read voltage value to the base voltage (e.g., 0 V). For example, a first voltage pulse may be characterized by a rising edge 402 from the base voltage (e.g., 0 V) to a maximum positive write voltage value, $+V_{write,max}$, and a falling edge 404 from the maximum positive read voltage value, $+V_{write,max}$, to the base voltage (e.g., 0 V). A second voltage pulse may be characterized by a rising edge 406 from the base voltage (e.g., 0 V) to a maximum negative read voltage value, $-V_{write,max}$, and a falling edge 408 from the maximum negative read voltage value, $-V_{write,max}$, to the base voltage (e.g., 0 V). A rising edge may be associated with (e.g., continuously) increasing (e.g., ramping) a voltage up to up to the maximum (positive or negative) voltage value (different from zero volts). According to various aspects, only one voltage pulse (e.g., the first voltage pulse or the second voltage pulse) may be applied. According to other aspects, the first voltage pulse and the second voltage pulse may be (in any order) applied subsequent to each other. In this case, the first voltage pulse and the second voltage pulse may be (in any order) applied directly subsequent to each other or there may be a time delay between them.

As described herein, a measured IV-characteristic (branch 2 and branch 4) may depend on a current (i.e., an actual or present) memristive state of the memristive structure 100. This memristive state of the memristive structure 100 may depend on a prior applied measurement signal (in the present example a prior applied voltage signal). The memristive state may be set by applying a programming/writing voltage pulse. For simplicity, in the following, the maximum voltage (in some aspects referred to as programming voltage) of the programming voltage pulse is considered as defining the memristive state the memristive structure 100 is set into. However, it is noted that the memristive state into which the memristive structure 100 is set by applying the programming voltage pulse may also depend on other aspects, such as the shape and/or course of the programming voltage or current pulse, i.e. V=V(t) or I=I(t).

Hence, the current/voltage (I/V) write characteristics of the memristive structure 100 (branch 1 in quadrant 1 and branch 3 in quadrant 3) only depend on the bias/current time profile. According to various aspects, a flux (time integral over write voltage) and/or a charge (time integral over write current) may be used to describe the memristive state of the memristive structure 100 in dependence on the applied voltage/current time profile. The current/voltage curve of a memristive structure with a hysteresis on positive current/bias range and negligible hysteresis in negative current/bias range is shown in FIG. 5A on a logarithmic current scale and in FIG. 5B on a linear current scale for a stepwise triangular course (see, for example, FIG. 4D), a sinusoidal course (see, for example, FIG. 4E), or an exponentially falling/rising course (see, for example, FIG. 4F). Within the same ramping bias range in the same ramping time, the charge and the flux is largest for the sinusoidal course and smallest for the exponential course. In FIG. 5C the corresponding charge/flux curve is plotted after initialization of the memristive structure in the high resistance state (HRS). The emristive state (memristance) changes in branch 1 and in branch 3. The memristance does not change in branch 2 and in branch 4.

Figure 6:
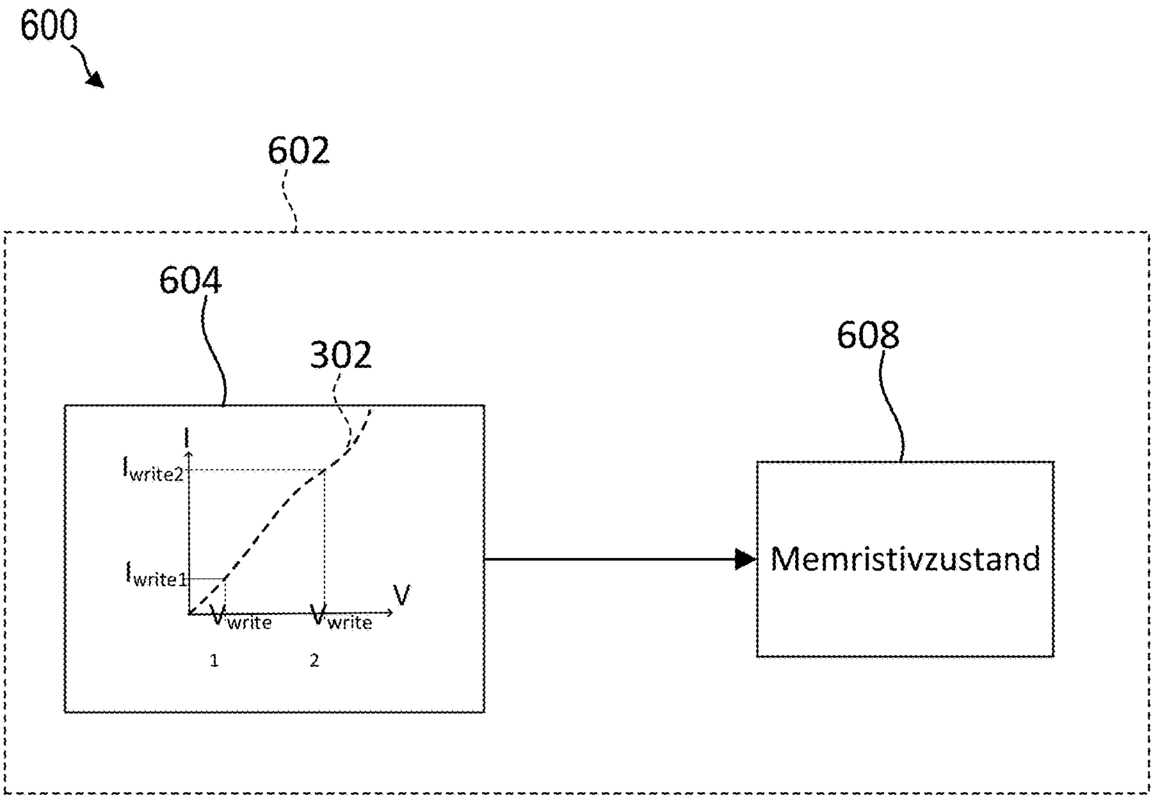
FIG. 6 and FIG. 7 each shows a respective writing scheme for writing a memristive state of a memristive structure.

FIG. 6 shows a writing scheme 600 for (e.g., non-destructively or destructively) writing a memristive state 608 of the memristive structure 100 according to various aspects. A write circuit 602 (in some aspects referred to as write circuit) may be configured to write the memristive state 608 of a respective memristive structure (e.g., a memristive structure of a plurality of memristive structures in a crossbar array). The write circuit 602 may be configured to apply a write signal (e.g., a write voltage pulse or a write current pulse, as described herein) to the memristive structure 100.

As described herein, the memristive state 608 may be written (e.g., the memristive structure 100 may be set into a memristive state, $m_s$ ($+V_{program}$)) with a programming voltage value, $V_{program}$, equal to or greater than the minimum ramp voltage, $+V_{min}$, of the write voltage pulse. For a memristive structure initialized in the (positive) high resistance state (HRS) the memristance after applying the programming voltage lies on branch 1 (see, for example, FIG. 4B) and can be determined by the derivative of the flux with respect to the charge. For a memristive structure initialized in the (positive) low resistance state (LRS) the memristance after applying the programming voltage lies on branch 1 (see, for example, FIG. 4C) and can be determined by the derivative of the flux with respect to the charge.

According to various aspects, the write circuit 602 may (in 604) be configured to apply a programming voltage value, $V_{program}$, or a programing current, $I_{program}$, and any memristive state on branch 1 or branch 3 may be written. In the following, the writing is described exemplarily for exactly two different programing voltages; however, it is noted that any number of different programming voltages values may be used. The programming may have reached the final memristive state in the case that during application of the programming voltage the memristance of the memristive system does not change further. The write circuit 602 may be configured to measure the respective write current value at the (at least) two different voltage values within the same write voltage pulse and/or within two separate (e.g., subsequent) write voltage pulses. According to an example, the write circuit 602 may be configured to measure a first read current value, $I_{write1}$, at a first write voltage value, $V_{write1}$, and a second write current value, $I_{write2}$, at a second write voltage value, $V_{write2}$, during applying a single write voltage pulse. According to another example, the write circuit 602 may be configured to measure the first write current value, $I_{write1}$, at the first write voltage value, $V_{write1}$, during applying a first write voltage pulse and to measure the second write current value, $I_{write2}$, at the second write voltage value, $V_{write2}$, during applying a second write voltage pulse. The first write voltage value, $V_{write1}$, may be any voltage value between the base voltage (e.g., 0 V) and the maximum write voltage, $V_{write,max}$, of the first write voltage pulse and the second write voltage value, $V_{write2}$, may be any voltage value between the base voltage (e.g., 0 V) and the maximum write voltage, $V_{write,max}$, of the second write voltage pulse as long as the second write voltage value, $V_{write2}$, is different from the first write voltage value, $V_{write1}$. The maximum write voltage, $V_{write,max}$, of the first write voltage pulse and the maximum write voltage, $V_{write,max}$, of the second write voltage pulse may have the same or different voltage values. The application of a write voltage pulse and the determination (e.g., measurement) of a respective write current value (e.g., by measuring a voltage responsive to integrating a current) at two or more (e.g., different) write voltage values may be referred to as a write operation. Hence, the write circuit 602 may be configured to determine (e.g., measure) the first write current value, $I_{write1}$, via a first measurement and the second write current value, $I_{write2}$, via a second measurement during a single read-out operation. As described herein, a current value may be determined by directly measuring a current value or by measuring a voltage value representing the current value. For example, one or more integrators may integrate the current (over time) and output a voltage value representing the integrated current. The current value may then be determined using the voltage value representing the integrated current. According to other aspects, as an alternative to using the IV-characteristics described herein, a functional correlation between the voltage representing the integrated current and the write voltage may be used.

In the case that the write voltage of the read voltage pulse is in the range between the base voltage (e.g., 0 V) and the programming voltage value, $+V_{program}$, both, the rising edge 402 and the falling edge 404 of the write voltage pulse cause a current according to the writing curve 302. Hence, the first write current value, $I_{write1}$, and/or the second read current value, $I_{write2}$, may be measured on the rising edge 402 and/or the falling edge 404 of the write voltage pulse. According to an example, both, the first write current value, $I_{write1}$, and the second write current value, $I_{write2}$, may be measured during the rising edge 402 or the falling edge 404 of the write voltage pulse. According to another example, the first write current value, $I_{write1}$, may be measured during the rising edge 402 of the read voltage pulse and the second write current value, $I_{write2}$, may be measured during the falling edge 404 of the write voltage pulse, or vice versa.

In the case of a programming following a read step with the programming voltage being larger than the maximum read voltage, both, the first write current value, $I_{write1}$, and the second write current value, $I_{write2}$, may be measured during the rising edge 402 of the read voltage pulse (since, during the falling edge 404, the IV-characteristic may follow the resistance-characteristic curve of the newly set memristive state, $m_s$ ($+V_{write,max}$)).

As described herein, the resistance-characteristic curve may be characteristic for a respective memristive state, thereby allowing to determine the memristive state based on information regarding (e.g., by knowing) the resistance-characteristic curve (such as the first current value and the second current value). The writing curve may be substantially similar for independent of the applied write voltage value but may depend on the flux of the voltage pulse.

The write circuit 602 may be configured to determine the memristive state 608 using the measured write current time and the measured voltage time profile during write and calculating flux and charge and determining the memristance at the end of the programming.

According to various aspects, the writing scheme may include a reading circuit (e.g., a read circuit and/or write circuit) configured to read (e.g., read) the memristive structure 100 in a memristive state (e.g., by applying a read voltage).

Figure 7:
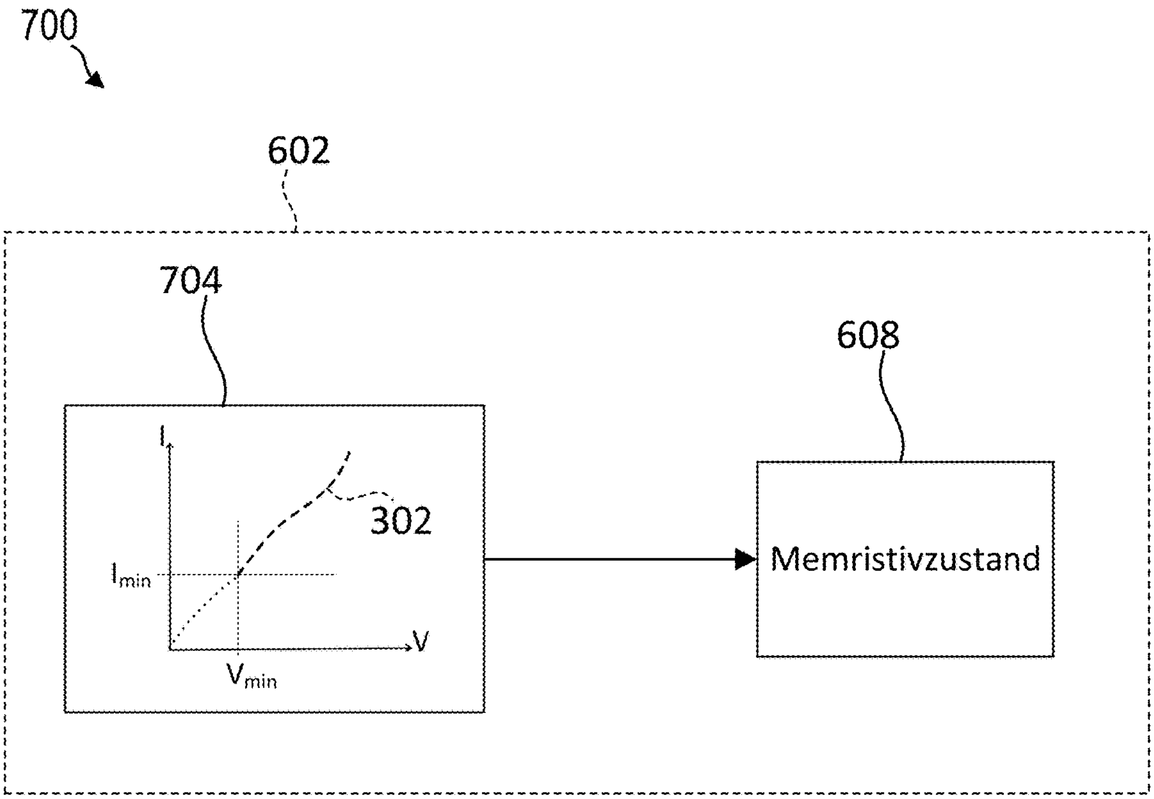

FIG. 7 shows a write scheme 700 for writing the memristive state 608 of the memristive structure 100 (i.e., by changing the memristive state) according to various aspects. According to some aspects, a first write current value, $I_{write1}$, and the second write current value, $I_{write2}$, may be measured during the rising edge 402 of the write voltage pulse at the first voltage value, $V_{write1}$, and the second voltage value, $V_{write2}$, less than a minimum write voltage, $V_{min}$. The minimum write voltage, $V_{min}$, may substantially correspond to the programing voltage, $+V_{program}$. Hence, voltage values higher than the minimum write voltage, $V_{min}$, may change the memristive state of the memristive structure 100. Thus, the first write current value, $I_{write1}$, and the second write current value, $I_{write2}$, may be measured during the rising edge 402 of the read voltage pulse at the writing curve 302 associated with the memristive state, $m_s$ ($+V_{program}$) priorly set by applying the programming voltage, $+V_{program}$. Additionally or alternatively, the write circuit 602 may be (e.g., in 704) configured to determine the minimum write voltage, $V_{min}$ (and optionally also the minimum write current, $I_{write}$, corresponding to the minimum write, $V_{min}$). For example, the write circuit 602 may (e.g., continuously) measure the current through the memristive structure 100 as a function of the applied voltage and may determine the change of the slope of the charge/flux curve. Since the minimum write voltage, $V_{write}$, may substantially correspond to the programing voltage, $+V_{program}$, the write circuit 602 may be configured to determine the memristive state as $m_s$ ($+V_{des}$).

In the case of a programming voltage smaller than $V_{min}$, the memristance state may not be changed. Hence, in order to apply a programming voltage which does not change the memristive state of the memristive structure, the maximum write voltage, has to be equal to the $V_{min}$ of the predefined programming voltage range. This may limit both, the predefined programming voltage range and the range for the maximum read voltage, $V_{read,max}$. Hence, a limited predefined programming voltage range may also limit the number of possible memristive states the memristive structure 100 can be set into. A programming voltage which does not change the memristive state can be applied multiple times and/or within different parts of the write voltage pulse (e.g., during the rising edge 402 and the falling edge 404) and/or within different write voltage pulses. A programming voltage which does not change the memristive state can only be found at the falling edge 404. This allows to increase the number of possible memristive states by increasing the range of programming voltages which change the state.

Figure 8A:
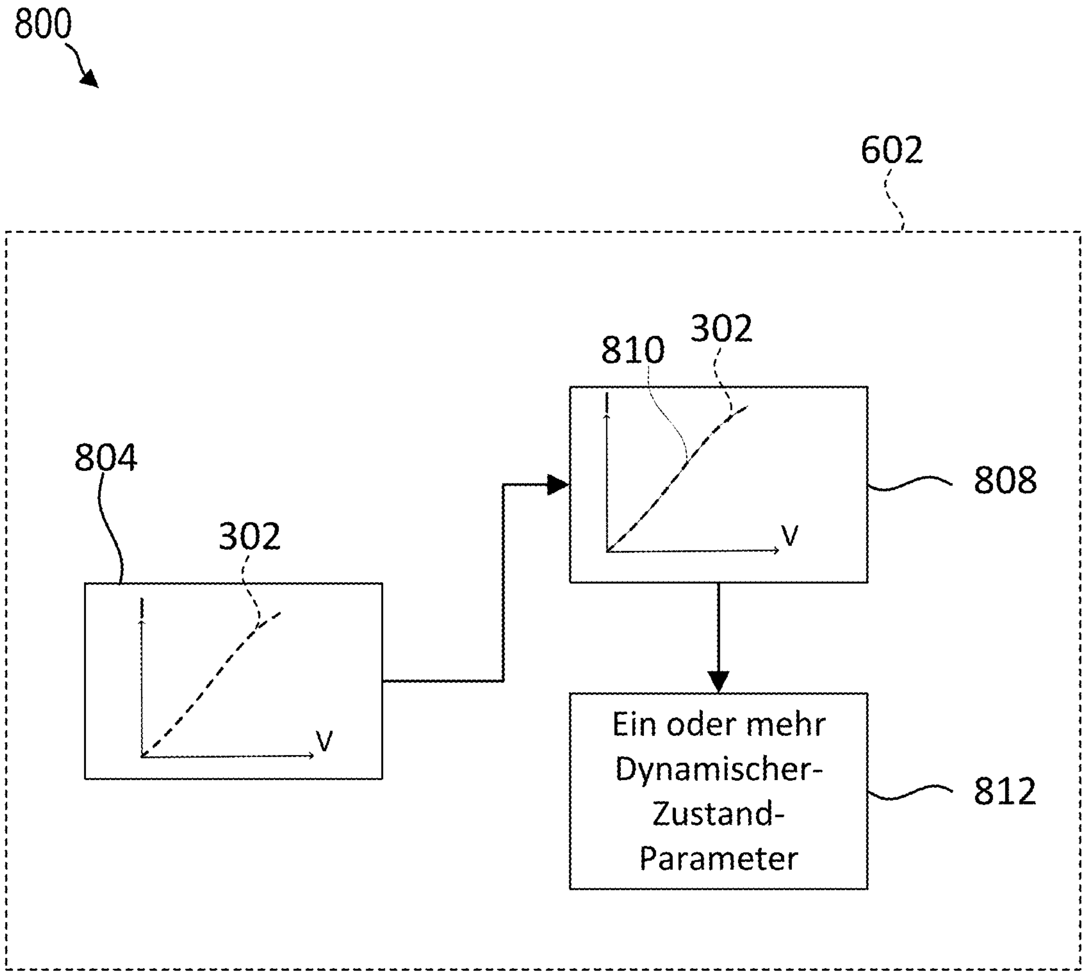

FIG. 8A shows a writing scheme 800 which does not change the memristance of the memristive structure 100 according to various aspects. The write circuit 602 may be configured to determine (e.g., measure) a current/voltage (IV) characteristic of the memristive element 100. For example, the write circuit 602 may be configured to determine (e.g., measure) (in 804) at least a part (e.g., within a predefined voltage range) of the writing curve 302 corresponding to write branch 1 or the write branch 3 of the memristive structure 100. The write circuit 602 may be configured to measure the (e.g., part of the) writing curve 302 by measuring a respective current value at a plurality of voltage values (e.g., at predefined voltage steps or in predefined time steps). For example, the write circuit 602 may be configured to apply a write voltage sequence to the memristive structure 100 to cause a corresponding current sequence through the memristive structure 100 and to measure (e.g., in predefined time steps or predefined voltage steps) current values of the caused corresponding current sequence.

According to various aspects, the write circuit 602 may be configured to fit (in 808) the (e.g., measured) writing curve 302 (e.g., to determine a fitting curve 810). The write circuit 602 may be configured to fit the writing curve 302 by a physical model. The physical model may be based on one or more dynamic state parameters. The write circuit 602 may be configured to determine a respective dynamic state parameter value for at least one (e.g., each) of the one or more dynamic state parameters. Hence, the write circuit 602 may be configured to determine one or more dynamic state parameter values 812. Even though the fitting of the writing curve 302 and the determination of the one or more dynamic state parameter values is described herein as being carried out by the write circuit 602, it is understood that any other kind of processor may be used to carry these processes.

According to some aspects, a characteristic curve corresponding to branch 2 and/or branch 4 may be measured. This characteristic curve may be fitted according to:

$$V = n_0 \frac{k_B T}{q} \log\left(\frac{I}{I_S} + 1\right)\left(1 + K \frac{k_B T}{q} \log\left(\frac{I}{I_S} + 1\right)\right) + I \cdot R_S,$$

wherein $I_S$, $R_S$, $n_0$ and K are static state parameters. $I_S$, may be the reverse saturation current, $R_S$ may be the series resistance, no and K may be quality representing factors. A "static state parameter", as described herein, may describe (e.g., physical, electrical, chemical, etc.) properties (or other manufacturing-related properties) of a memristive structure. Thus, the static state parameter(s) may be correlated to (memristor) properties of the memristive structure. A "static state parameter value", as described herein, may a value of such a static state parameter. The static state parameter value may be indicative of (e.g., unambiguously assigned to) the memristive state, $m_s$, the memristive structure resides in. Hence, the static state parameter(s) may characterize the memristive states of the memristive structure and a value of the static state parameter(s) (i.e., the static state parameter value(s)) may be "static" for a respective memristive state.

A "dynamic state parameter", as described herein, may describe (e.g., physical, electrical, chemical, etc.) properties (or other manufacturing-related properties) of a memristive structure. Thus, the dynamic state parameter(s) may be correlated to (memristor) properties of the memristive structure. A "dynamic state parameter value", as described herein, may a value of such a dynamic state parameter. The dynamic state parameter value may be indicative of (e.g., unambiguously assigned to) the memristive state, $m_s$, the memristive structure resides in. Hence, the dynamic state parameter(s) may characterize the memristive states of the memristive structure and a value of the dynamic state parameter(s) (i.e., the dynamic state parameter value(s)) may be "dynamic" for a respective memristive state.

According to various aspects, the physical model (e.g., used for fitting the writing curve 302) may be given (for branch 1) after initialization in (positive) high resistance state (HRS) by:

$$V = n_1 \frac{k_B T}{q} \log\left(\frac{I}{E[I]} + 1\right)\left(1 + K_1 \frac{k_B T}{q} \log\left(\frac{I}{E[I]} + 1\right)\right) + V2$$

with the voltage V applied between top electrode and bottom electrode or with the current sourced between top electrode and bottom electrode. $V=V_1+V_2$ and with $$I = -I_{s2,Branch4}\left(e^{\frac{-qV_2}{k_B T(n_2+K_2V_2)}} - 1\right) + \frac{V_2}{F[I]}$$

and may be given (for branch 3) after initialization in (positive) low resistance (LRS) by:

$$V = -n_2 \frac{k_B T}{q} \log\left(\frac{I}{G[I]} + 1\right)\left(1 + K_2 \frac{k_B T}{q} \log\left(\frac{I}{G[I]} + 1\right)\right) + V1$$

with $V=V_1+V_2$ and with $$I = +I_{s1,Branch2}\left(e^{\frac{+qV_1}{k_B T(n_1-K_1V_1)}} - 1\right) + \frac{V_1}{H[I]}$$

wherein: V may be the applied read voltage, I may be the current through the memristive structure responsive to applying the read voltage, $k_B$ may be the Boltzmann constant, $I_{S2}$ may be the saturation current of the top electrode in forward direction (positive bias applied to top electrode), $I_{S2}$ may be the saturation current of the bottom electrode in reverse direction (negative bias applied to top electrode), T may be the temperature of the memristive structure, q may be the electron charge, and E[I], F[I], G [I], and H[I] each may be a respective dynamic state parameter by $E[I]=I_{s1}[I]$, $F[I]=R_{s2}[I]$, $G[I]=I_{s2}[I]$.

According to various aspects, the physical model (e.g., used for fitting the writing curve 302) may be given (for branch 1) after initialization in (positive) high resistance state (HRS) by:

$$V = n_1 \frac{k_B T}{q} \log\left(\frac{I}{I_{s1}[I]} + 1\right)\left(1 + K_1 \frac{k_B T}{q} \log\left(\frac{I}{I_{s1}[I]} + 1\right)\right) + V2$$

with $V=V_1+V_2$ and with $$I = -I_{s2,Branch4}\left(e^{\frac{-qV_2}{k_B T(n_2+K_2V_2)}} - 1\right) + \frac{V_2}{R_{s2}[I]}$$

and may be given (for branch 3) after initialization in (positive) low resistance (LRS) by:

$$V = -n_2 \frac{k_B T}{q} \log\left(\frac{I}{I_{s2}[I]} + 1\right)\left(1 + K_2 \frac{k_B T}{q} \log\left(\frac{I}{I_{s2}[I]} + 1\right)\right) + V1$$

with $V=V_1+V_2$ and with $$I = +I_{s1,Branch2}\left(e^{\frac{+qV_1}{k_B T(n_1-K_1V_1)}} - 1\right) + \frac{V_1}{R_{s1}[I]}$$

wherein: V may be the applied read voltage, I may be the current through the memristive structure responsive to applying the read voltage, $k_B$ may be the Boltzmann constant, T may be the temperature of the memristive structure, q may be the electron charge, and $I_{S1}[I]$, $R_{S2}[I]$, $I_{S2}[I]$, and $R_{S1}[I]$ each may be a respective dynamic state parameter. $I_{S1}[I]$ may be the saturation current of the top electrode in forward direction (positive bias applied to top electrode). $R_{S2}[I]$ may be the depletion resistance of the bottom electrode in reverse direction (positive bias applied to top electrode). $I_{S2}[I]$ may be the saturation current of the bottom electrode in reverse direction (negative bias applied to top electrode). $R_{S1}[I]$ may be the depletion resistance of the top electrode in forward direction (negative bias applied to top electrode). Hence, in this example, the physical model may include four dynamic state parameters. It is understood that the dynamic state parameters do change when the current/voltage curve of branch 1 and of branch 3 are measured. The dynamic state parameters $I_{S1}[I]$ and $I_{S2}[I]$ will depend on the current and may be approximately described in dependence on the current in the three different voltage ranges: a small bias range, an intermediated voltage range, and a large voltage range.

An exemplary physical model for branch 1 and dynamic state parameters respectively determined, using this physical model, for the memristive structure 252 (see FIG. 2G), the memristive structure 254 (see FIG. 2H), and the memristive structure 256 (see FIG. 2I) shown in FIG. 2J. An exemplary physical model for branch 3 and dynamic state parameters respectively determined, using this physical model, for the memristive structure 252 (see FIG. 2G), the memristive structure 254 (see FIG. 2H), and the memristive structure 256 (see FIG. 2I) shown in FIG. 2K.

Figure 8B:
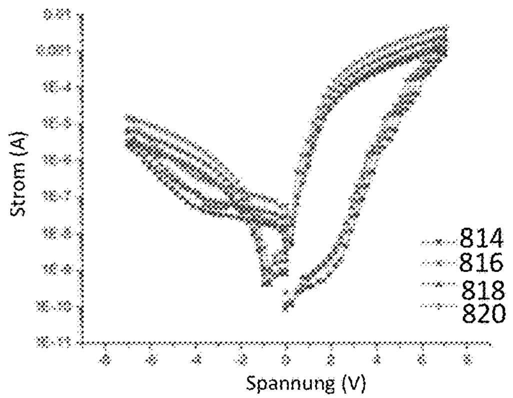
Figure 8D:
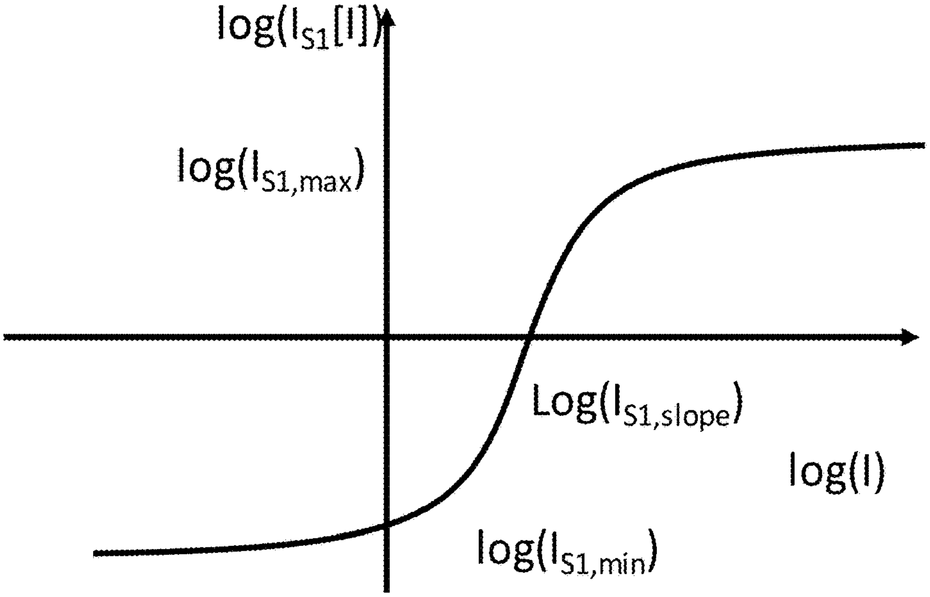
FIG. 8D shows determined dynamic state parameters as a function of the memristive state of a memristive structure.
Figure 8D:
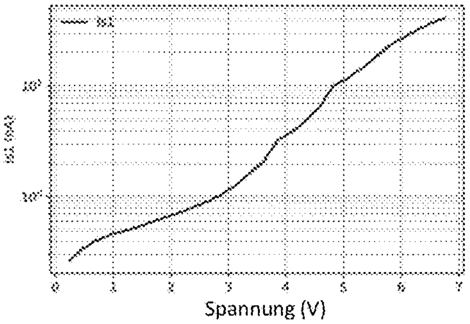
Figure 8D:
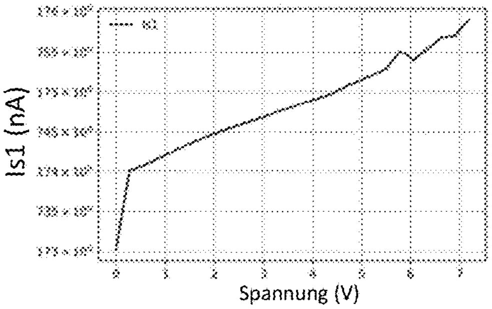
Figure 8D:
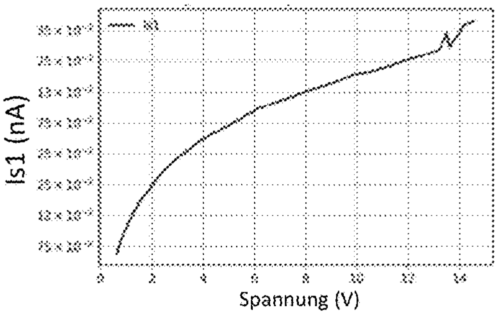
Figure 8E:
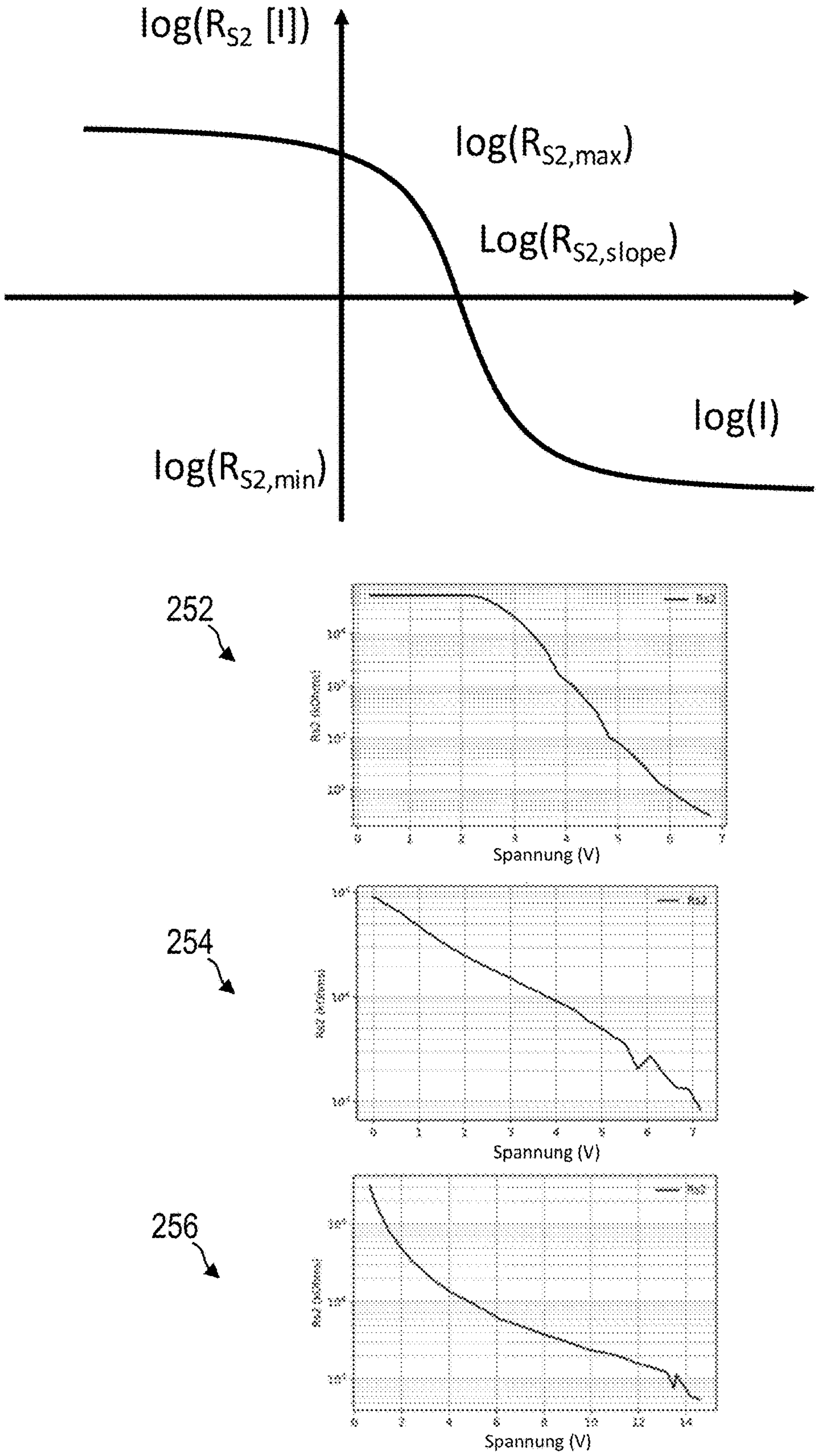
FIG. 8E shows a schematic sketch of the dynamic state parameter R_S2 [I]
Figure 8F:
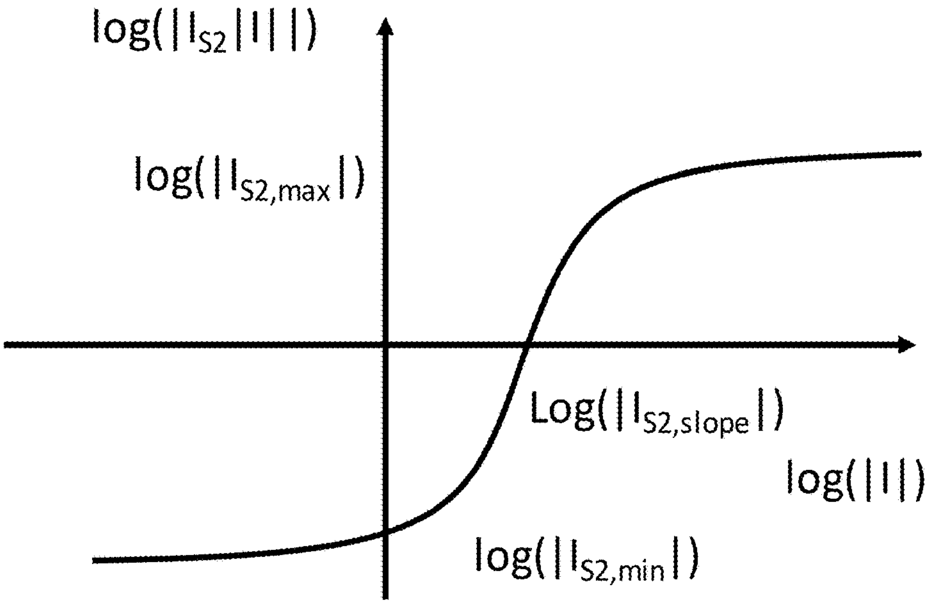
FIG. 8F shows a schematic sketch of the dynamic state parameter $I_{S2}$[I]
Figure 8F:
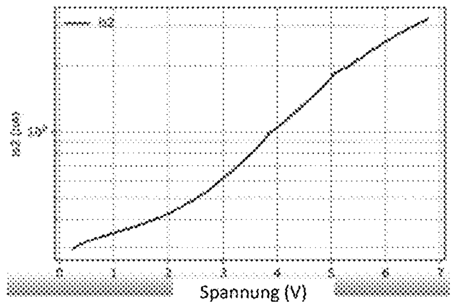
Figure 8F:
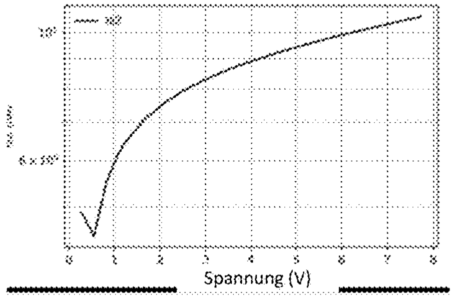
Figure 8F:
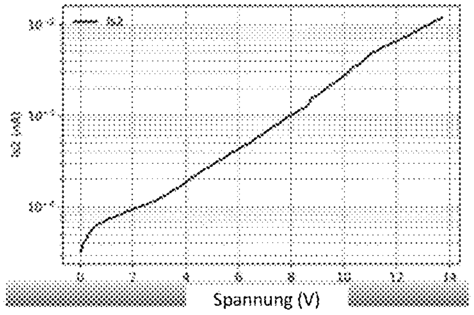
Figure 8G:
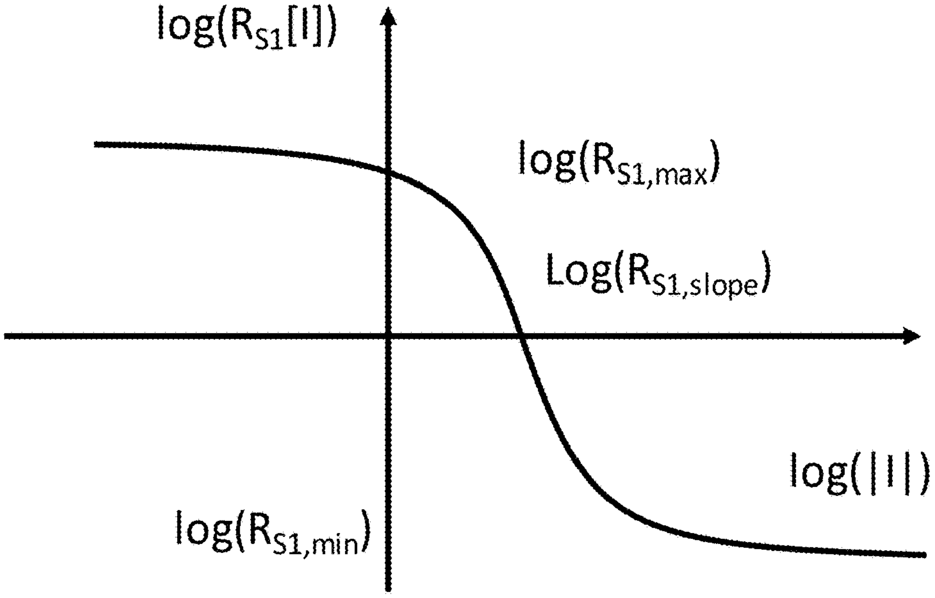
FIG. 8G shows a schematic sketch of the dynamic state parameter $R_{S1}$[I]
Figure 8G:
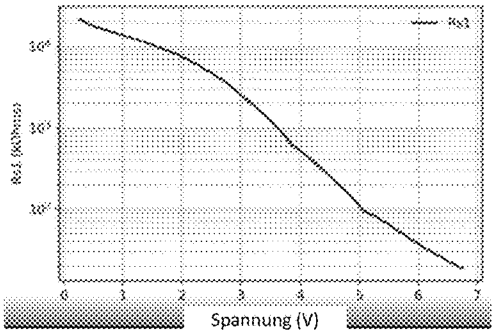
Figure 8G:
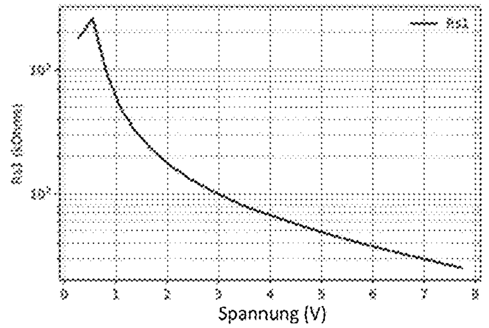
Figure 8G:
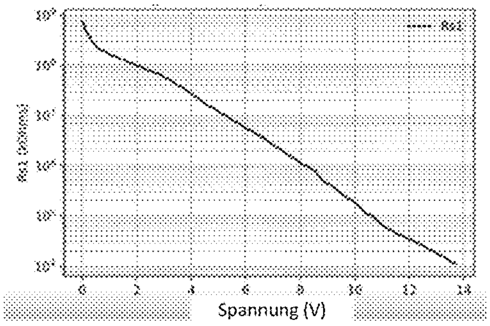

A schematic sketch of the dynamic state parameter $I_{S1}[I]$ is shown in FIG. 8D. Here, the dynamic state parameter $I_{S1}[I]$ increases with increasing current and can be approximately described by a hyperbolic function. FIG. 8D also shows the voltage dependency of the dynamic state parameter $I_{S1}[I]$ determined or measured for the memristive structure 252 (see FIG. 2G), the memristive structure 254 (see FIG. 2H), and the memristive structure 256 (see FIG. 2I). A schematic sketch of the dynamic state parameter $R_{S2}[I]$ is shown in FIG. 8E. Here, the dynamic state parameter $R_{S2}[I]$ decreases with decreasing current and can be approximately described by a hyperbolic function. FIG. 8E also shows the voltage dependency of the dynamic state parameter $R_{S2}[I]$ determined or measured for the memristive structure 252 (see FIG. 2G), the memristive structure 254 (see FIG. 2H), and the memristive structure 256 (see FIG. 2I). A schematic sketch of the dynamic state parameter $I_{S2}[I]$ is shown in FIG. 8F. Here, the dynamic state parameter $I_{S2}[I]$ increases with increasing current and can be approximately described by a hyperbolic function. FIG. 8F also shows the voltage dependency of the dynamic state parameter $I_{S2}[I]$ determined or measured for the memristive structure 252 (see FIG. 2G), the memristive structure 254 (see FIG. 2H), and the memristive structure 256 (see FIG. 2I). A schematic sketch of the dynamic state parameter $R_{S1}[I]$ is shown in FIG. 8G. Here, the dynamic state parameter $R_{S1}[I]$ decreases with decreasing current and can be approximately described by a hyperbolic function. FIG. 8G also shows the voltage dependency of the dynamic state parameter $R_{S1}[I]$ determined or measured for the memristive structure 252 (see FIG. 2G), the memristive structure 254 (see FIG. 2H), and the memristive structure 256 (see FIG. 2I).

According to various aspects, the physical model (e.g., used for fitting the writing curve 302) in the large bias range where log |current| is linear with voltage and may be given after initialization in high resistance state (HRS) by and the maximum current $I_{max}$ at the maximum voltage:

$$I_{S1}[I]=10^{I_{S1,slope}(\log(I)-\log(I_{max}))+\log(I_{S1,max})}$$

with $I_{S1,max}$ from branch 2 and extract $I_{S1,slope}$ and by $$R_{S2}[I]=10^{R_{S2,slope}(\log(I)-\log(I_{max}))+\log(R_{S2,max})}$$

with $R_{S2,max}$ from branch 2 and extract $R_{S2,slope}$

According to various aspects, the physical model (e.g., used for fitting the writing curve 302) in the large bias range where log |current| is linear with voltage and may be given after initialization in low resistance state (LRS) by and the maximum current $I_{max}$ at the maximum voltage:

$$I_{S2}[I]=10^{I_{S1,slope}(\log(I)-\log(I_{max}))+\log(I_{S2,max})}$$

with $I_{S2,max}$ from branch 4 and extract $I_{S2,slope}$ and by $$R_{S1}[I]=10^{R_{S1,slope}(\log(I)-\log(I_{max}))+\log(R_{S2,max})}$$

with $R_{S1,max}$ from branch 4 and extract $R_{S1,slope}$

The broadening parameters may be derived from $V_{1,min}$ and $V_{1,max}$ by fitting the current/voltage curve after initialization in high resistance state (HRS) by:

$$V = n_1\frac{k_BT}{q}\log\left(\frac{I}{I_{s1}[I]}+1\right)\left(1+K_1\frac{k_BT}{q}\log\left(\frac{I}{I_{s1}[I]}+1\right)\right)+V2.$$

The broadening parameters can be derived from $V_{1,min}$ and $V_{1,max}$ from fitting the whole current/voltage curve after initialization in low resistance (LRS) by:

$$V = -n_2\frac{k_BT}{q}\log\left(\frac{I}{I_{s2}[I]}+1\right)\left(1+K_2\frac{k_BT}{q}\log\left(\frac{I}{I_{s2}[I]}+1\right)\right)+V1.$$

FIG. 8B shows measured IV-characteristics for four different memristive structures 814, 816, 818, 820 and respectively determined dynamic state parameters for branch 1 after initialization into high resistance state (HRS).

Figure 8H:
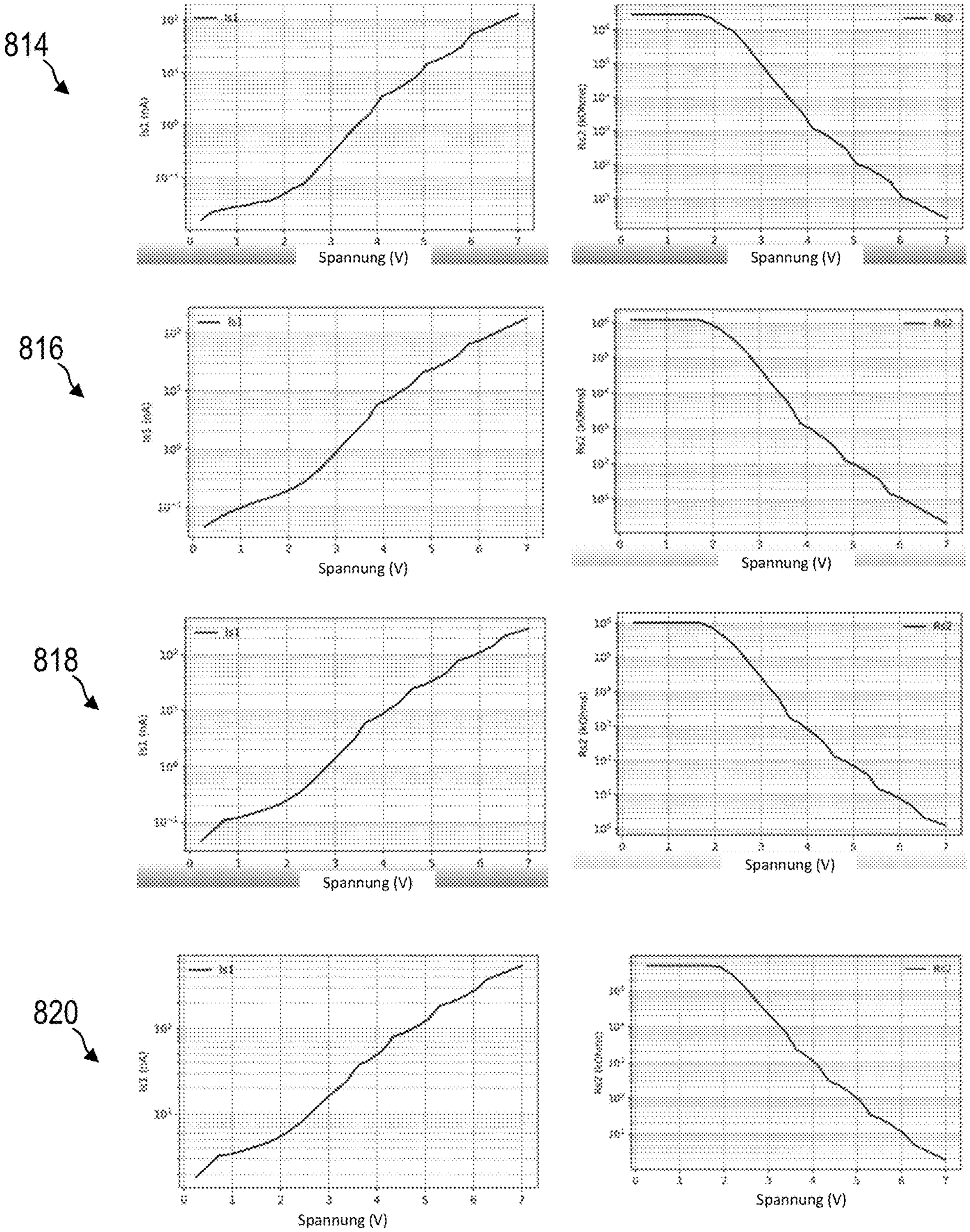
FIG. 8H shows a respective voltage dependency of the dynamic state parameters $I_{S1}$[I] and $R_{S2}$[I] for each of the four different memristive structures.

According to another example, the dynamic state parameters $I_S$ may represent a ratio $$\left(\frac{I_S}{A_{mem}}\right)$$

between the reverse saturation current, $I_S$, and an area, $A_{mem}$, of the memristive structure 100. And the dynamic state parameter $R_S$ may represent a product ($R_S*A_{mem}$) of the reverse depletion layer resistance, $R_S$, and the area, $A_{mem}$, of the memristive structure 100. In this example, the physical model may model the current density as a function of the voltage. FIG. 8C shows current density-voltage-characteristics for the four different memristive structures 814, 816, 818, 820 of FIG. 8B and respectively determined dynamic state parameters using the above physical model for branch 1 after initialization into high resistance state (HRS). A respective voltage dependency of the dynamic state parameters $I_{S1}[I]$ and $R_{S2}[I]$ for each of the four different memristive structures 814, 816, 818, 820 is shown in FIG. 8H (see also FIG. 8D and FIG. 8E and corresponding description).

Figure 3G:
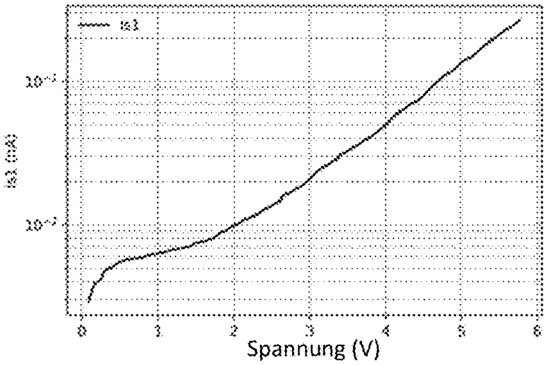
FIG. 3G shows a voltage dependency of two dynamic state parameters respectively determined for different writing curves of FIG. 3D.
Figure 3G:
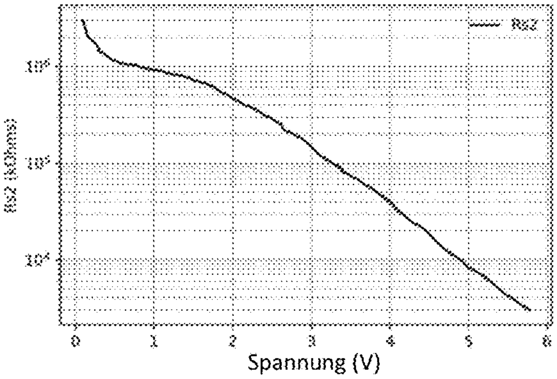
Figure 3G:
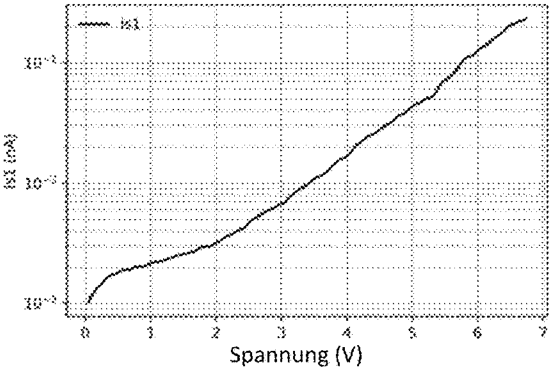
Figure 3G:
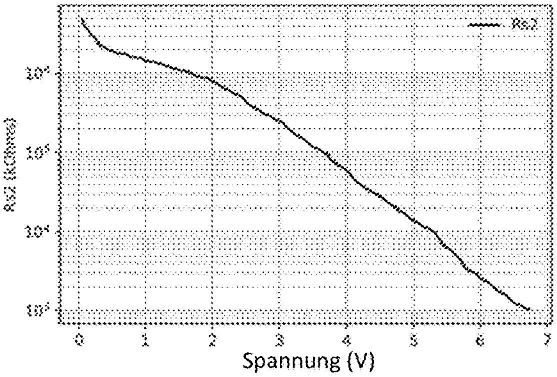
Figure 3G:
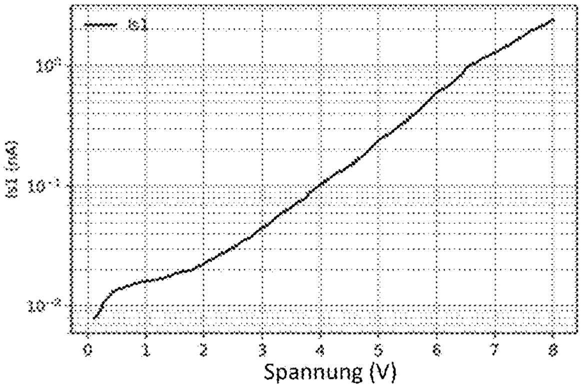
Figure 3G:
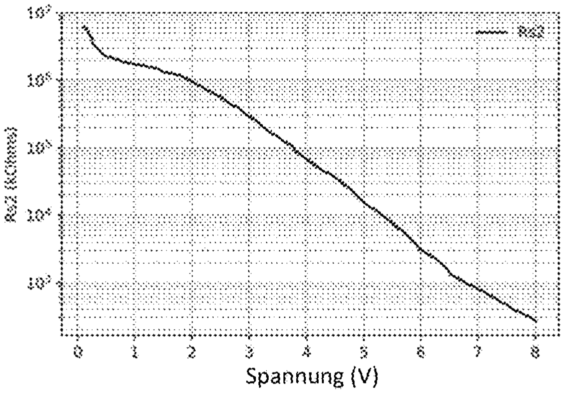

As described above, FIG. 3D shows the writing branch of the resistance-characteristic curve for five different memristive final ramping voltages. The writing branches for all respective programming voltages (6 V, 6,5 V, 7 V, 7,5 V, and 8 V) are superimposed. FIG. 8D shows a schematic of the $\log(I_{S1}[I])$ versus log I. FIG. 8E shows a schematic of the $\log(R_{S2}[I])$ versus log I. FIG. 8F shows a schematic of the $\log(I_{S2}[I])$ versus log I. FIG. 8G shows a schematic of the $\log(R_{S1}[I])$ versus log I. As illustratively shown, the logarithm of dynamic state parameters have a substantially linear behavior in the intermediate bias range between ($I_{min}$ and $I_{max}$) and can be characterized by an approximative hyperbolic function. The dynamic state parameters characterize physical properties of the memristive structure: $I_{S1}[I]$ may describe the saturation current of the top electrode in forward direction (positive bias applied to top electrode). $R_{S2}[I]$ may describe the depletion resistance of the bottom electrode in reverse direction (positive bias applied to top electrode). $I_{S2}[I]$ may describe the saturation current of the bottom electrode in reverse direction (negative bias applied to top electrode). $R_{S1}[I]$ may describe the depletion resistance of the top electrode in forward direction (negative bias applied to top electrode). FIG. 3G shows the voltage dependency of the dynamic state parameters $I_{S1}$ and $R_{S2}$ for three different memristive final ramping voltages. As shown, the voltage dependency of the dynamic state parameters is substantially independent of the final ramping voltage. In some aspects, a dynamic state parameter as described herein, may refer to the slope of the voltage dependency-curve. Slope values determined for the curves of the three different final ramping voltages of FIG. 3G are shown in FIG. 3H.

In the following, with reference to FIG. 9 to FIG. 14, various processing schemes are described which employ the determined one or more dynamic state parameter values 812. At least a part of the processing may be carried out by at least one processor 902.

The term "processor", as described herein, may be understood as any kind of entity capable to process data and/or signals. For example, the data or signals may be handled according to at least one (i.e., one or more than one) specific function performed by the processor. A processor may include or may be an analog circuit, a digital circuit, a mixed signal circuit, a logic circuit, a microprocessor, a central processing unit (CPU), a graphics processing unit (GPU), a digital signal processor (DSP), a programmable gate array (FPGA), an integrated circuit, or any combination thereof.

Any other method of implementing the respective functions, described herein, may also be understood to include a processor or logic circuit. It is understood that one or more of the method steps described in detail herein may be carried out (e.g., implemented) by a processor, through one or more specific functions performed by the processor. The processor may therefore be arranged to carry out any of the information processing methods or components thereof described herein.

Figure 9:
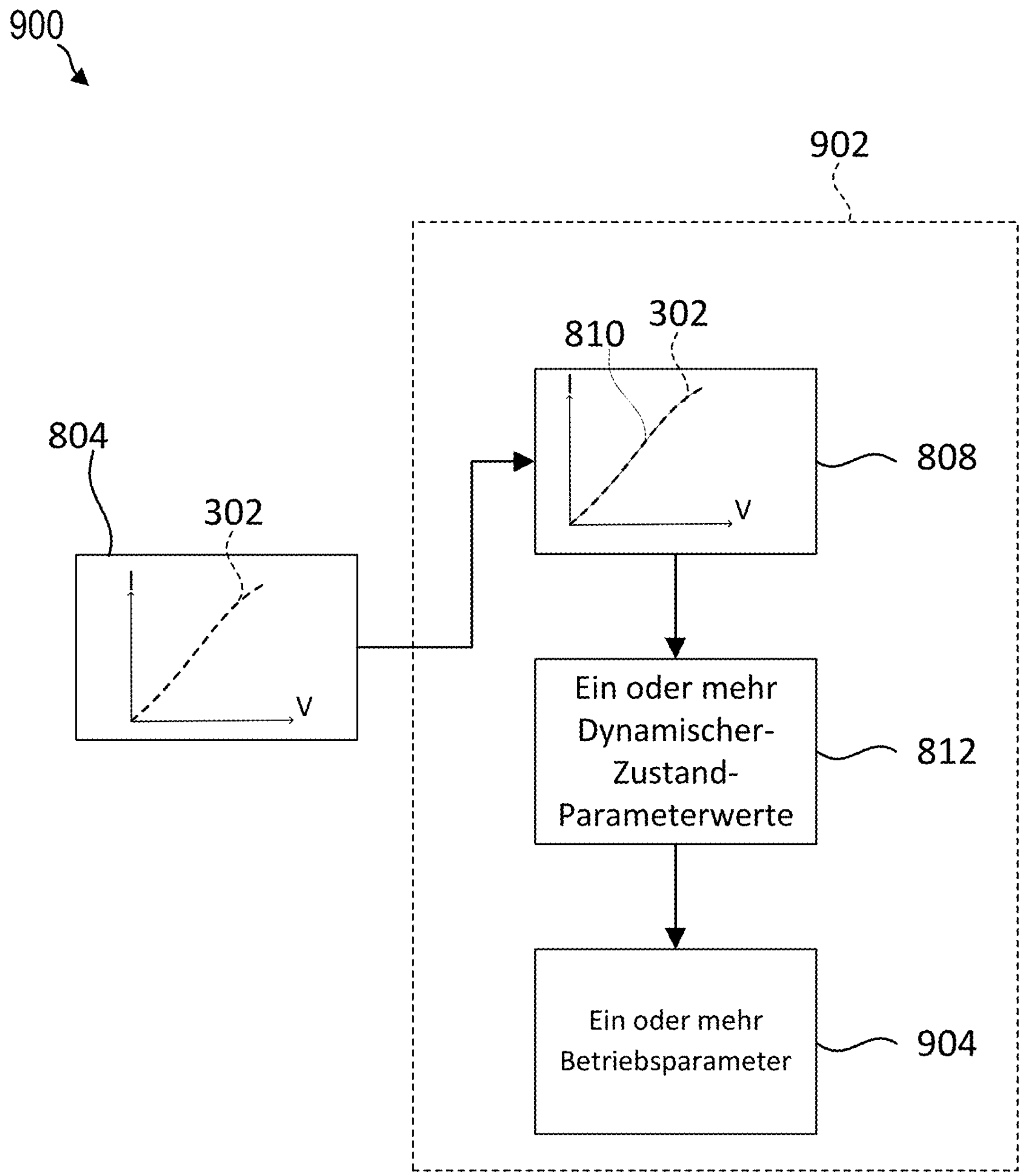
FIG. 9 to FIG. 14 each shows a respective processing scheme for employing determined dynamic state parameter values.

According to the processing scheme 900 shown in FIG. 9, the at least one processor 902 may be configured to select (e.g., initially select or adapt), using the one or more dynamic state parameter values 812, one or more operating parameters 904 associated with an operation of the memristive structure 110 (e.g., as a function of the determined static state parameter values). For example, the processing scheme 900 may include an analysis of one or more memristive structures (e.g., a plurality of memristive structures of a device). This analysis may include the determination of the one or more dynamic state parameter values 812.

The voltage drop over the memristive structure is described by the sum of the voltage drop over the top electrode (V1) and by a voltage drop over the bottom electrode (V2). All parameters related with the top electrode carry the index "1": n1, K1, Rs1, IS1, slope log Rs1, slope log IS1. And all parameters related with the bottom electrode carry the index "2". n2, K2, Rs2, IS2, slope log Rs2, slope log IS2. The static state parameters also determine the small bias range and the large bias range of branch 1 and of branch 3. The dynamic state parameters mainly determine the intermediate bias range of branch 1 and branch 3 and are the same for a given memristive structure independent of the state from which writing started and at which writing ends. To be specific for branch 1: in the small bias range branch 1 depends on static state in branch 4. This is seen in the dependence of branch 1 on n2, K2, IS2, and Rs1 of branch 4. Branch 1 in the large bias range is related with static state parameters in subsequent branch 2. This is seen in n1 and K1 of branch 2.

To be specific for branch 3: in the small bias range branch 3 depends on static state in branch 2. This is seen in the dependence of branch 3 on n1, K1, IS1, and Rs2 of branch 2. Branch 3 in the large bias range is related with static state parameters in subsequent branch 4. This is seen in n2 and K2 of branch 4.

Since the static state parameter values and the one or more dynamic state parameter values 812 represent respective (e.g., physical and/or electrical) properties of the one or more memristive structures, this allows to select corresponding operating parameters 904 at which the one or more memristive structures may be operated. Such operating parameters 904 at which the one or more memristive structures may be written starting from a given state into another given state. Such operating parameters 904 may be, for example, a write voltage, a programming (e.g., write) voltage, a write flux, a write current, a write charge, and/or an operating temperature. As shown above, the physical model may depend on the temperature of the memristive structure. Knowing the respective values of the static state parameter(s) and of the dynamic state parameters allows, for example, to determine a current-voltage characteristic in branch 1 and branch 3 at another temperature value. For example, this allows to simulate the behavior of the memristive structure at another (e.g., non-measured) temperature (see, for example, description with reference to FIG. 10). According to some aspects, the static state parameter values 812 may be determined during use of the device which includes the one or more memristive structures in the reading branches 2 and 4. And the static state parameters of branch 4 may be determined by modelling branch 1 in the small bias range. And the static state parameters of branch 2 may be determined by modelling branch 1 in the large bias range. And the static state parameter of branch 2 may be determined by modelling branch 3 in the small bias range. And the static state parameters of branch 4 may be determined by modelling branch 3 in the large bias range. The dynamic state parameters of branch 1 are determined in the intermediate bias range of branch 1. And the dynamic state parameters of branch 3 are determined in the intermediate bias range of branch 3. In this case, the operating parameters 904 used for operating the one or more memristive structures may be adapted based on the one or more dynamic state parameter values 812 and on the dynamic state parameters. For example, some (e.g., physical, electrical, chemical, etc.) properties of the memristive structure may change over time. Using the physical model to determine the one or more static state parameters 812 and of the dynamic state parameters may allow to determine such a change and, therefore, allows to adapt the operating parameters 904 to the changed properties. This may increase the lifetime, accuracy, reliability, etc. of the device.

Figure 10:
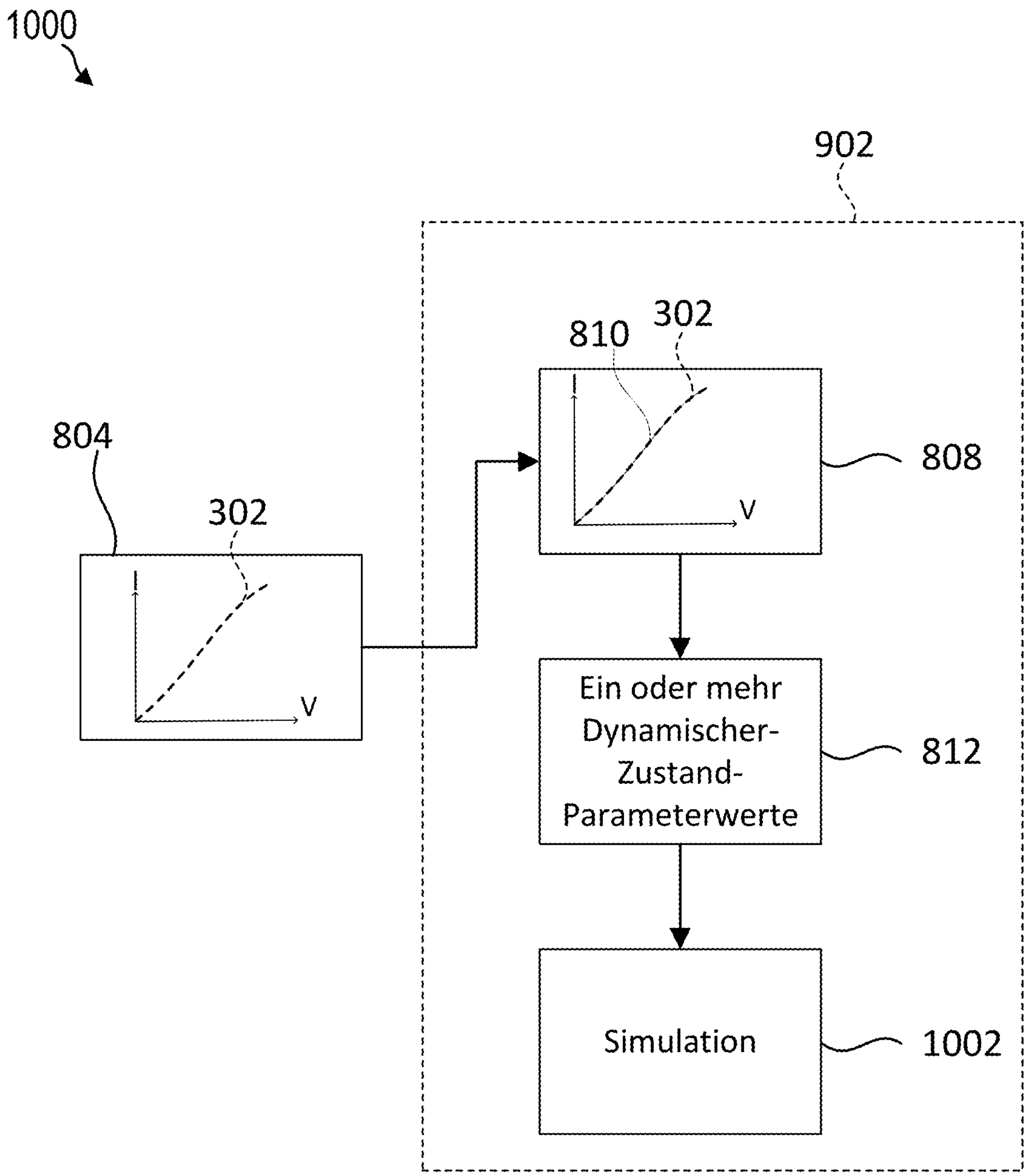

According to the processing scheme 1000 shown in FIG. 10, the at least one processor 902 may be configured to carry out a simulation 1002 using the one or more dynamic state parameter values 812 and the static state parameters. The simulation 1002 may be a simulation of the behavior of a memristive circuit including one or more memristive structures. These one or more memristive structures may be configured into an end state in accordance with the memristive structure 100 for which the one or more dynamic state parameter values 812 and static state parameters are determined. This kind of simulation may be referred to as electronic circuit simulation. Hence, the static state parameter values 812 and dynamic state parameters may be measured for a manufactured memristive structure and then the behavior of a memristive circuit, which includes one or more (e.g., a plurality of) such memristive structures, is simulated (in 1002). For example, the simulation 1002 may include varying one or more simulation parameters associated with an operation of the memristive circuit. These simulation parameters may, for example, include a temperature of the memristive circuit (or optionally a respective temperature for each memristive structure of the memristive circuit), a programming (e.g., write) voltage for setting a memristive state, a programming (e.g., write) current for setting a memristive state, a read voltage for reading the memristive state of the memristive structure, a read current for reading the memristive state of the memristive structure, a desired current through the memristive structure responsive to applying a corresponding read voltage (pulse), and/or a desired voltage drop over the memristive structure responsive to applying a corresponding read current (pulse). As an example, the one or more dynamic state parameter values 812 and static state parameters of the manufactured memristive structure may be measured at a first temperature value and the simulation 1002 may simulate the behavior of the memristive circuit at a second temperature value different from the first temperature value (e.g., using the herein described physical model). According to various aspects, each dynamic state parameter value of the one or more dynamic state parameter values 812 and each of the static state parameter values may be associated with a respective error. Here, the simulation 1002 of the behavior of the memristive circuit may be carried out in consideration of the respective error (e.g., as noise) of the determined dynamic state parameter values 812 and of the static state parameter values. According to various aspects, the determined one or more dynamic state parameter values 812 and static state parameters may be verified by measuring the corresponding (physical) parameter underlying the respective static state parameter and dynamic state parameters. For example, a respective state parameter value of the one or more dynamic state parameter values 812 may be verified in the case that a difference between the measured value of the parameter and the determined dynamic state parameter value is less than a predefined verification value. According to various aspects, the at least one processor 902 may be configured to determine a respective functional correlation between the one or more dynamic state parameter values 812 and static state parameters and the memristive states, $m_s$ (e.g., as shown in FIG. 8D). The simulation 1002 may include extrapolating this functional correlation. This allow, for example, to simulate a respective resistance-characteristic curve for each (e.g., non-measured) memristive state in branch 1 and branch 3.

Figure 11:
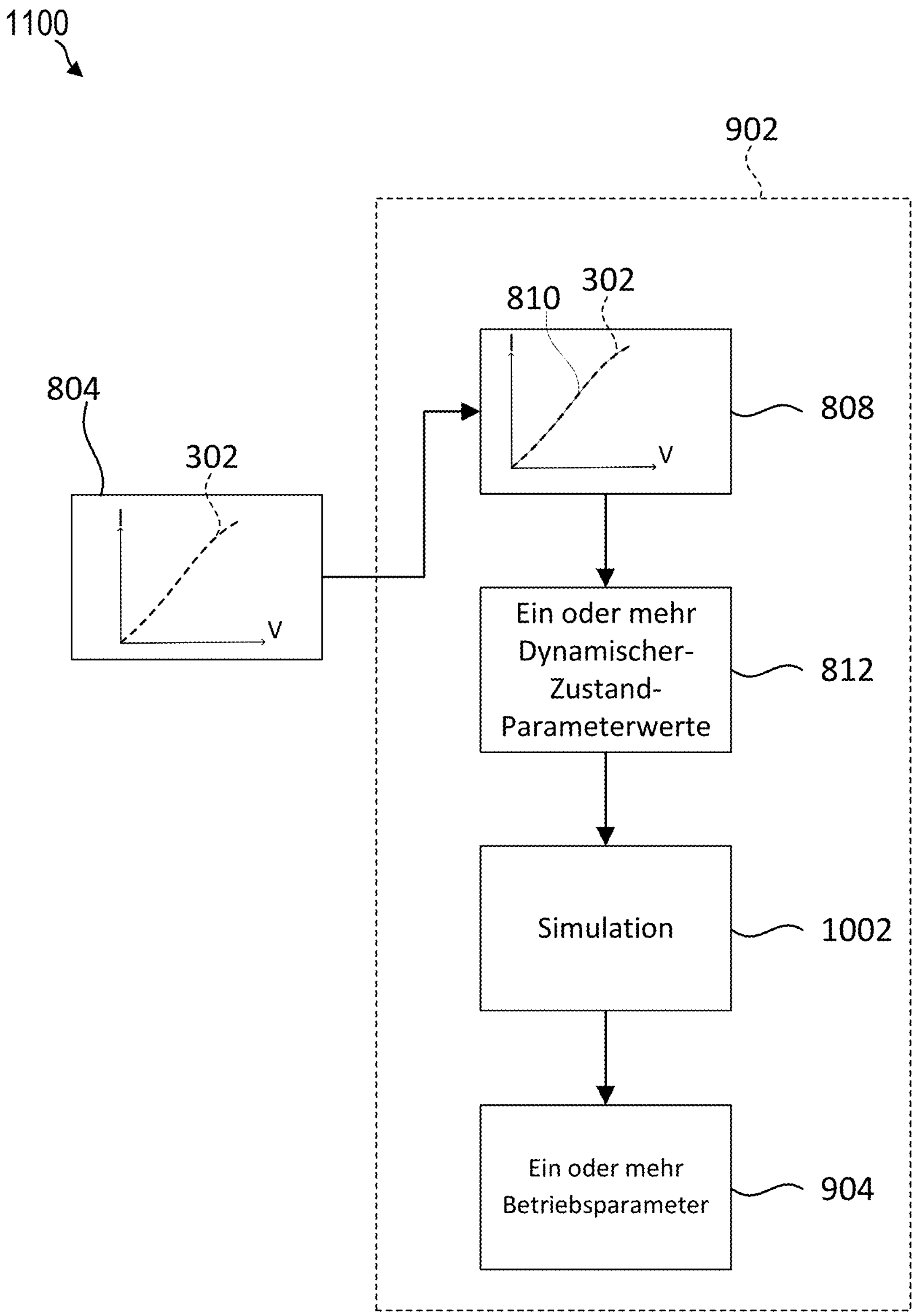
Figure 12:
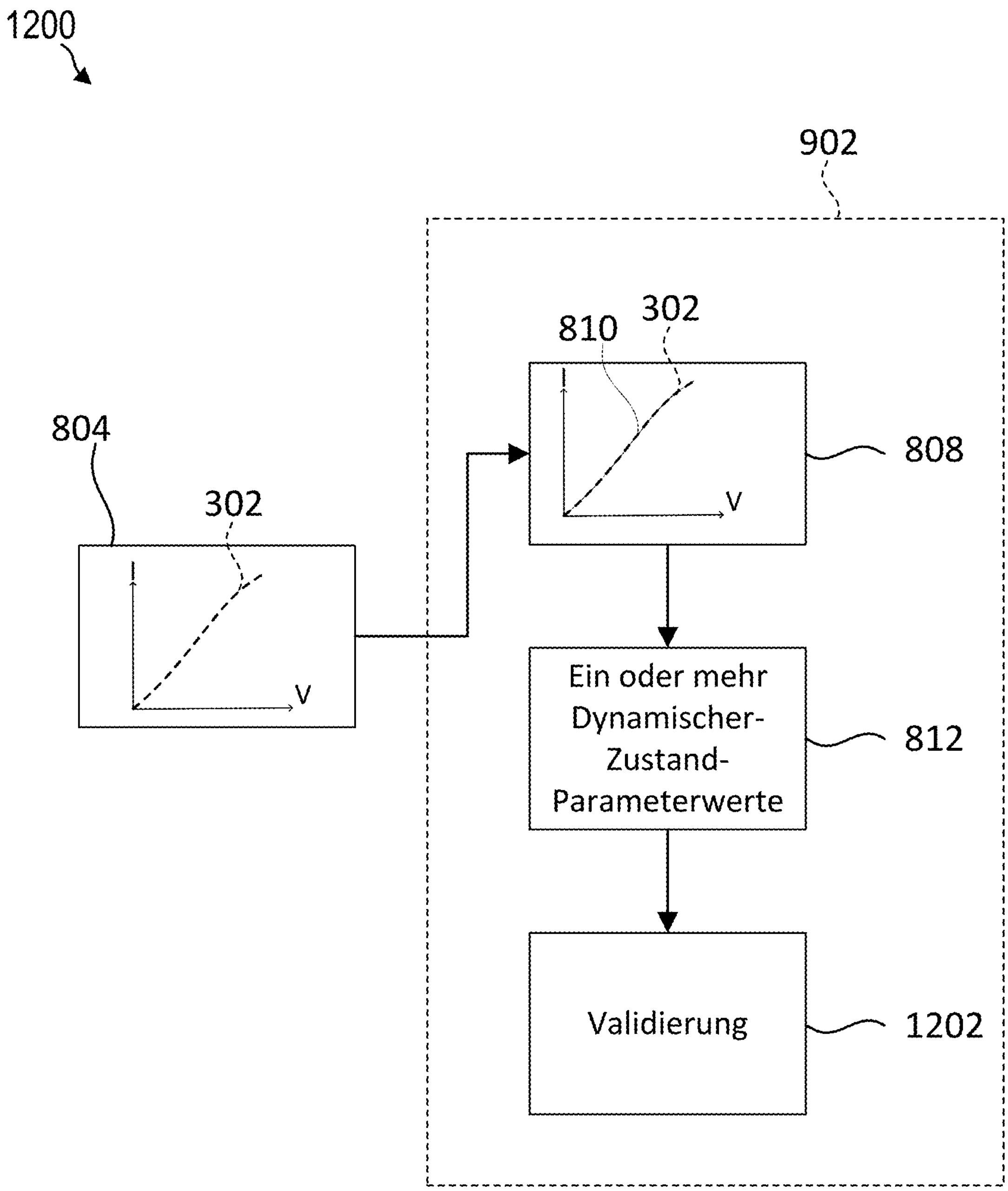
Figure 13:
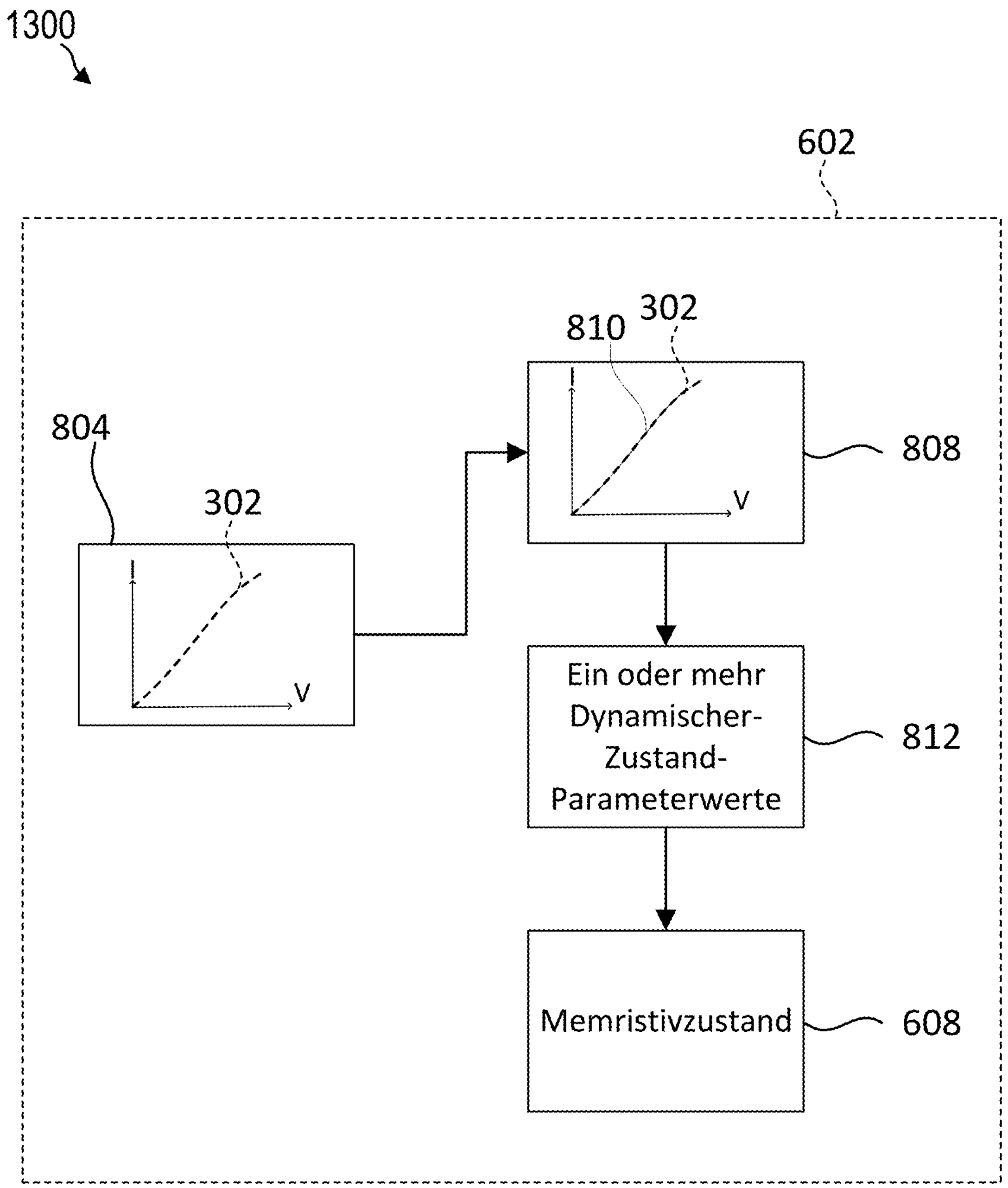
Figure 14:
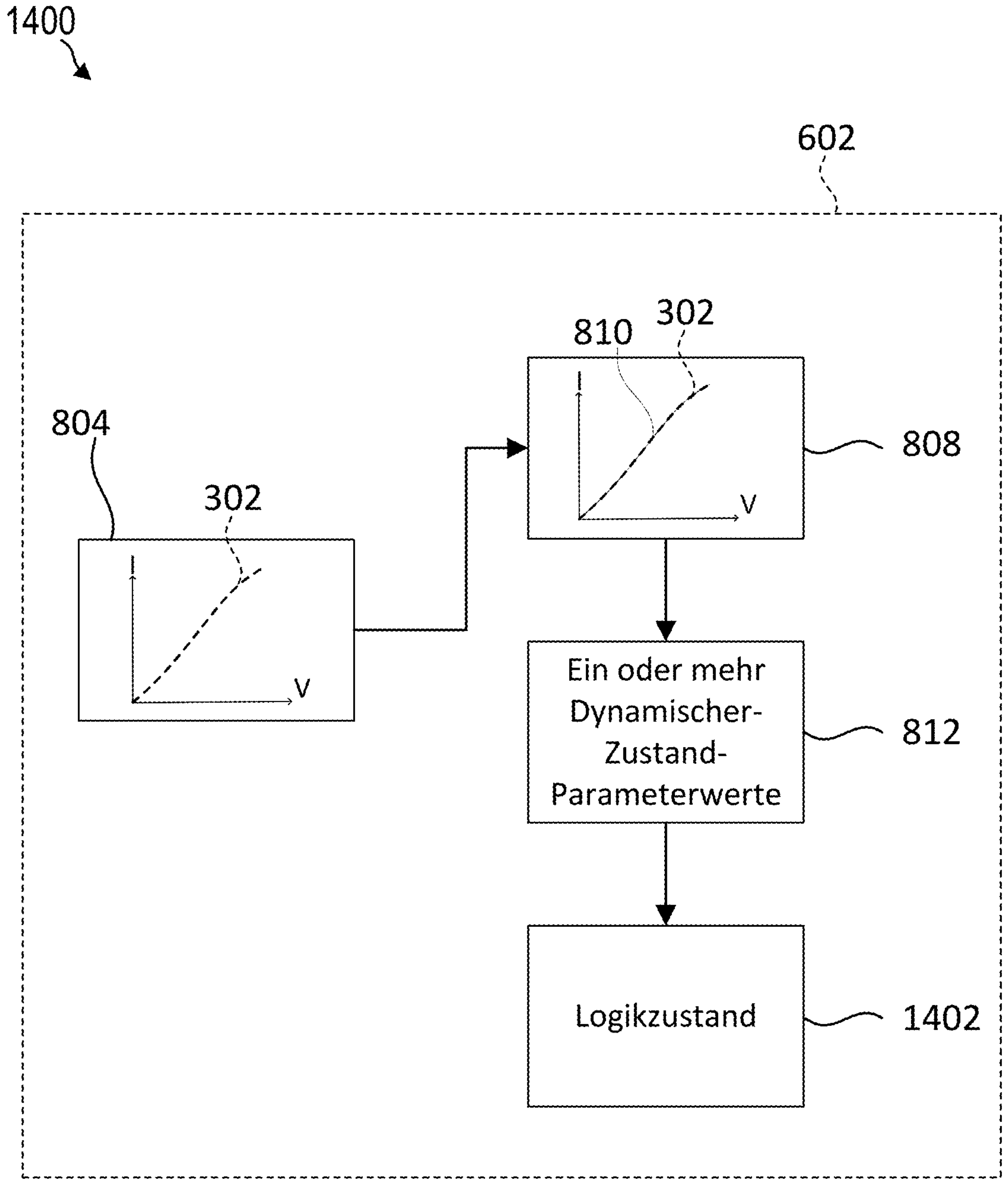

According to the processing scheme 1100 shown in FIG. 11, the at least one processor 902 may be configured to carry out the simulation 1002 (e.g., including varying the one or more simulation parameters associated with the operation of the memristive circuit) using the one or more dynamic state parameter values 812 and static state parameters and to determine the one or more operating parameters 904 for operation of the memristive circuit based on a result of the simulation 1002.

According to the processing scheme 1100 shown in FIG. 11, the at least one processor 902 may be configured to carry out a validation 1202 of at least one memristive structure (e.g., for each memristive structure of a memristive circuit including a plurality of memristive structures) using the one or more dynamic state parameter values 812 and static state parameters. Each static state parameter may be associated with a respective predefined state of the memristive structure at the beginning and at the end of the writing process. Each dynamic state parameter is related with either branch 1 or branch 3.

The at least one processor 902 may be configured to determine, for at least one dynamic state parameter value and static state parameters determined for the at least one memristive structure in a starting state, whether the at least one dynamic state parameter value is within the predefined validation range associated with the static state parameter. The at least one processor 902 may be configured to validate the at least one memristive structure in the case that the at least one static state parameter value or at least one dynamic state parameter value is within the predefined validation range associated with the static state parameter and dynamic state parameter.

According to various aspects, the at least one processor 902 may be configured to respectively determine, for each static state parameter value and dynamic state parameters determined for the at least one memristive structure, whether the static state parameter value is within the predefined validation range associated with the static state parameter and related with the starting state or with the final state of writing operation and where the dynamic state parameter is related either with branch 1 or with branch 3 and independent of the static state parameters related with starting state and independent of static state parameters related with final state. The at least one processor 902 may be configured to validate the at least one memristive structure in the case that each static state parameter or the dynamic state parameter is within the respective predefined validation range. Hence, if at least one static state parameter or if at least one static state parameter is not within the predefined validation range, the at least one processor 902 may not validate (e.g., invalidate) the at least one memristive structure in branch 1 and 3.

According to various aspects, a memristive circuit may include a plurality of memristive structures. The at least one processor 902 may be configured to determine respective one or more dynamic state parameter values 812 and of static state parameters for each memristive structure of the plurality of memristive structures. The at least one processor 902 may be configured to respectively validate each of the memristive structures as described above. For example, the at least one processor 902 may be configured to validate a respective memristive structure of the plurality of memristive structures in the case that each static state parameter value of the one or more static state parameter values and in the case that each dynamic state parameter of the one or more dynamic state parameters 812 is within the respectively associated predefined validation range. According to some aspects, in the case that a memristive structure is not validated (e.g., invalidated), the memristive structure may be, for example, not addressed during use. As described herein, the one or more static state parameter values and dynamic state parameter values may be determined during use of the memristive circuit. In this case, the herein described validation may (e.g., additionally) carried out during use. This allows to "sort out" memristive structures which change (e.g., of which the properties change) during use, such that these memristive structures may be, for example, not further addressed during use. This ensures the reliability, lifetime, data security, etc. of the memristive circuit. According to various aspects, the at least one processor 902 may be configured to validate the memristive circuit in the case that each memristive structure of the plurality of memristive structures is validated. It is noted that the respectively assigned predefined validation range serves as an example and that one or more other criteria may be used for validation. Such a criterion may be, for example, a variation of the values of a static state parameter and of dynamic state parameters among the plurality of memristive structures (e.g., a deviation from an average over the plurality of memristive structures). For example, the at least one processor 902 may be configured to respectively determine, for each memristive structure of the plurality of memristive structures, a respective value for one or more static state parameters and of dynamic state parameters. The at least one processor 902 may be configured to respectively determine, for at least one (e.g., each) static state parameter of the one or more static state parameters and for at least one (e.g., each) dynamic state parameter of the one or more dynamic state parameters a variation of the determined values and whether this determined variation is equal to or less than a predefined threshold variation. The at least one processor 902 may be configured to validate the memristive circuit in the case that, for the at least one (e.g., each) static state parameter of the one or more static state parameters and for at least one (e.g., each) dynamic state parameter of the one or more dynamic state parameters, the variation is equal to or less than the predefined threshold variation. Hence, a respective variation (e.g., a variation value) may be determined for each of the one or more static state parameters and of dynamic state parameters and the memristive circuit may be validated in the case that each of the determined variations is equal to or less than the predefined threshold variation. According to some aspects, in the case that a variation of the values of at least one static state parameter and of the dynamic state parameters is greater than the threshold, the memristive circuit may be invalidated. This ensures consistent (unvarying) properties of the memristive structures of the memristive circuit, thereby increasing, for example, the reliability of the memristive circuit. The variation of the (static state parameter) values of a static state parameter or the variation of the (dynamic state parameter) values of a dynamic state parameter may be, for example, a deviation from an average value. This average value may be, for example, determined by averaging the determined (static state parameter) values of the static state parameter or determined by averaging the determined (dynamic state parameter) values of the dynamic state parameter over the plurality of memristive structures.

According to various aspects, a memristive structure (e.g., each memristive structure of the memristive circuit) may be set (one after another) into different memristive states and in each memristive state a respective validation may be carried out, as described herein.

Using the (static state parameter) values of the one or more static state parameters or the (dynamic state parameter) values of the one or more dynamic state parameters for validation of a memristive circuit may be a more objective criterium for the certification of the memristive circuit as compared to currently used certification criteria (e.g., since the static state parameters and the dynamic state parameters directly describe (e.g., physical, electrical, etc.) properties (and variations of these properties) of the memristive structures of the memristive circuit).

As described herein, the one or more static state parameter values of the one or more static state parameters and/or the one or more dynamic state parameter values 812 of the one or more dynamic state parameter may be indicative of the memristive state the memristive structure resides in. Hence, the determined one or more static state parameter values and the dynamic state parameters allow to determine the memristive state, $m_s$, of the memristive structure at the end of the writing process after having determined the state at the starting point of write operation. According to the processing (e.g., reading) scheme 1300 shown in FIG. 13, the write circuit 602 may be configured to, using the one or more dynamic state parameter values 812 and the static state parameters, determine (e.g., classify) the memristive state 608 of the memristive structure 100. As described herein, a memristive structure may be in one of over one hundred (e.g., more than 200, e.g., more than 500) different memristive states. Since the differences between the resistance-characteristic curves of the different memristive states may be small (e.g., when using only one read voltage value), using only the current value corresponding a read voltage value may not allow to different between each of these different memristive states. However, since the one or more static state parameters 812 and dynamic state parameters are directly indicative of the resistance-characteristic curves of the different memristive states, using the static state parameter values 812 and the dynamic state parameters may allow to differentiate between more (e.g., each) of the different memristive states. This also allows to use more logic states. For example, the memristive structure may be associated with over one hundred different logic states. According to the processing (e.g., reading) scheme 1400 shown in FIG. 14, the write circuit 602 may be configured to, using the one or more dynamic state parameter values 812 and/or static state parameters, determine (e.g., classify) a logic state 1402 (of two or more logic states) of the memristive structure 100. According to various aspects, each logic state of the two or more logic states may be associated with one or more memristive states of the memristive structure. Hence, more than one memristive state may be associated with the same logic state. Alternatively, each memristive state may be associated with respective logic state. For various possibilities to determine the logic state of a memristive structure see also the description with reference to FIG. 15 to FIG. 17.

Figure 15:
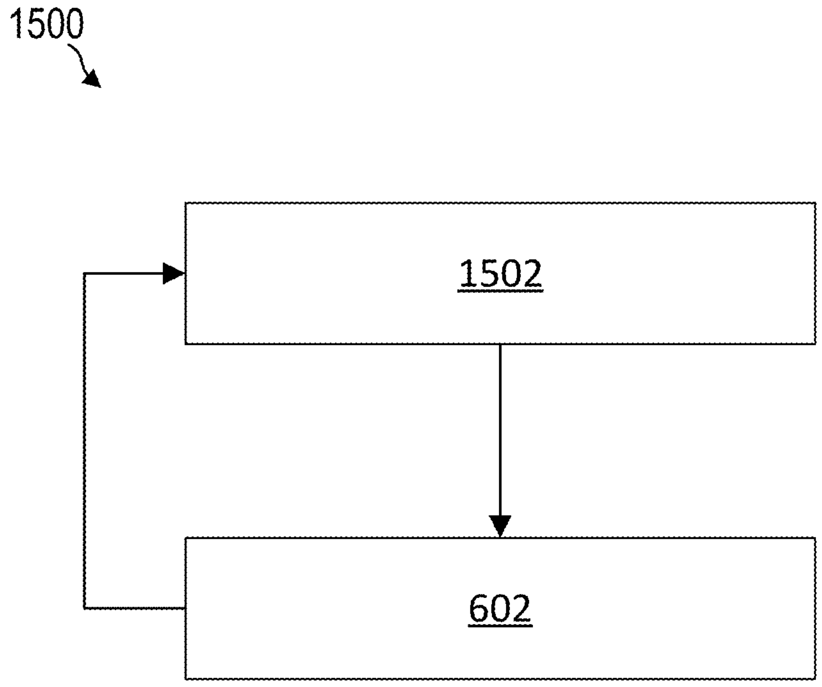
FIG. 15 shows a device having a write circuit which writes a logic state of a memristive structure via at least two writing steps during a write operation.

FIG. 15 shows a device 1500 according to various aspects. The device 1500 may be, for example, a memory device, a storage device, and/or a processing device. As an example, the device 1500 may be used as a back-up memory (e.g., for BIOS configuration data) since memristive structures are faster than transistors. As another example, the device 1500 may be used as a working memory (e.g., a resistive random-access memory, ReRAM) since memristive structures are not affected by sudden power losses. As a further example, the device 1500 may be used for inter-of-things application since, due to the non-volatile data storage, memristive structures can store data without energy consumption and may, thus, require less energy. As an even further example, the device 1500 may be a reprogrammable logic device or a reconfigurable computing device. The device 1500 may be, for example, a neuromorphic computing device since the plurality of memristive states may serve as a gradient for the neuromorphic computing. The device 1500 may be, for example, used for neural network computing since the plurality of memristive states may provide a gradient representing weights (and/or biases) within the neural network. The device 1500 may also be a near-memory computing device or an in-memory computing device. Here, some memristive structures of the device 1500 may carry out computing processes and other memristive structures of the device 1500 may be used to store data. In various aspects, the device 1500 may be used for digital (binary, multibit) and for analog computing.

The device 1500 may include a memristive circuit 1502. The memristive circuit 1502 may include one or more (e.g., a plurality of) memristive structures. The memristive circuit 1502 may include the write circuit 602. The write circuit 602 may be configured to (e.g., individually) address each of the one or more (e.g., plurality of) memristive structures. The write circuit 602 may be configured to write a respective memristive state 608 and/or a respective logic state 1402 of each of the one or more (e.g., plurality of) memristive structures. According to some aspects, write circuit 602 may be configured to write a respective memristive state 608 and/or a respective logic state 1402 of a respective memristive structure using, for example, at least two times (e.g., via at least two measurements) during a single write operation using different write voltage values or different write current values, as described herein (see, for example, description with reference to FIG. 6 to FIG. 8A). It is understood that measuring the resistance-characteristic curve, as describe herein, may include measuring several data points, I(V) or V(I), and, thus, several measurements. However, it is also understood that these measurements may be carried out during the same write operation (e.g., during applying a single measurement signal (e.g., measurement pulse)).

For example, in the case that the write circuit 602 is configured to write the memristive structure into a memristive state and to record in the same time the current (if a bias is applied to) or the voltage (if a current is driven through) the device. E.g., measure the first current value, $I_{write1}$, corresponding to first voltage value, $V_{write1}$, and the second current value, $I_{write2}$, corresponding to the second voltage value, $V_{write2}$ (see FIG. 6 and corresponding description), the write circuit 602 may be configured to set a first expected memristive state of the memristive structure 100 using the first current value, $I_{write1}$, and to set a second expected memristive state of the memristive structure 100 using the second current value, $I_{write2}$. The write circuit 602 may be configured to set the memristive state of the memristive structure 100 based on the set first expected memristive state and the set second expected memristive state. For example, the write circuit 602 may be configured to write the first memristive state and a second memristive state, and to determine whether the first expected memristive state as the memristive state of the memristive structure 100 in the case that the first expected memristive state corresponds to the second expected memristive state. Illustratively, the memristive state of the memristive structure 100 is written at least two (e.g., exactly two, three, more than three) times at different voltage (or current) values and the memristive state is determined based on these at least two measurements. As described herein, the differences between the resistance-characteristic curves of the different memristive states may be small. With this procedure one can determine whether the writing operation is saturated after one writing step. Thus, using at least two writing steps may allow to differentiate between more memristive states as compared to using only one measurement and to decide whether the memristive state is saturated.

As described herein, each data point, (I/V), on the transition curve 302 may (unambiguously or bijectively) correspond to one memristive state, $m_s$ (V), of the plurality of memristive states. In the case that the write circuit 602 is configured to determine the maximum voltage, $V_{max}$, needed to saturate the memristive state in a write operation (see FIG. 7 and corresponding description), during a single write operation, even more memristive states as compared to using two measurements during the write operation may be differentiated.

In the case that the write circuit 602 is configured to determine the one or more dynamic state parameter values 812 (see, for example, FIG. 8A to FIG. 8D and corresponding description), even more memristive states as compared to using the two measurements and as compared to using the destruction voltage can be differentiated. It is understood that the capability to differentiate between more memristive states allows to use more logic states and, thus increases the processing or computational power FIG. 16A to FIG. 16D each show a device 1600 according to various aspects. The device 1600 may be a memory device or a storage device. For example, the device 1600 may be an n-logic memory. The device 1600 may include a plurality of memristive structures 1602 (n=2 to N). "N" may be any integer number equal to or greater than two. According to various aspects, "N" may be any integer number equal to or greater than twenty (e.g., equal to or greater than one hundred).

The device 1600 may include the write circuit 602. As described herein, the write circuit 602 may be configured to write a respective logic state (of two or more logic states) of each memristive structure of the plurality of memristive structures 1602 (n=2 to N) via at least one write step (such as, for example, described with reference to any of the FIG. 6 to FIG. 8D, and FIG. 13, to FIG. 15).

Figure 17A:
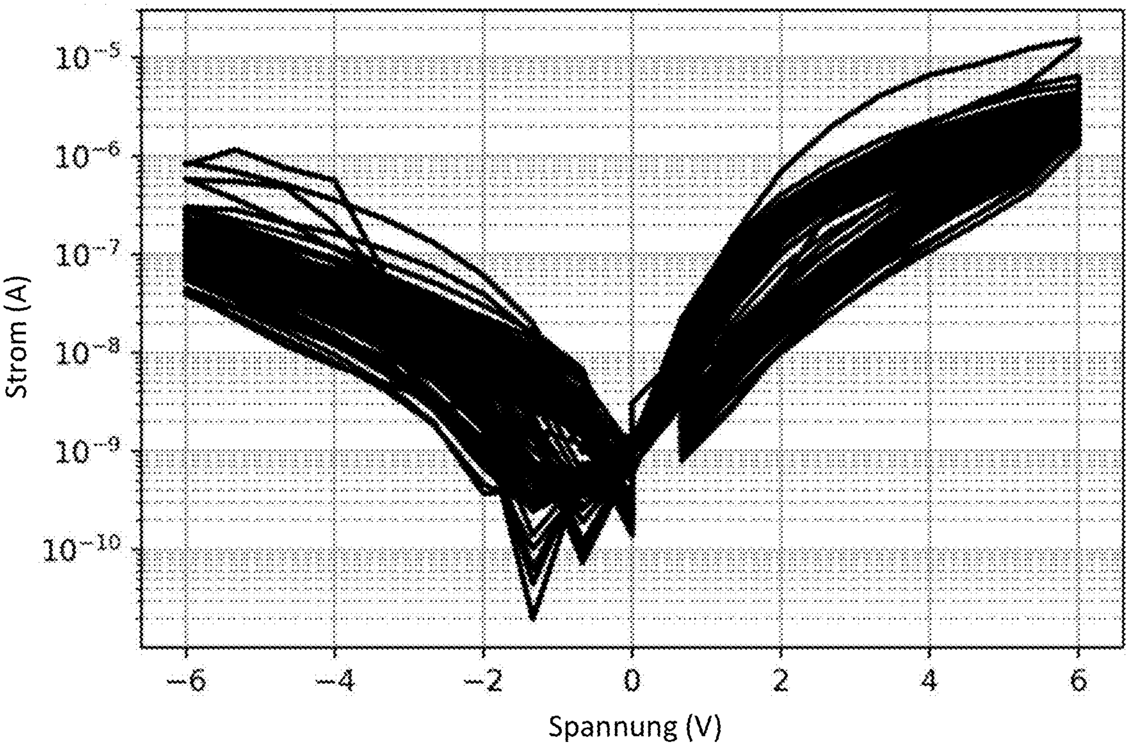
FIG. 17A shows a respective characteristic IV curve of a plurality of memristive structures, FIGS. 17B and 17C each show a variation of a dynamic state parameter at the writing voltage +2 V.

The device 1600 may include one or more processors 1604. The one or more processors 1604 may be configured to determine a key 1606. The key 1606 may be, for example, a private key or an authentication key. According to some aspects, the one or more processors 1604 may be configured to determine the key 1606 based on the logic states determined for the plurality of memristive structures 1602. According to various aspects, process variations or deviations among the plurality of memristive structures 1602 (n=1 to N) may be employed to generate the key 1606. Thereby, the plurality of memristive structures 1602 (n=1 to N) is configured as a physical unclonable function (PUF). In particular, variations of the production process may induce variations of the plurality of memristive structures 1602 (n=1 to N). The variations of the production process introduce randomness into the properties of the plurality of memristive structures 1602 (n=1 to N) and can therefore provide the entropy for generating the key 1606. Such variations in the properties of the plurality of memristive structures 1602 (n=1 to N) may lead to slightly differences in resistance-characteristic curves (which are associated with the same writing operation in the sense of using the same initialization voltage and in the sense of using the subsequently the same writing voltage or writing current) of the plurality of memristive structures 1602 (n=1 to N). As an example, FIG. 17A shows a characteristic IV curve of a first memristive structure 1602 (n=1), a second memristive structure 1602 (n=2), a third memristive structure 1602 (n=3), a fourth memristive structure 1602 (n=4), . . . , and a forty seventh memristive structure 1602 (n=47) for a case in which each of the first to forth seventh memristive structures 1602 (n=1 to n=N=47) have been initialized with the same initialization voltage in nominal the same memristive state, $m_s$=0. As described herein, each memristive state, $m_s$, may be associated with a corresponding write current, $I_{write}$, or write voltage, $V_{write}$, at which the memristive state may be changed. According to some aspects, each memristive structure of the plurality of memristive structures 1602 (n=1 to N) may be in the same memristive state. According to other aspects, each memristive structure of the plurality of memristive structures 1602 (n=1 to N) may be in a memristive state within a predefined subrange of a plurality of memristive states. For example, the variations among the plurality of memristive structures 1602 (n=1 to N) may lead an overlap of the resistance-characteristic curves of two or more memristive structures even in the case that the two or more memristive structures are in different memristive states. Therefore, the predefined subrange of a plurality of memristive states may allow to introduce a further entropy and therefore to increase the security of the physical unclonable function (PUF).

According to various aspects, the write circuit 602 may be configured to write the respective logic state of each of the plurality of memristive structures 1602 (n=1 to N) non-destructively, i.e. the memristive state of the memristive structures at the end of the write pulse is the same as the memristive state at the beginning of the write pulse, or destructively, so that the memristive state of the memristive structure at the end of the write pulse differs from the memristive state at the beginning of the write pulse. Here, threshold values may be used to determine the respective logic state (of two or more logic states) of each of the plurality of memristive structures 1602 (n=1 to N). A threshold value may be, for example, selected such that 45% to 55% (e.g., about 50%) of the plurality of memristive structures 1602 (n=1 to N) are in one logic state and that the other memristive structures are in another logic state. For example, extracted discrete parameters may be "sorted" with respect to corresponding threshold values which are the values separating discrete values corresponding to different logic states (e.g., "1" and "0"). In the following, two examples of determining the respective logic state are described:

As a first example, the write circuit 602 may be configured to carry out a first write operation during writing with a first voltage value, $V_{write1}$, and a second write operation during writing a second voltage value, $V_{write2}$ (see, for example, FIG. 6 and corresponding description). It is understood that this serves for illustration and that more than two write operations may be carried out during the write operation.

As described herein, one writing step may be carried out at different voltage values during a single write operation. For example, a writing voltage between 0 and a maximum voltage $V_{max}$, a reading voltage between $+v_{max}$ and 0, another writing voltage between 0 and $-V_{max}$, and another reading voltage between $-V_{max}$ and 0 can be applied and the current/voltage curve is determined, see FIG. 17A. Here, we associate the current/voltage characteristic curve between where a write voltage is ramped from 0 V to $+V_{max}$ with a variation of the IV characteristics of the memristive devices 1602 (n=1 . . . 47) FIG. 17A shows measured resistance-characteristic curves of a plurality of memristive structures which have been initialized with the same initialization operation and which have been written with the same write operation. If the physical parameters are identical, the resulting memristive state would be identical. The extracted static state parameters and dynamic state parameters are not identical. This shows illustratively the process variation induced variations among the plurality of memristive structures. We determined the static state parameters and dynamic state parameter values from the current/voltage characteristics of the write curve in the first quadrant by a physical model as follows:

$$V = n_1\frac{k_BT}{q}\log\left(\frac{I}{E[I]}+1\right)\left(1+K_1\frac{k_BT}{q}\log\left(\frac{I}{E[I]}+1\right)\right)+V2$$

with the voltage V applied between top electrode and bottom electrode or with the current sourced between top electrode and bottom electrode. $V=V_1+V_2$ and with $$I = -I_{s2,Branch4}\left(e^{\frac{-qV_2}{k_BT(n_2+K_2V_2)}}-1\right)+\frac{V_2}{F[I]}$$

and with E[I]=Is1[I] and F[I]=Rs2[I].

Figure 17B:
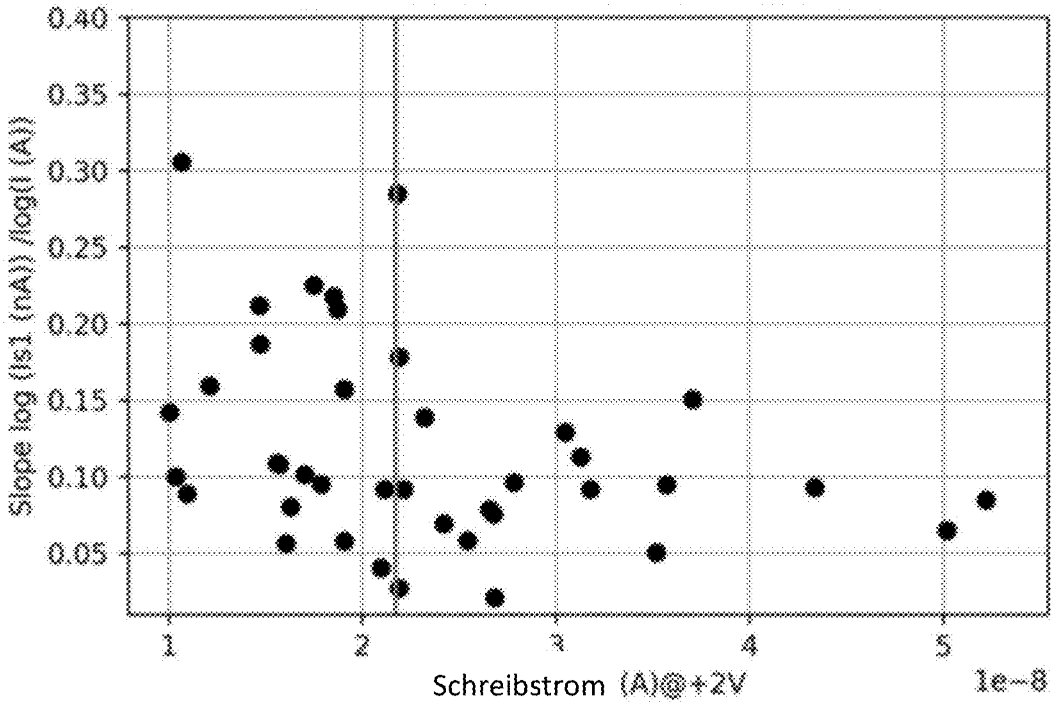
Figure 17C:
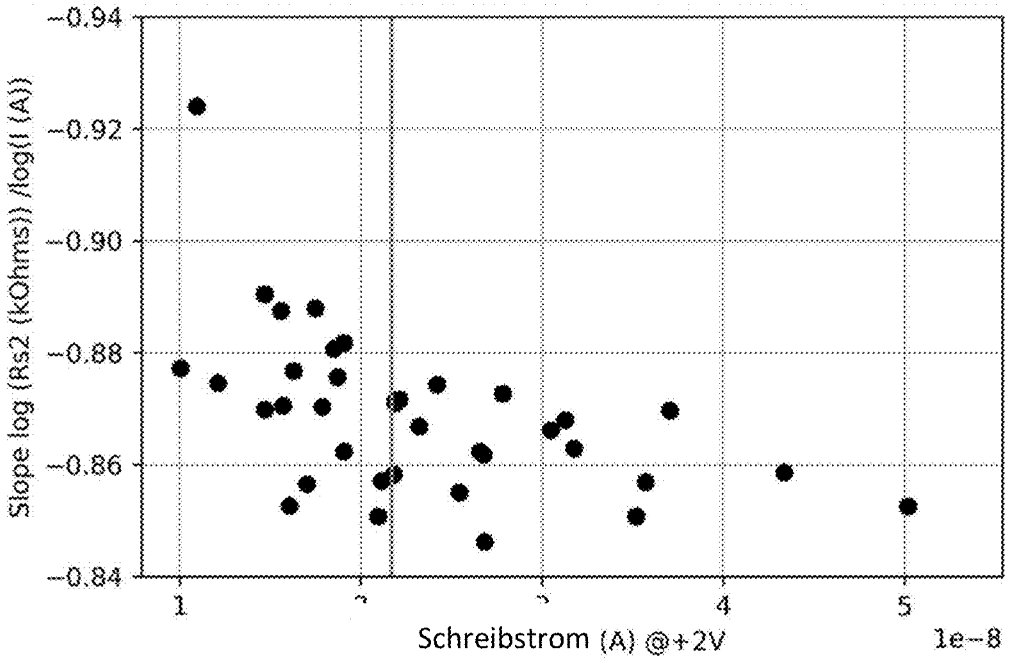

FIG. 17B and FIG. 17C show dynamic state parameters plotted versus the corresponding current at the writing voltage +2 V. The extracted dynamic state parameters slope log IS1[I] vs. log I (FIG. 17B) and slope log RS2[I] vs. log I (FIG. 17C) of the given memristive structures show a clear correlation with the determined current at +2V write voltage of the corresponding memristive structure 1602 (n=1 . . . N=47). Each each dynamic state parameter may be associated with a respective parameter threshold value. For example, all memristive structures of the plurality of memristive structures having a respective dynamic state parameter value less than the respective parameter threshold value may be associated with a first logic state (e.g., “0”) and all memristive structures of the plurality of memristive structures having a respective dynamic state parameter value greater than the respective parameter threshold value may be associated with a second logic state (e.g., “1”) different from the first logic state. For example, all memristive structures of the plurality of memristive structures having a respective dynamic state parameter value less than the respective parameter threshold value may be associated with a first logic state (e.g., “0”) and all memristive structures of the plurality of memristive structures having a respective dynamic state parameter value greater than the respective parameter threshold value may be associated with a second logic state (e.g., “1”) different from the first logic state. Thus, a maximum number of possible memristive states may be given by $2^{s+d}$, wherein s is the number of static state parameters and d is the number of dynamic state parameters.

As shown in FIG. 17B and in FIG. 17C, the dynamic state parameters may vary among a comparatively broad range. This may allow to distinguish memristive structure by their dynamic state parameters. Those dynamic state parameters are extracted in a process where the static state parameters of initial static state before writing operation are fitted, the current/voltage characteristics during write operation is determined, the static state parameters of the final static state are determined after writing operation and the dynamic state parameters are extracted by a physical model based on the static state parameters of the initial state and of the final state. This may be used to enhance the distinguishability of memristive structures by their static state parameters and by their dynamic state parameters. Increasing the number of used memristive states (i.e., increasing the number of memristive states within the predefined subrange of memristive states, e.g., up to all memristive states) and of dynamic properties may further increase the security of the device (e.g., of the PUF). In this case, the memristive states of the plurality of memristive structures may be (e.g., randomly) distributed over the memristive states within the predefined subrange of memristive states (e.g., over all memristive states of the memristive structures) and the different dynamic properties are distributed over the device.

Figure 16A:
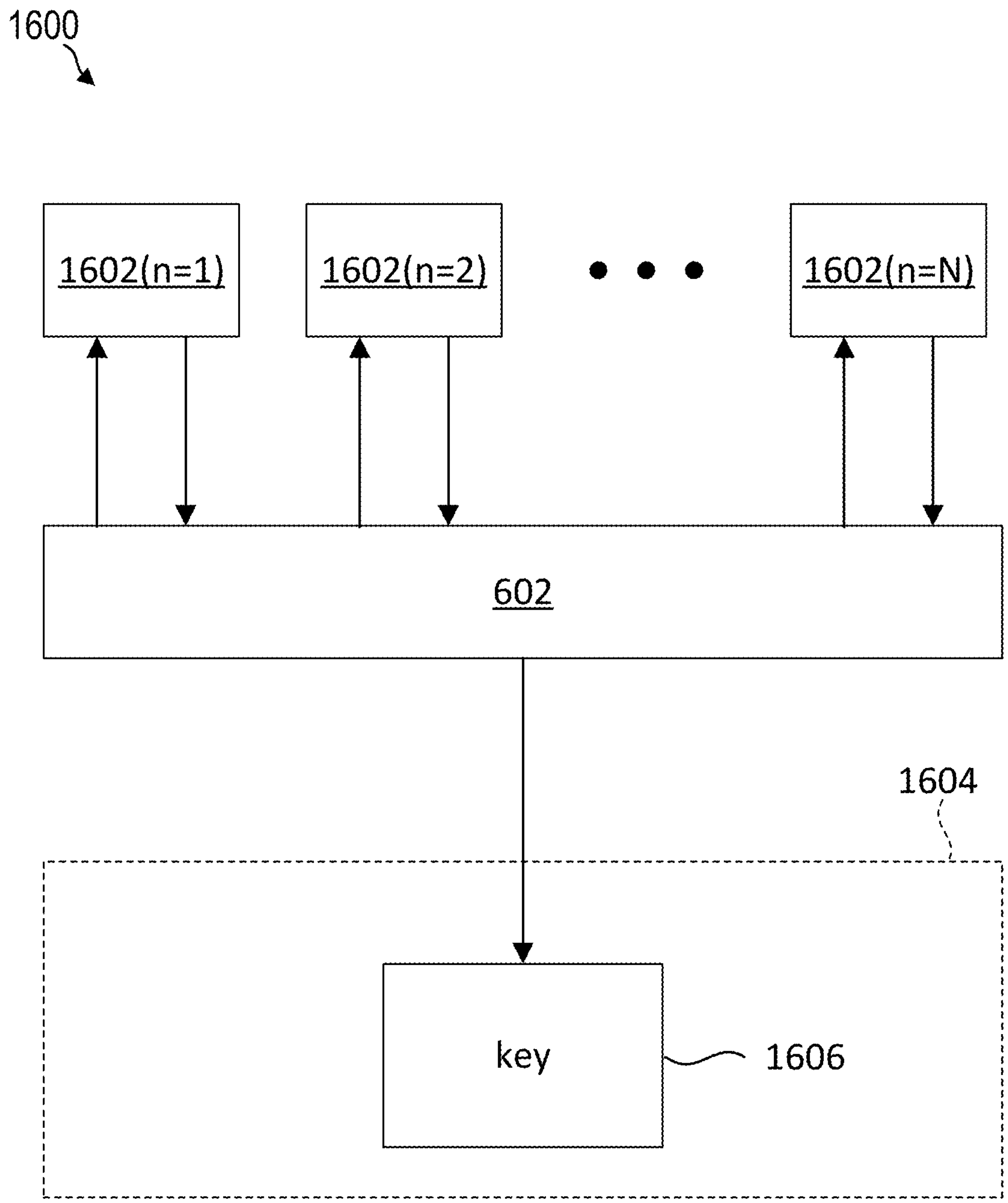
FIGS. 16A to 16D each shows a device having a write circuit which writes a respective logic state of a plurality of memristive structures via at least two write steps during a single write operation and which is capable to generate a key based on the logic states applied to the plurality of memristive structures; The write steps are determined by the voltage-time or current time profile. The write operations applied to the plurality of memristive structures are the same. The resulting plurality of memristive structures shows a variation of states after applying the same write operation.
Figure 16B:
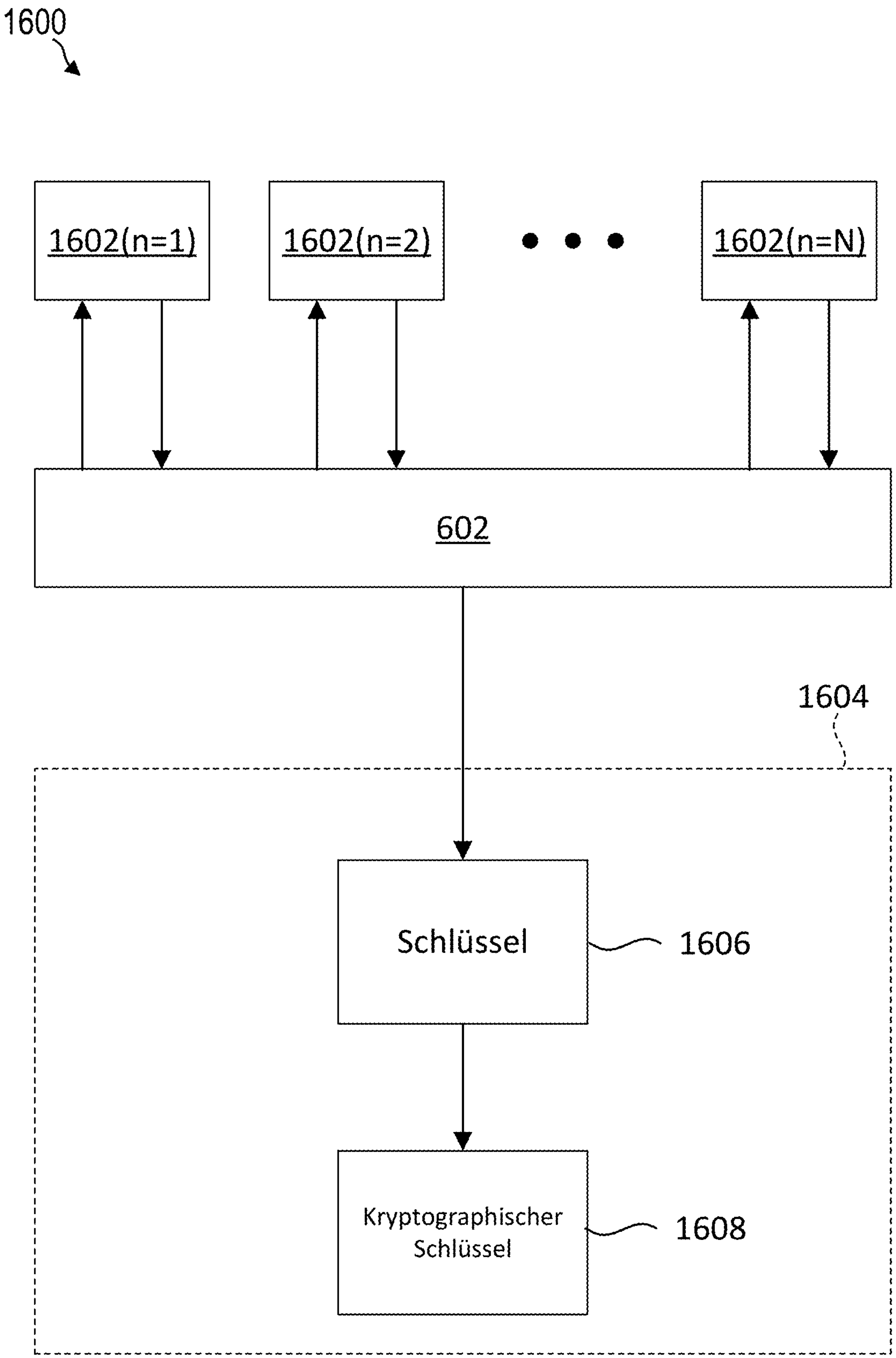
Figure 16C:
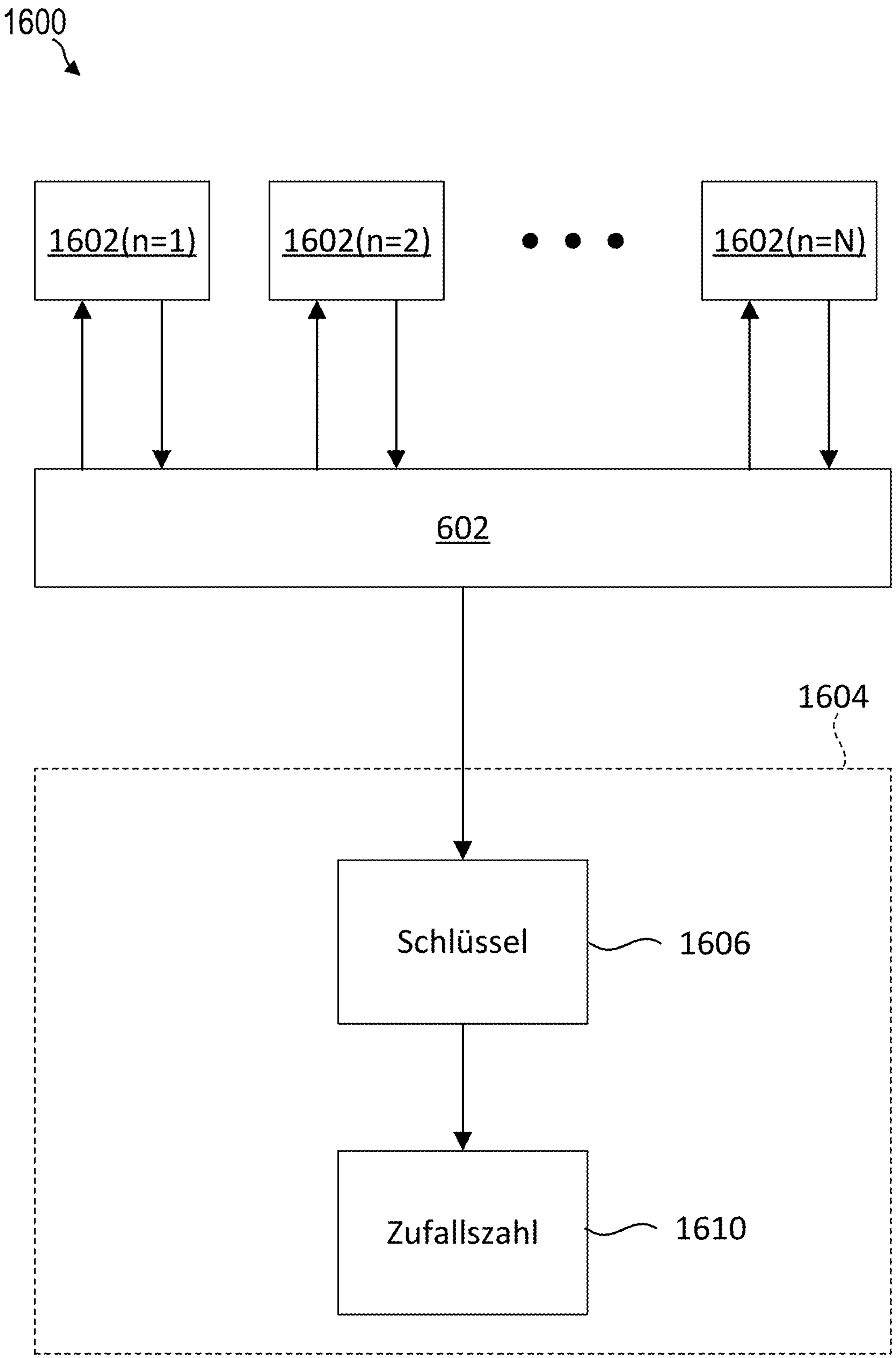

With reference to FIG. 16B, the one or more processors 1604 may be configured to generate a cryptographic key 1608 using the determined key 1606. Hence, the device 1600 may serve as a cryptographic device. As described, each memristive structure may be associated with two or more intermediate logic states. Hence, the device 1600 may be a many-state-device. The one or more processors 902 may be, for example, configured to map these two or more logic states to either two logic states (e.g., “0” and “1”) or a combination of these two logic states. As an example, in the case of the two measurements during the write operation, the four possible intermediate logic states may be mapped to “00”, “01”, “10”, and “11”. The key 1606 may then, for example, include these combinations of all memristive structures. As described herein, in the case of using the static state parameter values 812 and the dynamic state parameters, the number of possible intermediate logic states and, therefore, also the number of combinations of two logic states may be increased. The one or more processors 1604 may be configured to generate the cryptographic key 1608 by applying an encryption algorithm on the determined key 1606. With reference to FIG. 16C, the one or more processors 1604 may be configured to generate (e.g., using a shift register) a random number 1610 using the determined key 1606. Hence, the device 1600 may serve as a random number generator.

Figure 16D:
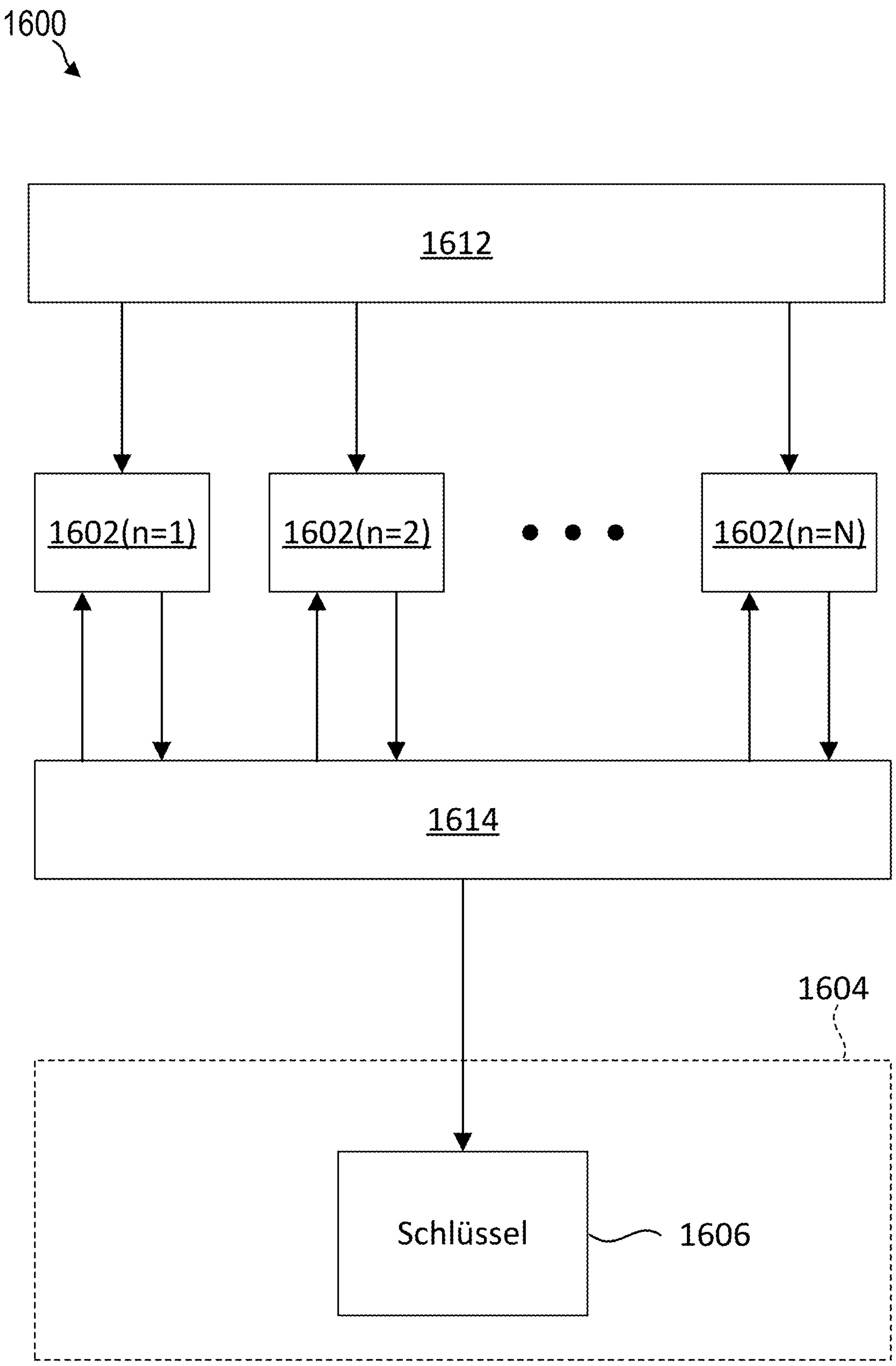

With reference to FIG. 16D, the device 1600 may include a write circuit 1612 and a read circuit 1614 (which may be both part of an operating circuit). The read circuit 1614 may be configured to read the respective memristive state of each of the plurality of memristive elements 1602. The write circuit 1612 may be configured to (individually) set (e.g., write) each of the memristive structures into a respective memristive state. Hence, the device 1600 may be a reconfigurable device (e.g., may serve as a reconfigurable PUF).

This may allow to change the key 1606 (and, hence, e.g., the cryptographic key 1608). According to various aspects, the device 1600 may include a random number generator and the write circuit may be configured to select the memristive state into which a respective memristive element of the plurality of memristive elements is to be written of the plurality of memristive states based on a random number generated by the random number generator. This may further increase the randomness and, thus, the security.

The device 1600 may be any device which may use or may be employed to generate a key (e.g., a cryptographic key), a random number, etc. Thus, the device 1600 may be or may be part of any suitable security device. For example, the device 1600 may be or may be part of a hardware security module, a security key (e.g., a Universal Serial Bus (USB) security key), and/or a secure cryptoprocessor.

When determining the logic state via two or more measurements during a single read-out operation (e.g., using the static state parameter values), the variability of different PUFs may be determined with reduced error rate (in comparison to a single read-out value).

As described herein, the device 1500 and/or the device 1600 may be an analog device.

Figure 18:
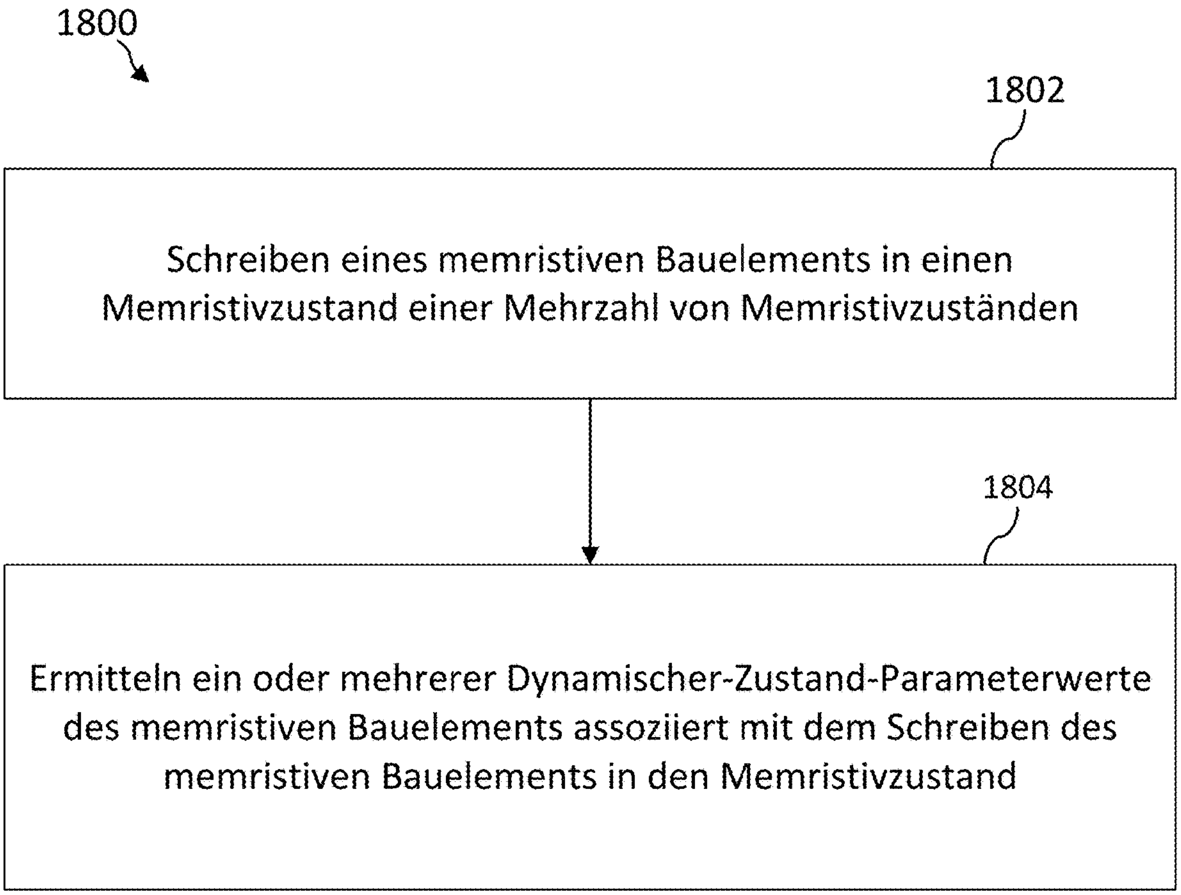
FIGS. 18 to 20 each shows a flow diagram of a respective method of determining one or more dynamic state parameter values according to various aspects.

FIG. 18 shows a flow diagram of a method 1800 for determining one or more dynamic state parameters.

The method 1800 may include writing a memristive element (e.g., from an initial memristive state of a plurality of memristive states) into a (e.g., final) memristive state of a plurality of memristive states (e.g., by applying a writing pulse (e.g., a voltage pulse or a current pulse) to a memristive element which is set into a memristive state and measuring the signal (e.g. a current pulse, if the voltage is ramped, or a voltage pulse, if the current is ramped)) (in 1802).

The method 1800 may include determining one or more dynamic state parameter values of the memristive element associated with the writing of the memristive element into the memristive state (in 1804). Determining the one or more dynamic state parameter values may include: determining a current/voltage characteristic of the memristive element, and fitting the current/voltage characteristic by a physical model to determine the one or more dynamic state parameter values, wherein the physical model is based on dynamic state parameters for which the dynamic state parameter values are determined.

Figure 19:
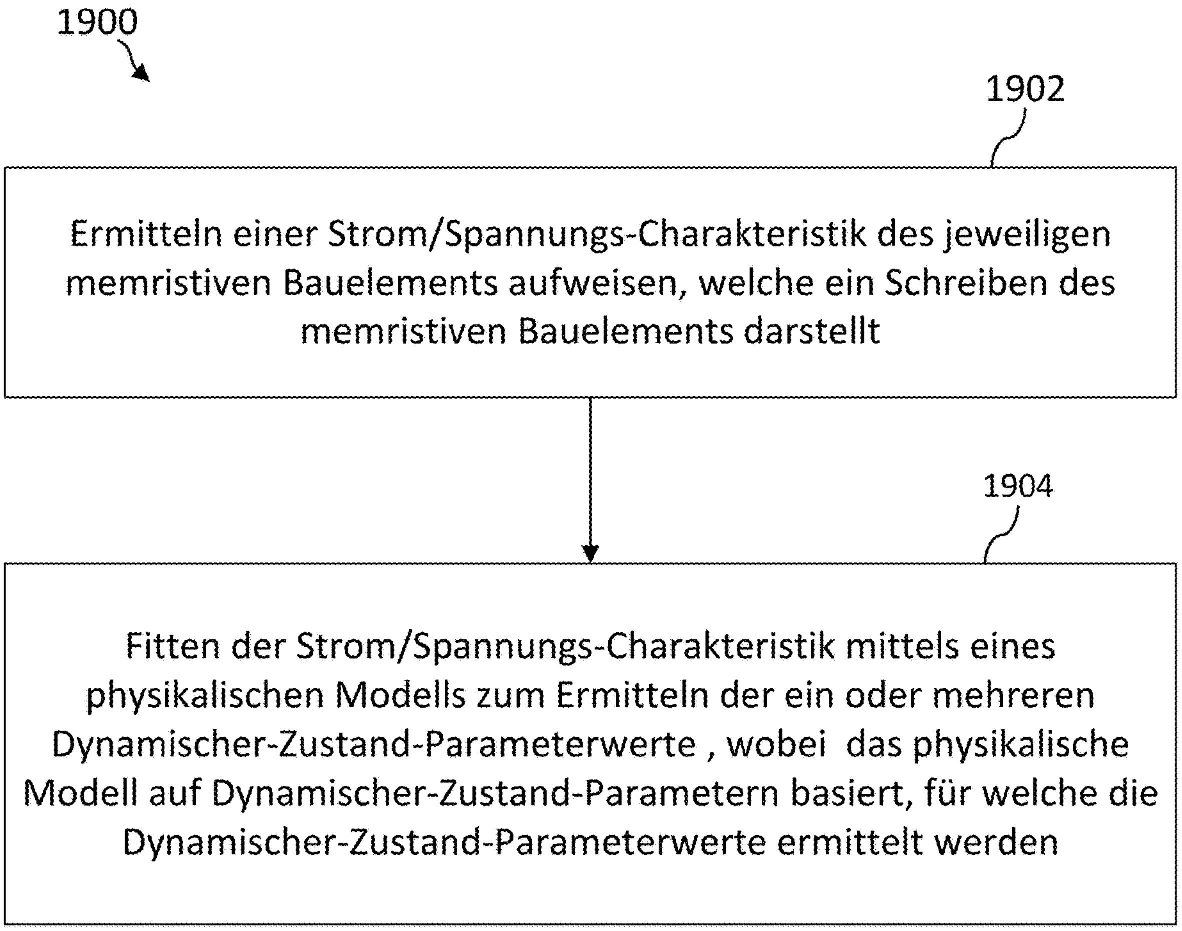

FIG. 19 shows a flow diagram of a method 1900 for determining one or more dynamic state parameters. The method 1900 may include determining a current/voltage characteristic of the respective memristive element that represents a writing of the memristive element (in 1902). The method 1900 may include fitting the current/voltage characteristic by a physical model to determine the one or more dynamic state parameter values, wherein the physical model is based on dynamic state parameters for which the dynamic state parameter values are determined (in 1904).

Figure 20:
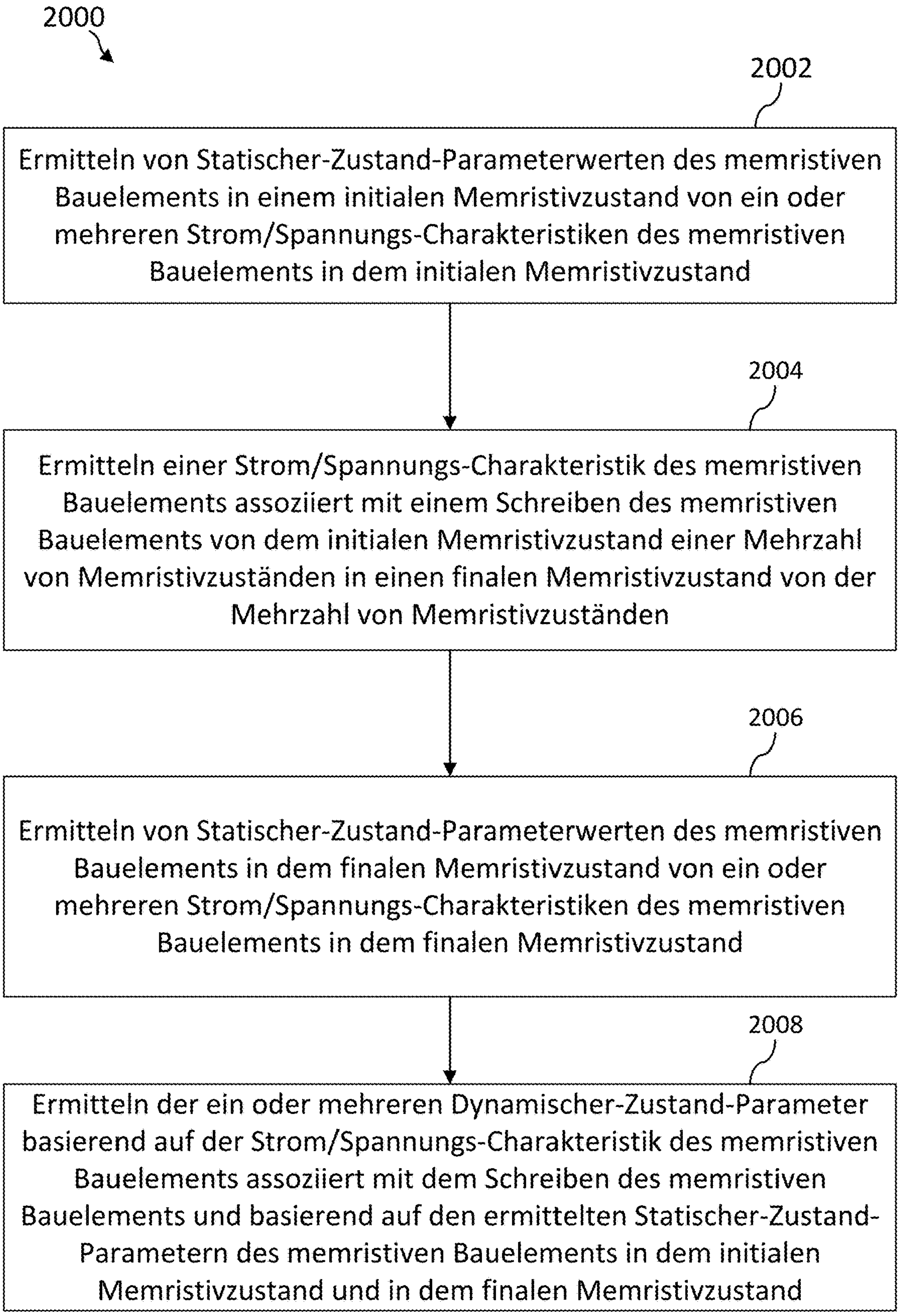

FIG. 20 a flow diagram of a method 2000 for determining one or more dynamic state parameters. The method 2000 may include determining static state parameters of the memristive element in an initial memristive state from one or more current/voltage characteristics of the memristive element in the initial memristive state (in 2002). The method 2000 may include determining a current/voltage characteristic of the memristive element associated with a writing of the memristive element from the initial memristive state of a plurality of memristive states into a final memristive state of the plurality of memristive states (in 2004). The method 2000 may include determining static state parameters of the memristive element in the final memristive state from one or more current/voltage characteristics of the memristive element in the final memristive state (in 2006). The method 2000 may include determining the one or more dynamic state parameters based on the current/voltage characteristic of the memristive element associated with the writing of the memristive element and based on the determined static state parameters of the memristive element in the initial memristive state and in the final memristive state (in 2008).

Figure 21:
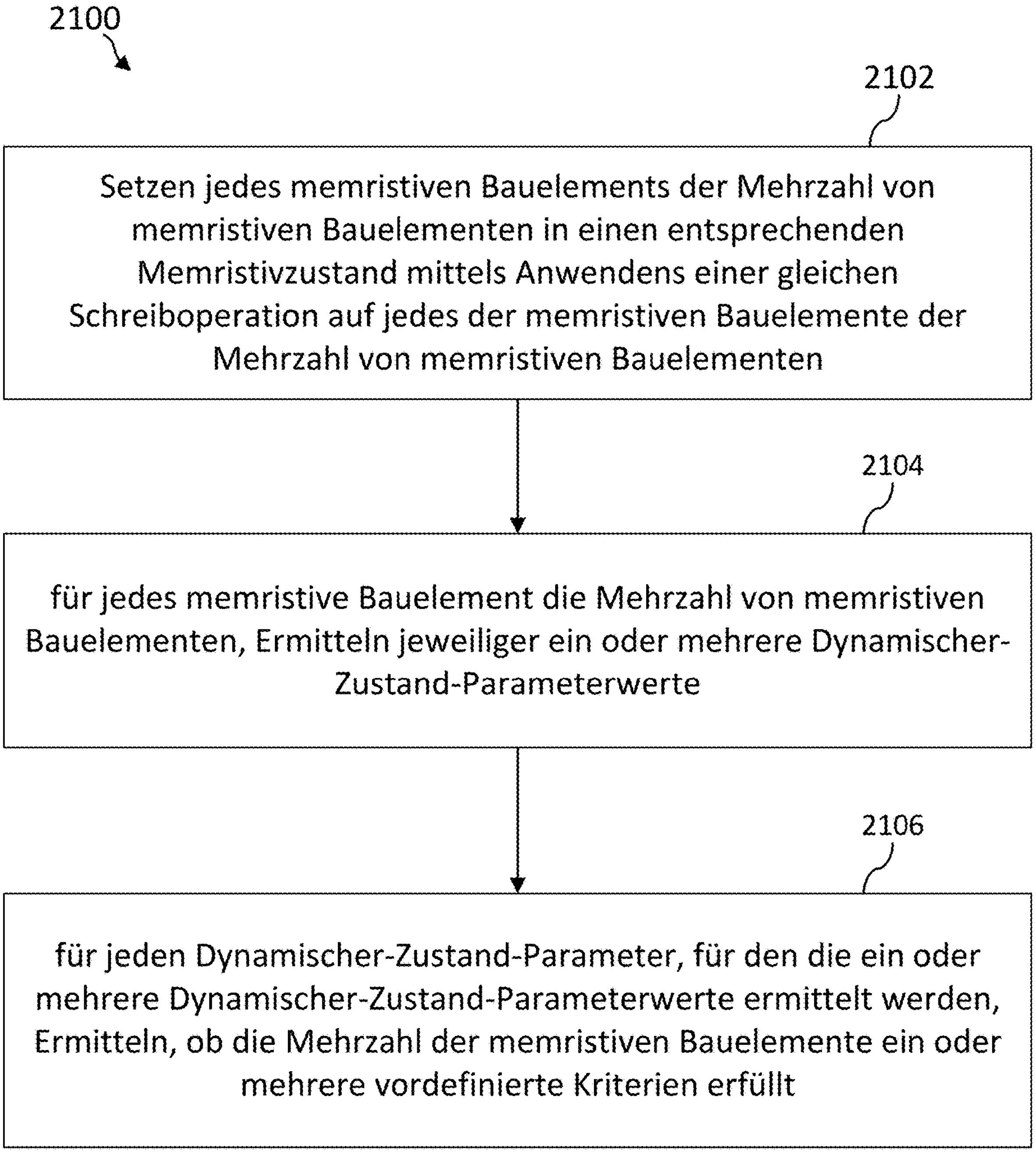
FIG. 21 shows a flow diagram of a method for validating a memristive device according to various aspects.

FIG. 21 shows a flow diagram of a method 2100 for validating a memristive device which includes a plurality of memristive elements.

The method 2100 may include setting each memristive element of the plurality of memristive elements into a corresponding memristive state by applying a same write operation to each of the memristive elements of the plurality of memristive elements (in 2102).

The method 2100 may include for each memristive element of the plurality of memristive elements, determining respective one or more dynamic state parameter values (in 2104).

According to some aspects, determining the one or more dynamic state parameter values of a respective memristive element may include: determining a current/voltage characteristic of the respective memristive element and fitting the current/voltage characteristic by a physical model to determine the one or more dynamic state parameter values. The physical model may be based on dynamic state parameters for which the dynamic state parameter values are determined.

According to other aspects, determining the one or more dynamic state parameter values of a respective memristive element may include: determining static state parameters of the memristive element in an initial memristive state from one or more current/voltage characteristics of the respective memristive element in the initial memristive state; determining a current/voltage characteristic associated with a writing of the memristive element from the initial memristive state of a plurality of memristive states into a final memristive state of the plurality of memristive states; determining static state parameters of the memristive element in the final memristive state from one or more current/voltage characteristic of the respective memristive element in the final memristive state; and determining the one or more dynamic state parameters based on the current/voltage characteristic of the respective memristive element associated with the writing of the memristive element from the initial memristive state to the final memristive state and based on the determined static state parameters.

The method 2100 may include for each dynamic state parameter for which the one or more dynamic state parameter values are determined, determining, whether the plurality of memristive elements fulfills one or more predefined criteria (in 2106). The plurality of memristive elements may fulfill the one or more predefined criteria for a respective dynamic state parameter in the case that a variation of the determined dynamic state parameter values associated with the respective dynamic state parameter among the plurality of memristive elements is equal to or less than a predefined threshold variation.

In the following, various examples are provided that may include one or more aspects described above with reference to writing a memristive structure, such as via one of the devices 1500, 1600 and/or using one of the methods 1800, 1900, 2000. It may be intended that aspects described in relation one or more devices 1500, 1600 may apply also to one or more methods, and vice versa.

Example 1 is a method including: applying a voltage pulse to a memristive element (in some aspects referred to as memristive structure) which is set (e.g., written) into a memristive state; during applying the voltage pulse to the memristive element, measuring a first current value associated with a current through the memristive element at a first voltage value and a second current value associated with the current through the memristive element at a second voltage value different from the first voltage value.

In Example 2, the method of Example 1 can optionally further include: setting (e.g., writing) the memristive element into the memristive state prior to applying the voltage pulse to the memristive element.

In Example 3, the subject matter of Example 1 or 2 can optionally include that the first voltage value and the second voltage value do not change the memristive state of the memristive element. For example, the first voltage value and the second voltage value may be larger than a programming voltage (e.g., write voltage) used to set (e.g., write) the memristive element into the memristive state.

In Example 4, the subject matter of any one of Examples 1 to 3 can optionally include that a minimum voltage value of the voltage pulse does start to change the memristive state of the memristive element. For example, the minimum voltage value of the voltage pulse may be equal to or larger than a programming voltage (e.g., write voltage) used to set (e.g., write) the memristive element into the memristive state.

In Example 5, the subject matter of any one of Examples 1 to 4 can optionally include that the voltage pulse and a programming voltage (e.g., write voltage) used to set (e.g., write) the memristive element into the memristive state are of the same polarity.

In Example 6, the subject matter of any one of Examples 1 to 5 can optionally include that the first current value and the second current value are measured during a rising edge of the applied voltage pulse.

In Example 7, the subject matter of any one of Examples 1 to 5 can optionally include that the first current value and the second current value are measured during a falling edge of the applied voltage pulse.

In Example 8, the subject matter of any one of Examples 1 to 7 can optionally include that measuring the first current value and the second current value includes: during a rising edge and/or a falling edge of the voltage pulse, measuring a current through the memristive element to determine a current/voltage characteristic of the memristive element, the measured current including the first current value and the second current value.

In Example 9, the method of any one of Examples 1 to 8 can optionally further include: applying a further voltage pulse (e.g., directly following) to the memristive element, the further voltage pulse having opposite polarity to the voltage pulse; during a falling edge of the applied further voltage pulse, measuring a third current value associated with the current through the memristive element at a third voltage value and a fourth current value associated with the current through the memristive element at a fourth voltage value different from the third voltage value.

Example 10 is a method including: applying a voltage pulse to a memristive element; during a falling edge of the applied voltage pulse, measuring a first current value associated with a current through the memristive element at a first voltage value and a second current value associated with the current through the memristive element at a second voltage value different from the first voltage value.

In Example 11, the method of Example 10 can optionally further include: setting (e.g., writing) the memristive element into a memristive state prior to applying the voltage pulse to the memristive element.

In Example 12, the subject matter of Example 11 can optionally include that the voltage pulse and a programming voltage (e.g., write voltage) used to set (e.g., write) the memristive element into the memristive state are of the same polarity.

In Example 13, the subject matter of Example 10 can optionally include that applying the voltage pulse to the memristive element includes setting (e.g., writing) the memristive element into a memristive state during a rising edge of the applied voltage pulse.

In Example 14, the method of any one of Examples 10 to 13 can optionally further include: applying a further voltage pulse (e.g., directly following) to the memristive element, the further voltage pulse having opposite polarity to the voltage pulse; during a falling edge of the applied further voltage pulse, measuring a third current value associated with the current through the memristive element at a third voltage value and a fourth current value associated with the current through the memristive element at a fourth voltage value different from the third voltage value.

In Example 15, the subject matter of any one of Examples 10 to 14 can optionally include that measuring the first current value and the second current value includes: measuring a current through the memristive element to determine a current/voltage characteristic of the memristive element, the measured current including the first current value and the second current value.

Example 16 is a method for determining static state parameter values and dynamic state parameters of a memristive element, the method including: setting a (e.g., manufactured) memristive element into a memristive state of a plurality of memristive states, determining one or more static state parameter values and dynamic state parameter values of the memristive element associated with the memristive state, wherein determining the one or more static state parameter values and dynamic state parameter values includes: determining (e.g., measuring and, optionally, plotting) a current/voltage characteristic of the memristive element by applying a write voltage sequence to the memristive element to cause a corresponding current sequence through the memristive element, fitting the current/voltage characteristic by a physical model to determine the one or more static state parameter values and dynamic state parameter values, wherein the physical model is based on static state parameters for which the static state parameter values are determined and on the dynamic state parameters for which the dynamic state parameter values are determined.

The term determine as described according to various aspects may be understood in some aspects to include one or more aspects of measuring, modelling, plotting, fitting, and the like. However, a measurement may include a certain degree of modelling, plotting, fitting as well.

In Example 17, the method of Example 16 can optionally further include: setting the memristive element into another memristive state of the plurality of memristive states, determining one or more other static state parameter values and dynamic state parameters values of the memristive element associated with the other memristive state, wherein determining the one or more other static state parameter values and dynamic state parameters includes: determining (e.g., measuring and, optionally, plotting) another current/voltage characteristic of the memristive element by applying a write voltage sequence (e.g., the same write voltage sequence or another write voltage sequence) to the memristive element to cause a corresponding current sequence through the memristive element, fitting the other current/voltage characteristic by the physical model to determine the one or more other static state parameter values and dynamic state parameters.

In Example 18, the method of Example 16 or 17 can optionally further include: simulating, based on the determined static state parameter values (e.g., the determined one or more static state parameter values and/or the determined one or more other static state parameter values) and based on the determined dynamic state parameter values (e.g., the determined one or more dynamic state parameter values and/or the determined one or more other dynamic state parameter values) the behavior of a memristive circuit (e.g., via electronic circuit simulation) which includes one or more memristive elements configured in accordance with the (e.g., manufactured) memristive element.

In Example 19, the subject matter of Example 18 can optionally include that simulating the behavior of the memristive circuit includes: varying one or more simulation parameters associated with an operation of the memristive circuit.

In Example 20, the subject matter of Example 19 can optionally include that the one or more simulation parameters include at least one parameter from the following list of parameters: a temperature of the memristive element, a programming voltage for setting a memristive state, a read voltage for reading the memristive state of the memristive element, and/or a desired current through the memristive element responsive to applying a corresponding read voltage.

In Example 21, the subject matter of any one of Examples 18 to 20 can optionally include that the current/voltage characteristic of the memristive element is determined at a first temperature value; and wherein simulating the behavior of the memristive circuit includes simulating the behavior of the memristive circuit at a second temperature value different from the first temperature value.

In Example 22, the subject matter of any one of Examples 18 to 21 can optionally include that each determined static state parameter value and dynamic state parameter value is associated with a respective error; and wherein the simulation of the behavior of the memristive circuit is carried out in consideration of the respective error (e.g., as noise) of the determined static state parameter values and dynamic state parameter values.

In Example 23, the method of any one of Examples 18 to 22 can optionally further include: measuring a static state parameter value of at least one static state parameter or a dynamic state parameter value of at least one dynamic state parameter; determining a difference between the measured static state parameter value and the static state parameter value determined for the at least one static state parameter via the physical model or determining a difference between the measured dynamic state parameter value and the dynamic state parameter value determined for the at least one dynamic state parameter via the physical model; and in the case that the determined difference is less than a predefined verification value, verify the determined static state parameter value and/or the determined dynamic state parameter value.

In Example 24, the method of any one of Examples 18 to 23 can optionally further include: setting the memristive element into the other memristive states of the plurality of memristive states one after another; in each of the other memristive states of the plurality of memristive states, determining respective one or more static state parameter values and dynamic state parameter values of the memristive element to determine a functional correlation between the one or more static state parameter values and dynamic state parameter values and the memristive states; and wherein the simulation of the behavior of the memristive circuit is carried using the determined functional correlation.

In Example 25, the method of any one of Examples 16 to 24 can optionally further include: selecting (e.g., adapting), based on the determined static state parameter values (e.g., the determined one or more static state parameter values and/or the determined one or more other static state parameter values) and dynamic state parameters (e.g., the determined one or more dynamic state parameter values and/or the determined one or more other dynamic state parameter values), operating parameters associated with an operation of the memristive element (e.g., as a function of the determined static state parameter values and dynamic state parameter values).

In Example 26, the subject matter of Example 25 can optionally include that the selected operating parameters include at least one operating parameter of the following list of operating parameters: a (e.g., respective) write voltage for writing the memristive state of the memristive element, and/or an operating temperature.

In Example 27, the subject matter of Example 24 or 25, provided that in combination with Example 17, can optionally include that the selected operating parameters include a programming voltage (e.g., write voltage) for setting the memristive element into a corresponding memristive state of the plurality of memristive states.

In Example 28, the subject matter of any one of Examples 25 to 27 can optionally include that selecting the operating parameters based on the determined static state parameter values and dynamic state parameter values includes adapting at least one operating parameter associated with the operation of the memristive element during use of the memristive element (e.g., allowing a reconfiguration in use due to possible changes (e.g., temperature)).

In Example 29, the method of Example 28 can optionally further include: operating the memristive element based on initial operating parameters and, after adapting the at least one operating parameter, operating the memristive element based on the adapted at least one operating parameter.

Example 30 is an example for selecting operating parameters associated with an operation of a memristive device which includes a plurality of memristive elements, the method including: for each memristive element of the plurality of memristive elements, determining respective one or more static state parameter values and dynamic state parameter values in accordance with the method of Example 16; selecting, based on the static state parameter values and dynamic state parameter values determined for the plurality of memristive elements, the operating parameters associated with the operation of the memristive device.

In Example 31, the method according to any one of Examples 16 to 30 can optionally further include: determining (e.g., classifying), based on the determined static state parameter values (e.g., the determined one or more static state parameter values and/or the determined one or more other static state parameter values) and dynamic state parameters (e.g., the determined one or more dynamic state parameter values and/or the determined one or more other dynamic state parameter values), whether the memristive state of the memristive element is associated with a first logic state (e.g., "0") or a second logic state (e.g., "1").

In Example 32, the method of any one of Examples 16 to 31 can optionally further include: determining (e.g., classifying), for at least one (e.g., for each) static state parameter value and dynamic state parameter value of the determined static state parameter values and of dynamic state parameter values (e.g., the determined one or more static state parameter values and dynamic state parameter values and/or the determined one or more other static state parameter values and dynamic state parameter values), whether the at least one static state parameter value and/or dynamic state parameter value is within a predefined range associated with the at least one static state parameter value and/or dynamic state parameter value.

In Example 33, the method of Example 32 can optionally further include: in the case that the at least one static state parameter value and/or dynamic state parameter value is within the predefined range associated with the at least one static state parameter value and/or dynamic state parameter value, validating the memristive element.

In Example 34, the method of any one of Examples 16 to 31 can optionally further include: validating the memristive element in the case that each static state parameter value of the determined static state parameter values (e.g., the determined one or more static state parameter values and/or the determined one or more other static state parameter values) and that each dynamic state parameter value of the determined dynamic state parameter values (e.g., the determined one or more dynamic state parameter values and/or the determined one or more other dynamic state parameter values) is within a respective predefined range.

Example 35 is a method for validating a memristive device which includes a plurality of memristive elements, the method including: for each memristive element of the plurality of memristive elements, determining respective one or more static state parameter values and/or dynamic state parameter values in accordance with the method of Example 16; for each static state parameter for which the one or more static state parameter values and/or dynamic state parameter values are determined, determining, whether the plurality of memristive elements fulfills one or more predefined criteria, wherein the plurality of memristive elements fulfill the one or more predefined criteria for a respective static state parameter and/or for a respective dynamic state parameter in the case that a variation of the determined static state parameter values and/or dynamic state parameter values associated with the respective static state parameter and/or dynamic state parameter between the plurality of memristive elements is equal to or less than a predefined threshold variation.

In Example 36, the subject matter of Example 35 can optionally include that the variation of the determined static state parameter values associated with the respective static state parameter is a deviation from an average value, the average value determined by averaging the static state parameter values associated with the respective static state parameter over the plurality of memristive elements and/or that the variation of the determined dynamic state parameter values associated with the respective dynamic state parameter is a deviation from an average value, the average value determined by averaging the dynamic state parameter values associated with the respective dynamic state parameter over the plurality of memristive elements.

Example 37 is a method for validating memristive elements of a plurality of memristive elements, the method including: for each memristive element of the plurality of memristive elements, determining respective one or more static state parameter values and/or dynamic state parameter values in accordance with the method of Example 16; determining, whether a respective memristive element of the plurality of memristive elements fulfills one or more predefined criteria, wherein the respective memristive element fulfills the one or more predefined criteria in the case that each of the one or more static state parameter values and/or dynamic state parameter values determined for the respective memristive element fulfills a respective criterion, wherein a respective static state parameter value and/or dynamic state parameter value fulfills the criterion in the case that the respective static state parameter value and/or dynamic state parameter value is within a predefined range associated with the respective static state parameter and/or dynamic state parameter for which the respective static state parameter value and/or dynamic state parameter value is determined; and validating the respective element in the case that the respective element fulfills the one or more predefined criteria.

In Example 38, the subject matter of Example 37 can optionally include that the predefined range associated with the respective static state parameter and/or dynamic state parameter defines a deviation from an average value, the average value determined by averaging the static state parameter values and/or dynamic state parameter values associated with the respective static state parameter and/or dynamic state parameter over the plurality of memristive elements.

In Example 39, the method of Example 37 or 38 can optionally further include: invalidating the respective memristive element in the case that the respective element does not fulfill at least one of the one or more predefined criteria (invalidated memristive elements may, for example, not be addressed during use).

In Example 40, the method according to any one of Examples 16 to 39 can optionally further include: setting the memristive element into the other memristive states of the plurality of memristive states one after another; in each of the other memristive states of the plurality of memristive states, determining respective one or more static state parameter values and/or dynamic state parameter values of the memristive element in accordance with the method of Example 16 to determine a functional correlation between the one or more static state parameter values and/or dynamic state parameter values and the memristive states.

Example 41 is a method for determining static state parameter values and/or dynamic state parameter values of a memristive element as a function of a memristive state of the memristive element, the method including: setting the memristive element into each memristive state of the plurality of memristive states one after another; in each memristive state of the plurality of memristive states, determining respective one or more static state parameter values and dynamic state parameter values of the memristive element in accordance with the method of Example 16 to determine a functional correlation between the one or more static state parameter values and dynamic state parameter values and the memristive states.

In Example 42, the subject matter of Example 40 or 41 can optionally include that setting the memristive element into a respective memristive state of the plurality of memristive states includes applying a programming voltage associated with the respective memristive state to the memristive element.

In Example 43, the subject matter of any one of Examples 16 to 42 can optionally include that the one or more static state parameters and dynamic state parameter are correlated to (e.g., electrical and/or manufacturing-related) properties of the memristive element.

In Example 44, the subject matter of any one of Examples 16 to 43 can optionally include that the one or more static state parameters and dynamic state parameter values characterize the memristive element.

In Example 45, the subject matter of any one of Examples 16 to 44 can optionally include that the one or more static state parameters include at least one parameter of the following list of parameters: a series resistance of the memristive device, an ideality factor of the memristive device, a reverse saturation current of the memristive device, and/or barrier potential of the memristive device.

In Example 46, the subject matter of any one of Examples 16 to 45 can optionally include that the current/voltage characteristic of branch 1 is fitted according to the physical model (e.g., used for fitting the writing curve 302) and may be given after initialization in high resistance state (HRS) by $$V = n_1\frac{k_BT}{q}\log\left(\frac{I}{E[I]}+1\right)\left(1+K_1\frac{k_BT}{q}\log\left(\frac{I}{E[I]}+1\right)\right)+V2$$

with the voltage V applied between top electrode and bottom electrode or with the current sourced between top electrode and bottom electrode. $V=V_1+V_2$ and with $$I = -I_{s2,Branch4}\left(e^{\frac{-qV_2}{k_BT(n_2+K_2V_2)}}-1\right)+\frac{V_2}{F[I]}$$

and may be given after initialization in low resistance (LRS) by:

$$V = -n_2\frac{k_BT}{q}\log\left(\frac{I}{G[I]}+1\right)\left(1+K_2\frac{k_BT}{q}\log\left(\frac{I}{G[I]}+1\right)\right)+V1$$

with $V=V_1+V_2$ and with $$I = +I_{s1,Branch2}\left(e^{\frac{+qV_1}{k_BT(n_1-K_1V_1)}}-1\right)+\frac{V_1}{H[I]}$$

wherein: V may be the applied voltage, I may be the current through the memristive structure responsive to applying the read voltage, $k_B$ may be the Boltzmann constant, T may be the temperature of the memristive structure, q may be the electron charge, and E[I], F[I], G[I], and H[I] each may be a respective dynamic state parameter. According to various aspects, the physical model (e.g., used for fitting the writing curve 302) may be given with $E[I]=I_{s1}[I]$, $F[I]=R_{s2}[I]$, $G[I]=I_{s2}[I]$, $H[I]=R_{s1}[I]$ after initialization in high resistance state (HRS) by $$V = n_1\frac{k_BT}{q}\log\left(\frac{I}{I_{s1}[I]}+1\right)\left(1+K_1\frac{k_BT}{q}\log\left(\frac{I}{I_{s1}[I]}+1\right)\right)+V2$$

with $V=V_1+V_2$ and with $$I = -I_{s2,Branch4}\left(e^{\frac{-qV_2}{k_BT(n_2+K_2V_2)}}-1\right)+\frac{V_2}{R_{s2}[I]}$$

and may be given after initialization in low resistance (LRS) by:

$$V = -n_2\frac{k_BT}{q}\log\left(\frac{I}{I_{s2}[I]}+1\right)\left(1+K_2\frac{k_BT}{q}\log\left(\frac{I}{I_{s2}[I]}+1\right)\right)+V1$$

with $V=V_1+V_2$ and with $$I = +I_{s1,Branch2}\left(e^{\frac{+qV_1}{k_BT(n_1-K_1V_1)}}-1\right)+\frac{V_1}{R_{s1}[I]}$$

wherein: V may be the applied write voltage, I may be the current through the memristive structure responsive to applying the write voltage, $k_B$ may be the Boltzmann constant, T may be the temperature of the memristive structure, q may be the electron charge, and $I_{S1}[I]$, $R_{S2}[I]$, $I_{S2}[I]$, and $R_{S1}[I]$ each may be a respective dynamic state parameter. $I_{S1}[I]$ describes the saturation current of the top electrode in forward direction (positive bias applied to top electrode). $R_{S2}[I]$ describes the depletion resistance of the bottom electrode in reverse direction (positive bias applied to top electrode). $I_{S2}[I]$ describes the saturation current of the bottom electrode in reverse direction (negative bias applied to top electrode). $R_{S1}[I]$ describes the depletion resistance of the top electrode in forward direction (negative bias applied to top electrode). Example 48 is a device (e.g., a memory device, a storage device, a processing device) including: at least one memristive element including a memristive state of a plurality of memristive states; and a write circuit configured to: change the memristive state of the at least one memristive element based on at least two writing processes during a single write operation, the at least two write process using different write voltage values or different write current values.

In Example 49, the subject matter of Example 48 can optionally include that each write operation of the at least two write processes includes: writing an electric current through the at least one memristive element responsive to applying a respective write voltage or write a voltage at one memristive element responsive to applying a respective write current.

In Example 50, the subject matter of Example 48 or 49 can optionally include that the write circuit is configured to: carry out, during the single write operation, a first write process to set a first memristive state of the at least one memristive element, carry out, during the single read-out operation, a second write operation to set a second expected memristive state of the at least one memristive element, and write the memristive state of the at least one memristive element based on the written first expected memristive state and the determined second expected memristive state.

In Example 51, the subject matter of Example 50 can optionally include that the write circuit is configured to: determine, whether the first expected memristive state corresponds to the second expected memristive state, and in the case that the first expected memristive state corresponds to the second expected memristive state, determine the first expected memristive state as the memristive state of the at least one memristive element.

In Example 52, the subject matter of Examples 49 and 51 can optionally include that the write circuit is configured to, in the case that the first expected memristive state does not correspond to the second expected memristive state: carry out (two or more) further write processes during the single write operation to measure a current/voltage characteristic of the at least one memristive element, fit the current/voltage characteristic by a physical model to determine one or more static state parameter values and dynamic state parameter values, wherein the physical model is based on static state parameters for which the static state parameter values are determined and based on dynamic state parameters for which the dynamic state parameters are determined, and determine the memristive state of the at least one memristive element based on the determined one or more static state parameter values and dynamic state parameter values.

In Example 53, the subject matter of Example 52 can optionally include that the write circuit is configured to determine, based on the determined one or more static state parameter values and dynamic state parameter values, whether the memristive state is associated with a first logic state (e.g., "0") or a second logic state (e.g., "1").

Example 54 is a device including: (e.g., a memory/storage, such as an n-logic memory, including) a plurality of memristive elements (e.g., including the same memristive state or different memristive states) (e.g., serving as physical unclonable function, PUF, due to manufacturing differences); a write circuit configured to write logic states of the plurality of memristive elements, wherein the write circuit is configured to write a logic state of a respective memristive element of the plurality of memristive elements via at least two write processes during a single write operation, and by determining, based on the at least two write processes, whether the logic state of the respective memristive element is associated with a first logic state (e.g., "0") or a second logic state (e.g., "1") wherein each measurement of the at least two measurements is associated with a respective measurement point (e.g., different write voltage values or different read-out current values) different from the measurement points of the other measurements; and one or more processors configured to generate a key (e.g., a private key, an authentication key) based on the logic states determined for the plurality of memristive elements.

In Example 55, the subject matter of Example 54 can optionally include that the write circuit is configured to determine that the logic state of the respective memristive element is associated with the first logic state in the case that the write circuit determines the first logic state for each measurement of the at least two measurements; and wherein the write circuit is configured to determine that the logic state of the respective memristive element is associated with the second logic state in the case that the write circuit determines the second logic state for each measurement of the at least two write processes.

In Example 56, the subject matter of Example 54 or 55 can optionally include that the write circuit is configured to: carry out, during the single write operation, a first write process of the at least two write processes to determine a first expected logic state of the respective memristive element, carry out, during the single write operation, a second write process of the at least two write processes to set a second expected logic state of the respective memristive element, and in the case that the first expected logic state corresponds to the second expected logic state, set the first expected logic state as the logic state of the respective memristive element.

In Example 57, the subject matter of Example 56 can optionally include that the write circuit is configured to: in the case that the first expected logic state does not correspond to the second expected logic state, carry out, during the single write operation, a third measurement to write a third expected logic state of the respective memristive element, and in the case that the third expected logic state corresponds to the first expected logic state or to the second expected logic state, determine the third expected logic state as the logic state of the respective memristive element.

In Example 58, the subject matter of Example 56 can optionally include that the write circuit is configured to: in the case that the first expected logic state does not correspond to the second expected logic state, carry out, during the single write operation, (e.g., two or more) further write processes to determine a current/voltage characteristic of the respective memristive element, fit the current/voltage characteristic by a physical model to determine one or more static state parameter values and dynamic state parameter values, wherein the physical model is based on static state parameters for which the static state parameter values are determined and based on dynamic state parameters for which the dynamic state parameter values are determined, and determine, based on the determined one or more static state parameter values, whether the respective memristive element is associated with the first logic state or the second logic state.

In Example 59, the subject matter of any one of Examples 54 to 58 can optionally include that each memristive element of the plurality of memristive elements includes a respective memristive state which is within a predefined subrange of a plurality of memristive states.

In Example 60, the subject matter of any one of Examples 54 to 58 can optionally include that each memristive element of the plurality of memristive elements includes the same memristive state of a plurality of memristive states.

Example 61 is a device including: (e.g., a memory/storage, such as an n-logic memory, including) a plurality of memristive elements (e.g., including the same memristive state or different memristive states) (e.g., serving as physical unclonable function, PUF, due to manufacturing differences); a write circuit configured to write the plurality of memristive elements, wherein the write circuit is configured to write a respective memristive element of the plurality of memristive elements by determining a current/voltage characteristic of the respective memristive element, wherein the write circuit is configured to determine the current/voltage characteristic of the respective memristive element by applying a write voltage sequence to the respective memristive element to cause a corresponding current sequence through the respective memristive element; and one or more processors configured to: determine respective one or more dynamic state parameter values for each memristive element of the plurality of memristive elements, wherein the determination of the one or more static state parameter values and dynamic state parameter values for a respective memristive element of the plurality of memristive elements includes: fitting the current/voltage characteristic determined for the respective memristive element by a physical model to determine the one or more static state parameter values and dynamic state parameter values, wherein the physical model is based on static state parameters and dynamic state parameters for which the static state parameter values and dynamic state parameters are determined; and generate a key (e.g., a private key, an authentication key) based on the one or more static state parameter values respectively determined for each of the plurality of memristive elements.

Example 62 is a device including: (e.g., a memory/storage, such as an n-logic memory, including) a plurality of memristive elements (e.g., including the same memristive state or different memristive states) (e.g., serving as physical unclonable function, PUF, due to manufacturing differences); a write circuit configured to write the plurality of memristive elements, wherein the write circuit is configured to write a respective memristive element of the plurality of memristive elements by determining a current/voltage characteristic of the respective memristive element, wherein the write circuit is configured to determine the current/voltage characteristic of the respective memristive element by applying a read current sequence to the respective memristive element to cause a corresponding voltage drop over the respective memristive element; and one or more processors configured to: determine respective one or more static state parameter values and dynamic state parameter values for each memristive element of the plurality of memristive elements, wherein the determination of the one or more static state parameter values and of dynamic state parameters values for a respective memristive element of the plurality of memristive elements includes: fitting the current/voltage characteristic determined for the respective memristive element by a physical model to determine the one or more static state parameter values and dynamic state parameter values, wherein the physical model is based on static state parameters for which the static state parameter values are determined and wherein the physical model is based on dynamic state parameters for which the dynamic state parameter values are determined; and generate a key (e.g., a private key, an authentication key) based on the one or more static state parameter values and dynamic state parameter values respectively determined for each of the plurality of memristive elements.

In Example 63, the subject matter of Example 61 or 62 can optionally include that each memristive element of the plurality of memristive elements includes a respective memristive state of a plurality of memristive states, wherein the memristive states of the plurality of memristive elements are (e.g., randomly) distributed over the plurality of memristive states.

In Example 64, the subject matter of any one of Examples 54 to 63 can optionally include that the plurality of memristive states has a number of memristive states equal to or greater than 50 (e.g., equal to or greater than 100, e.g., equal to or greater than 500, etc.).

In Example 65, the subject matter of any one of Examples 54 to 64 can optionally include that the one or more processors are configured to generate the key by: determining a respective logic state for each memristive element of the plurality of memristive elements, wherein determining a respective logic state for a respective memristive element includes: classifying the respective memristive element into a group of two or more groups based on the one or more static state parameter values determined for the respective memristive element, wherein each group of the two or more groups is bijectively assigned to a respective logic state; and generating the key based on the respective logic state each memristive element of the plurality of memristive elements.

In Example 66, the subject matter of any one of Examples 54 to 65 can optionally include that the one or more processors are further configured to generate a cryptographic key by applying an encryption algorithm on the key.

In Example 67, the subject matter of any one of Examples 54 to 66 can optionally include that the one or more processors are further configured to generate (e.g., using a shift register) random numbers using the key.

In Example 68, the device of any one of Examples 54 to 67 can optionally further include: a write circuit configured to write each memristive element of the plurality of memristive elements into a respective memristive state of a plurality of memristive states (e.g., by applying a respective write voltage) (e.g., making the device a reconfigurable PUF).

In Example 69, the device of Example 68 can optionally further include: a random number generator configured to generate random numbers; wherein the write circuit is configured to select the memristive state into which a respective memristive element of the plurality of memristive elements is to be written of the plurality of memristive states based on a random number generated by the random number generator (randomly writing the reconfigurable PUF).

Example 70 is a hardware security module including the device according to any one of Examples 54 to 69.

Example 71 is a (e.g., USB) security key including the device according to any one of Examples 54 to 69.

Example 72 is a secure cryptoprocessor including the device according to any one of Examples 54 to 69.

Example 73 is a method including: applying a current pulse to a memristive element which is set (e.g., written) into a memristive state; during applying the current pulse to the memristive element, measuring a first voltage value associated with a voltage drop over the memristive element at a first current value and a second voltage value associated with the voltage drop over the memristive element at a second current value different from the first current value.

In Example 74, the method of Example 73 can optionally further include: setting (e.g., writing) the memristive element into the memristive state prior to applying the current pulse to the memristive element.

In Example 75, the subject matter of Example 73 or 74 can optionally include that the first current value and the second current value do not change the memristive state of the memristive element. For example, the first current value and the second current value may be less than a programming current (e.g., write current) used to set (e.g., write) the memristive element into the memristive state.

In Example 76, the subject matter of any one of Examples 73 to 75 can optionally include that a maximum voltage value of the voltage pulse does not change the memristive state of the memristive element. For example, the maximum voltage value of the voltage pulse may be equal to or less than a programming voltage (e.g., write voltage) used to set (e.g., write) the memristive element into the memristive state.

In Example 77, the subject matter of any one of Examples 73 to 76 can optionally include that the current pulse and a programming current (e.g., write current) used to set (e.g., write) the memristive element into the memristive state are of the same polarity.

In Example 78, the subject matter of any one of Examples 73 to 77 can optionally include that the first voltage value and the second voltage value are measured during a rising edge of the applied current pulse.

In Example 79, the subject matter of any one of Examples 73 to 77 can optionally include that the first voltage value and the second voltage value are measured during a falling edge of the applied current pulse.

In Example 80, the subject matter of any one of Examples 73 to 79 can optionally include that measuring the first voltage value and the second voltage value includes: during a rising edge and/or a falling edge of the voltage pulse, measuring a voltage at the memristive element to determine a current/voltage characteristic of the memristive element, the measured voltage including the first voltage value and the second voltage value.

In Example 81, the method of any one of Examples 73 to 80 can optionally further include: applying a further current pulse (e.g., directly following) to the memristive element, the further current pulse having opposite polarity to the current pulse; during a falling edge of the applied further current pulse, measuring a third voltage value associated with the voltage drop over the memristive element at a third current value and a fourth voltage value associated with the voltage drop over the memristive element at a fourth current value different from the third current value.

Example 82 is a method including: applying a current pulse to a memristive element; during a falling edge of the applied current pulse, measuring a first voltage value associated with a voltage drop over the memristive element at a first current value and a second voltage value associated with the voltage drop over the memristive element at a second current value different from the first current value.

In Example 83, the method of Example 82 can optionally further include: setting (e.g., writing) the memristive element into a memristive state prior to applying the current pulse to the memristive element.

In Example 84, the subject matter of Example 83 can optionally include that the current pulse and a programming current (e.g., write current) used to set (e.g., write) the memristive element into the memristive state are of the same polarity.

In Example 85, the subject matter of Example 82 can optionally include that applying the current pulse to the memristive element includes setting (e.g., writing) the memristive element into a memristive state during a rising edge of the applied current pulse.

In Example 86, the method of any one of Examples 82 to 85 can optionally further include: applying a further current pulse (e.g., directly following) to the memristive element, the further current pulse having opposite polarity to the current pulse; during a falling edge of the applied further current pulse, measuring a third voltage value associated with the voltage drop over the memristive element at a third current value and a fourth voltage value associated with the voltage drop over the memristive element at a fourth current value different from the third current value.

In Example 87, the subject matter of any one of Examples 82 to 86 can optionally include that measuring the first voltage value and the second voltage value includes: measuring a voltage at the memristive element to determine a current/voltage characteristic of the memristive element, the measured voltage including the first voltage value and the second voltage value.

Example 88 is a method for determining static state parameter values and dynamic state parameter values of a memristive element, the method including: setting a (e.g., manufactured) memristive element into a memristive state of a plurality of memristive states, determining one or more static state parameter values and dynamic state parameter values of the memristive element associated with the memristive state, wherein determining the one or more static state parameter values and dynamic state parameter values includes: determining (e.g., measuring and, optionally, plotting) a current/voltage characteristic of the memristive element by applying a read current sequence to the memristive element to cause a corresponding voltage sequence at the memristive element, fitting the current/voltage characteristic by a physical model to determine the one or more static state parameter values and dynamic state parameter values, wherein the physical model is based on static state parameters for which the static state parameter values and dynamic state parameter values are determined.

In Example 89, the method of Example 88 can optionally further include: setting the memristive element into another memristive state of the plurality of memristive states, determining one or more other static state parameter values and dynamic state parameter values of the memristive element associated with the other memristive state, wherein determining the one or more other static state parameter values and dynamic state parameter values includes: determining (e.g., measuring and, optionally, plotting) another current/voltage characteristic of the memristive element by applying a read current sequence (e.g., the same read voltage sequence or another read voltage sequence) to the memristive element to cause a corresponding voltage sequence at (hence a sequence of voltage drops over) the memristive element, fitting the other current/voltage characteristic by the physical model to determine the one or more other static state parameter values.

In Example 90, the method of Example 88 or 89 can optionally further include: simulating, based on the determined static state parameter values and dynamic state parameter values (e.g., the determined one or more static state parameter values and dynamic state parameter values and/or the determined one or more other static state parameter values and dynamic state parameter values), the behavior of a memristive circuit (e.g., via electronic circuit simulation) which includes one or more memristive elements configured in accordance with the (e.g., manufactured) memristive element.

In Example 91, the subject matter of Example 90 can optionally include that simulating the behavior of the memristive circuit includes: varying one or more simulation parameters associated with an operation of the memristive circuit.

In Example 92, the subject matter of Example 91 can optionally include that the one or more simulation parameters include at least one parameter from the following list of parameters: a temperature of the memristive element, a programming voltage for setting a memristive state, a read voltage for reading the memristive state of the memristive element, and/or a desired current through the memristive element responsive to applying a corresponding read voltage.

In Example 93, the subject matter of any one of Examples 90 to 92 can optionally include that the current/voltage characteristic of the memristive element is determined at a first temperature value; and wherein simulating the behavior of the memristive circuit includes simulating the behavior of the memristive circuit at a second temperature value different from the first temperature value.

In Example 94, the subject matter of any one of Examples 90 to 93 can optionally include that each determined static state parameter value and/or dynamic state parameter is associated with a respective error; and wherein the simulation of the behavior of the memristive circuit is carried out in consideration of the respective error (e.g., as noise) of the determined static state parameter values and/or dynamic state parameter values.

In Example 95, the method of any one of Examples 90 to 94 can optionally further include: measuring a static state parameter value of at least one static state parameter and measuring a dynamic state parameter value of at least one dynamic state parameter; determining a difference between the measured static state parameter value and the static state parameter value determined for the at least one static state parameter via the physical model and/or determining a difference between the measured dynamic state parameter value and the dynamic state parameter value determined for the at least one dynamic state parameter via the physical model; and in the case that the determined difference is less than a predefined verification value, verify the determined static state parameter value and/or dynamic state parameter.

In Example 96, the method of any one of Examples 90 to 95 can optionally further include: setting the memristive element into the other memristive states of the plurality of memristive states one after another; in each of the other memristive states of the plurality of memristive states, determining respective one or more static state parameter values and dynamic state parameter values of the memristive element to determine a functional correlation between the one or more static state parameter values and the memristive states; and wherein the simulation of the behavior of the memristive circuit is carried using the determined functional correlation.

In Example 97, the method of any one of Examples 88 to 96 can optionally further include: selecting (e.g., adapting), based on the determined static state parameter values (e.g., the determined one or more static state parameter values and/or the determined one or more other static state parameter values) and/or based on the determined dynamic state parameter values (e.g., the determined one or more dynamic state parameter values and/or the determined one or more other dynamic state parameter values), operating parameters associated with an operation of the memristive element (e.g., as a function of the determined dynamic state parameter values).

In Example 98, the subject matter of Example 97 can optionally include that the selected operating parameters include at least one operating parameter of the following list of operating parameters: a (e.g., respective) write current for writing the memristive state of the memristive element, and/or an operating temperature.

In Example 99, the subject matter of Example 96 or 97, provided that in combination with Example 92, can optionally include that the selected operating parameters include a programming current (e.g., write current) for setting the memristive element into a corresponding memristive state of the plurality of memristive states.

In Example 100, the subject matter of any one of Examples 97 to 99 can optionally include that selecting the operating parameters based on the determined static state parameter values and/or dynamic state parameter values includes adapting at least one operating parameter associated with the operation of the memristive element during use of the memristive element (e.g., allowing a reconfiguration in use due to possible changes (e.g., temperature)).

In Example 101, the method of Example 100 can optionally further include: operating the memristive element based on initial operating parameters and, after adapting the at least one operating parameter, operating the memristive element based on the adapted at least one operating parameter.

Example 102 is a for selecting operating parameters associated with an operation of a memristive device which includes a plurality of memristive elements, the method including: for each memristive element of the plurality of memristive elements, determining respective one or more static state parameter values and/or dynamic state parameter values in accordance with the method of Example 88; selecting, based on the static state parameter values determined for the plurality of memristive elements, the operating parameters associated with the operation of the memristive device.

In Example 103, the method according to any one of Examples 88 to 102 can optionally further include: determining (e.g., classifying), based on the determined static state parameter values (e.g., the determined one or more static state parameter values and/or the determined one or more other static state parameter values) and based on the determined dynamic state parameter values (e.g., the determined one or more dynamic state parameter values and/or the determined one or more other dynamic state parameter values), whether the memristive state of the memristive element is associated with a first logic state (e.g., "0") or a second logic state (e.g., "1").

In Example 104, the method of any one of Examples 88 to 103 can optionally further include: determining (e.g., classifying), for at least one (e.g., for each) static state parameter value of the determined static state parameter values (e.g., the determined one or more static state parameter values and/or the determined one or more other static state parameter values), whether the at least one static state parameter value is within a predefined range associated with the at least one static state parameter value and/or for at least one (e.g., for each) dynamic state parameter value of the determined dynamic state parameter values (e.g., the determined one or more dynamic state parameter values and/or the determined one or more other dynamic state parameter values), whether the at least one dynamic state parameter value is within a predefined range associated with the at least one dynamic state parameter value.

In Example 105, the method of Example 104 can optionally further include: in the case that the at least one static state parameter value is within the predefined range associated with the at least one static state parameter value and/or in the case that the at least one dynamic state parameter value is within the predefined range associated with the at least one dynamic state parameter value, validating the memristive element.

In Example 106, the method of any one of Examples 88 to 103 can optionally further include: validating the memristive element in the case that each static state parameter value of the determined static state parameter values (e.g., the determined one or more static state parameter values and/or the determined one or more other static state parameter values) is within a respective predefined range and/or validating the memristive element in the case that each dynamic state parameter value of the determined dynamic state parameter values (e.g., the determined one or more dynamic state parameter values and/or the determined one or more other dynamic state parameter values) is within a respective predefined range.

Example 107 is a method for validating a memristive device which includes a plurality of memristive elements, the method including: for each memristive element of the plurality of memristive elements, determining respective one or more static state parameter values and/or dynamic state parameter values in accordance with the method of Example 88; for each static state parameter for which the one or more static state parameter values are determined and/or for each dynamic state parameter for which the one or more dynamic state parameter values are determined, determining, whether the plurality of memristive elements fulfills one or more predefined criteria, wherein the plurality of memristive elements fulfill the one or more predefined criteria for a respective static state parameter in the case that a variation of the determined static state parameter values associated with the respective static state parameter between the plurality of memristive elements is equal to or less than a predefined threshold variation and/or for a respective dynamic state parameter in the case that a variation of the determined dynamic state parameter values associated with the respective dynamic state parameter between the plurality of memristive elements is equal to or less than a predefined threshold variation.

In Example 108, the subject matter of Example 107 can optionally include that the variation of the determined static state parameter values associated with the respective static state parameter is a deviation from an average value, the average value determined by averaging the static state parameter values associated with the respective static state parameter over the plurality of memristive elements and/or that the determined dynamic state parameter values associated with the respective dynamic state parameter is a deviation from an average value, the average value determined by averaging the dynamic state parameter values associated with the respective dynamic state parameter over the plurality of memristive elements.

Example 109 is a method for validating memristive elements of a plurality of memristive elements, the method including: for each memristive element of the plurality of memristive elements, determining respective one or more static state parameter values and/or dynamic state parameter values in accordance with the method of Example 88; determining, whether a respective memristive element of the plurality of memristive elements fulfills one or more predefined criteria, wherein the respective memristive element fulfills the one or more predefined criteria in the case that each of the one or more static state parameter values and/or dynamic state parameter values determined for the respective memristive element fulfills a respective criterion, wherein a respective static state parameter value or a respective dynamic state parameter fulfills the criterion in the case that the respective static state parameter value or dynamic state parameter value is within a predefined range associated with the respective static state parameter or dynamic state parameter for which the respective static state parameter value or dynamic state parameter is determined; and validating the respective element in the case that the respective element fulfills the one or more predefined criteria.

In Example 110, the subject matter of Example 109 can optionally include that the predefined range associated with the respective static state parameter and/or dynamic state parameter defines a deviation from an average value, the average value determined by averaging the static state parameter values associated with the respective static state parameter and/or dynamic state parameter over the plurality of memristive elements.

In Example 111, the method of Example 109 or 110 can optionally further include: invalidating the respective memristive element in the case that the respective element does not fulfill at least one of the one or more predefined criteria (invalidated memristive elements may, for example, not be addressed during use).

In Example 112, the method according to any one of Examples 88 to 111 can optionally further include: setting the memristive element into the other memristive states of the plurality of memristive states one after another; in each of the other memristive states of the plurality of memristive states, determining respective one or more static state parameter values and/or dynamic state parameter values of the memristive element in accordance with the method of Example 88 to determine a functional correlation between the one or more static state parameter values and/or dynamic state parameter values and the memristive states.

Example 113 is a method for determining static state parameter values and/or dynamic state parameter values of a memristive element as a function of a memristive state of the memristive element, the method including: setting the memristive element into each memristive state of the plurality of memristive states one after another; in each memristive state of the plurality of memristive states, determining respective one or more static state parameter values and/or dynamic state parameter values of the memristive element in accordance with the method of Example 88 to determine a functional correlation between the one or more static state parameter values and/or dynamic state parameter and the memristive states.

In Example 114, the subject matter of Example 112 or 113 can optionally include that setting the memristive element into a respective memristive state of the plurality of memristive states includes applying a programming voltage associated with the respective memristive state to the memristive element.

In Example 115, the subject matter of any one of Examples 88 to 114 can optionally include that the one or more static state parameters and/or dynamic state parameters are correlated to (e.g., electrical and/or manufacturing-related) properties of the memristive element.

In Example 116, the subject matter of any one of Examples 88 to 115 can optionally include that the one or more static state parameters and/or dynamic state parameters characterize the memristive element.

In Example 117, the subject matter of any one of Examples 88 to 116 can optionally include that the one or more static state parameters and dynamic state parameters include at least one parameter of the following list of parameters: a series resistance of the memristive device, an ideality factor of the memristive device, a reverse saturation current of the memristive device, and/or barrier potential of the memristive device.

In Example 118, the subject matter of any one of Examples 88 to 117 can optionally include that the current/voltage characteristic (branch 1, $1^{st}$ quadrant) of a memristive element which has been initialized into high resistance state (HRS) is fitted according to:

$$V = n_1 \frac{k_B T}{q} \log\left(\frac{I}{E[I]} + 1\right)\left(1 + K_1 \frac{k_B T}{q} \log\left(\frac{I}{E[I]} + 1\right)\right) + V2$$

with the voltage V applied between top electrode and bottom electrode or with the current sourced between top electrode and bottom electrode. $V=V_1+V_2$ and with $$I = -I_{s2,Branch4}\left(e^{\frac{-qV_2}{k_B T(n_2+K_2 V_2)}} - 1\right) + \frac{V_2}{F[I]}$$

and/or that the current/voltage characteristic (branch 3, $3^{rd}$ quadrant) of a memristive element which has been initialized into low resistance state (LRS) is fitted according to:

$$V = -n_2 \frac{k_B T}{q} \log\left(\frac{I}{G[I]} + 1\right)\left(1 + K_2 \frac{k_B T}{q} \log\left(\frac{I}{G[I]} + 1\right)\right) + V1$$

with $V=V_1+V_2$ and with $$I = +I_{s1,Branch2}\left(e^{\frac{+qV_1}{k_B T(n_1-K_1 V_1)}} - 1\right) + \frac{V_1}{H[I]}$$

wherein: V may be the applied voltage, I may be the current through the memristive structure responsive to applying the read voltage, $k_B$ may be the Boltzmann constant, T may be the temperature of the memristive structure, q may be the electron charge, and E[I], F[I], G[I], and H[I] each may be a respective dynamic state parameter. In Example 119, the subject matter of Example 118 can optionally include that: E[I] and G[I] represent the reverse saturation current of the top electrode and of the bottom electrode, respectively, and can optionally include that F[I] and H[I] represent the resistance of the reverse biased bottom electrode in branch 1 and of the reverse biased bottom electrode in branch 3, respectively.

It is understood that a device (e.g., a device according to any one of Examples 48 to 71) may be configured to carry out one or more of the methods according to Examples 1 to 47 and/or according to Example 73 to 119.

Example 120 is a method including: writing a memristive element (in some aspects referred to as memristive structure) into a memristive state of a plurality of memristive states; during writing the memristive element, determining (e.g., measuring or setting for a measurement) a first current value associated with a current through the memristive element at a first voltage value and determining (e.g., measuring or setting for a measurement) a second current value associated with a current through the memristive element at a second voltage value different from the first voltage value. It is noted that various measurement routines can be used for current/voltage measurement to determine a functional relationship between a voltage drop and a corresponding electric current, e.g., current controlled measurement (e.g., setting a current and measuring a corresponding voltage) or a voltage controlled measurement (e.g., setting a voltage and measuring a corresponding current), e.g., a flux controlled measurement (e.g., setting a time and a time dependent voltage and measuring a corresponding time dependent current, e.g., measuring a charge as a time integral of the time dependent current), e.g., a charge controlled measurement (e.g., setting a time and a time dependent current and measuring a corresponding time dependent voltage, e.g., measuring a flux as a time integral of the time dependent voltage).

In Example 121, the method of Example 120 can optionally further include: after writing the memristive element into the memristive state, writing the memristive element into another memristive state of the plurality of memristive states different from the memristive state; and determining a third current value associated with a current through the memristive element at a third voltage value (e.g., different from the first and second voltage value) and determining a fourth current value associated with a current through the memristive element at a fourth voltage value different from the third voltage value (e.g., and different from the first and second voltage value).

According to various aspects, writing the memristive element into any one of the plurality of memristive states may include a write operation. The write operation may be configured (e.g., by supplying one or more write signals to the memristive element) to provide one or more write voltage drops (e.g., in a flux controlled write operation) over the memristive element and/or one or more write currents (e.g., in a current controlled write operation) through the memristive element. The memristive state that is actually written by the write operation may be, according to various aspects, defined by the change of the flux and/or of the charge caused by the write operation. The change in the flux can be defined by a time integral of the applied voltage and the change of the charge can be defined by a time integral of the applied current. In the charge/flux-characteristics of the memristive element, each charge value is unambiguously assigned to a corresponding positive flux value and to a corresponding negative flux value. The charge/flux-characteristics has a hysteretic behavior associated therewith that is associated with memristive functions of the memristive element.

In Example 122, the subject matter of Example 120 or 121 can optionally include that the first current value and the second current value are measured in accordance with a rising edge of an applied write voltage pulse. In other words, the first voltage value and the second voltage value may be at a same rising edge of a write voltage pulse.

In Example 123, the subject matter of Example 121 or 122 can optionally include that the third current value and the fourth current value are measured in accordance with another rising edge of another applied write voltage pulse. In other words, the third voltage value and the fourth voltage value may be at a same rising edge of another write voltage pulse.

In Example 124, the subject matter of Example 121 or 122 can optionally include that the third current value and the fourth current value are measured in accordance with the same rising edge of the write voltage pulse used to determine the first current value and the second current value. In other words, the first voltage value, the second voltage value, third voltage value, and the fourth voltage value may be at a same rising edge of a write voltage pulse.

Example 125 is a method for determining dynamic state parameter values of a memristive element, the method including: setting a (e.g., manufactured) memristive element into a memristive state of a plurality of memristive states, determining one or more static state parameter values of the memristive element associated with the memristive state, wherein determining the one or more static state parameter values includes: determining (e.g., measuring and, optionally, plotting) a current/voltage characteristic of the memristive element by applying a read voltage sequence to the memristive element to cause a corresponding current sequence through the memristive element, fitting the current/voltage characteristic by a physical model to determine the one or more static state parameter values, wherein the physical model is based on static state parameters for which the static state parameter values are determined.

Example 126 is a method determining dynamic state parameter values of a memristive element, the method including: setting a (e.g., manufactured) memristive element into an initial memristive state of a plurality of memristive states, determining one or more static state parameter values of the memristive element associated with the initial memristive state, wherein determining the one or more static state parameter values includes: determining (e.g., measuring and, optionally, plotting) a current/voltage characteristic of the memristive element by applying a read voltage sequence to the memristive element to cause a corresponding current sequence through the memristive element, fitting the current/voltage characteristic by a physical model to determine the one or more static state parameter values, wherein the physical model is based on static state parameters for which the static state parameter values are determined. Applying a write voltage or a write current to the memristive element and measuring the corresponding write current or the corresponding write voltage, determining one or more static state parameter values of the memristive element associated with the final memristive state, wherein determining the one or more static state parameter values includes: determining (e.g., measuring and, optionally, plotting) a current/voltage characteristic of the memristive element by applying a read voltage sequence to the memristive element to cause a corresponding current sequence through the memristive element, fitting the current/voltage characteristic by a physical model to determine the one or more static state parameter values associated with the final memristive state of the memristive element, wherein the physical model is based on static state parameters for which the static state parameter values are determined. Fitting the current/voltage characteristic curve of the memristive element during writing it from the initial memristive state to the final memristive state characterized by a physical model to determine the one or more dynamic state parameter values associated with the change from the initial memristive state to the final memristive state.

The physical model describing the current/voltage characteristics of a memristive element associated with the writing operation from an initial memristive state to a final memristive state is described in the following. We state that the index "1" refers to properties related with the top electrode of the memristive structure and that the index "2" refers to properties related with the bottom electrode of the memristive structure. According to various aspects, the physical model (e.g., used for fitting the writing curve 302) may be given after initialization in high resistance state (HRS) by:

$$V = n_1 \frac{k_B T}{q} \log\left(\frac{I}{E[I]} + 1\right)\left(1 + K_1 \frac{k_B T}{q} \log\left(\frac{I}{E[I]} + 1\right)\right) + V2$$

with the voltage V applied between top electrode and bottom electrode or with the current sourced between top electrode and bottom electrode with $V = V_1 + V_2$ and with $$I = -I_{s2,Branch4}\left(e^{\frac{-qV_2}{k_B T(n_2 + K_2 V_2)}} - 1\right) + \frac{V_2}{F[I]}$$

and may be given after initialization in low resistance (LRS) by:

$$V = -n_2\frac{k_BT}{q}\log\left(\frac{I}{G[I]}+1\right)\left(1+K_2\frac{k_BT}{q}\log\left(\frac{I}{G[I]}+1\right)\right)+V1$$

with $V=V_1+V_2$ and with $$I = +I_{s1,Branch2}\left(e^{\frac{+qV_1}{k_BT(n_1-K_1V_1)}}-1\right)+\frac{V_1}{H[I]}$$

wherein: V may be the applied voltage, I may be the current through the memristive structure responsive to applying the read voltage, $k_B$ may be the Boltzmann constant, T may be the temperature of the memristive structure, q may be the electron charge, and E[I], F[I], G[I], and H[I] each may be a respective dynamic state parameter. According to various aspects, the physical model (e.g., used for fitting the resistance-characteristic curve) may be given with $E[I]=I_{s1}[I]$, $F[I]=R_{s2}[I]$, $G[I]=I_{s2}[I]$, $H[I]=R_{s1}[I]$ after initialization in high resistance state (HRS) by $$V = n_1\frac{k_BT}{q}\log\left(\frac{I}{I_{s1}[I]}+1\right)\left(1+K_1\frac{k_BT}{q}\log\left(\frac{I}{I_{s1}[I]}+1\right)\right)+V2$$

with $V=V_1+V_2$ and with $$I = -I_{s2,Branch4}\left(e^{\frac{-qV_2}{k_BT(n_2+K_2V_2)}}-1\right)+\frac{V_2}{R_{s2}[I]}$$

and may be given after initialization in low resistance (LRS) by:

$$V = -n_2\frac{k_BT}{q}\log\left(\frac{I}{I_{s2}[I]}+1\right)\left(1+K_2\frac{k_BT}{q}\log\left(\frac{I}{I_{s2}[I]}+1\right)\right)+V1$$

with $V=V_1+V_2$ and with $$I = +I_{s1,Branch2}\left(e^{\frac{+qV_1}{k_BT(n_1-K_1V_1)}}-1\right)+\frac{V_1}{R_{s1}[I]}$$

wherein: V may be the applied write voltage, I may be the current through the memristive structure responsive to applying the write voltage, $k_B$ may be the Boltzmann constant, T may be the temperature of the memristive structure, q may be the electron charge, and $I_{S1}[I]$, $R_{S2}[I]$, $I_{S2}[I]$, and $R_{S1}[I]$ each may be a respective dynamic state parameter. $I_{S1}[I]$ describes the saturation current of the top electrode in forward direction (positive bias applied to top electrode). $R_{S2}[I]$ describes the depletion resistance of the bottom electrode in reverse direction (positive bias applied to top electrode). $I_{S2}[I]$ describes the saturation current of the bottom electrode in reverse direction (negative bias applied to top electrode). $R_{S1}[I]$ describes the depletion resistance of the top electrode in forward direction (negative bias applied to top electrode). Hence, in this example, the physical model may include four dynamic state parameters. It is understood that the dynamic state parameters do change when the current/voltage curve of branch 1 and of branch 3 are measured.

Example 127 is a method including: writing a memristive element (e.g., from an initial memristive state of a plurality of memristive states) into a (e.g., final) memristive state of a plurality of memristive states, determining one or more dynamic state parameter values of the memristive element associated with the writing of the memristive element into the memristive state, wherein determining the one or more dynamic state parameter values includes: determining a current/voltage characteristic of the memristive element, and fitting the current/voltage characteristic by a physical model to determine the one or more dynamic state parameter values, wherein the physical model is based on dynamic state parameters for which the dynamic state parameter values are determined.

In Example 128, the subject matter of Example 127 can optionally include that determining the current/voltage characteristic of the memristive element includes: causing a write voltage drop sequence over the memristive element and determining a corresponding write current sequence through the memristive element; and/or causing a write current sequence through the memristive element and determining a corresponding write voltage drop sequence over the memristive element.

In Example 129, the method of Example 127 or 128 can optionally further include: simulating, based on the determined dynamic state parameter values, the behavior of the memristive element or of another memristive element; and/or simulating, based on the determined dynamic state parameter values, the behavior of a memristive circuit which includes one or more memristive elements configured in accordance with the memristive element, preferably simulating, based on the determined dynamic state parameter values, a writing behavior to write one or more memristive elements from a respective initial memristive state of a plurality of memristive states into a respective final memristive state of a plurality of memristive states.

In Example 130, the subject matter of Example 129 can optionally include that simulating the behavior of the memristive circuit includes: varying one or more simulation parameters associated with an operation of the memristive circuit.

In Example 131, the subject matter of Example 130 can optionally include that the one or more simulation parameters include at least one parameter from the following list of parameters: a temperature of the memristive element, a write voltage for setting a memristive state of the memristive element, a read voltage for reading a memristive state of the memristive element, a predefined current through the memristive element responsive to applying a corresponding voltage drop over the memristive element, and/or predefined voltage drop over the memristive element responsive to applying a corresponding current through the memristive element.

In Example 132, the subject matter of any one of Examples 129 to 131 can optionally include that the current/voltage characteristic of the memristive element is determined at a first temperature; and wherein simulating the behavior of the memristive circuit includes simulating the behavior of the memristive circuit at a second temperature different from the first temperature.

In Example 133, the subject matter of any one of Examples 129 to 132 can optionally include that each determined dynamic state parameter value is associated with a respective determination accuracy; and wherein the simulation of the behavior of the memristive circuit is carried out in consideration of the respective determination accuracy of the determined dynamic state parameter values.

In Example 134, the method of any one of Examples 129 to 133 can optionally further include: measuring a dynamic state parameter value of at least one dynamic state parameter; determining a difference between the measured dynamic state parameter value and the dynamic state parameter value determined for the at least one dynamic state parameter via the physical model; and in the case that the determined difference is in a predefined verification value range, verify the determined dynamic state parameter value, and/or in the case that the determined difference is out of a predefined verification value range, discard the determined dynamic state parameter value.

In Example 135, the method of any one of Examples 129 to 134 can optionally further include: writing the memristive element into two or more other memristive states of the plurality of memristive states one after another; during writing the memristive element into two or more other memristive states of the plurality of memristive states, verifying whether a set of same dynamic state parameter values of the memristive element is associated with the memristive state and with the two or more other memristive states of the plurality of memristive states.

In Example 136, the method of any one of Examples 127 to 135 can optionally further include: determining and/or selecting, based on the determined dynamic state parameter values, operating parameters associated with an operation of the memristive element.

In Example 137, the subject matter of Example 136 can optionally include that the determined and/or selected operating parameters include at least one operating parameter of the following list of operating parameters: a read voltage drop over the memristive element, a read current through the memristive element for reading the memristive state of the memristive element, a write voltage drop over the memristive element, a write current through the memristive element for writing the memristive state of the memristive element, a change in flux and/or a change in charge of the memristive element associated with a writing of the memristive element, and/or an operating temperature.

In Example 138, the subject matter of Example 136 or 137 can optionally include that selecting the operating parameters based on the determined dynamic state parameter values includes adapting at least one operating parameter associated with the operation of the memristive element during operation of the memristive element.

In Example 139, the method of Example 138 can optionally further include: operating the memristive element based on initial operating parameters and, after adapting the at least one operating parameter, operating the memristive element based on the adapted at least one operating parameter.

In Example 140, the method of any one of Examples 127 to 139 can optionally further include: determining, based on the determined dynamic state parameter values, whether the memristive state of the memristive element is associated with a first logic state or a second logic state; or determining, based on the determined dynamic state parameter values, whether the memristive state of the memristive element is associated with a first analog circuit state or a second analog circuit state.

In Example 141, the method of any one of Examples 127 to 140 can optionally further include: determining, for at least one dynamic state parameter value of the determined dynamic state parameter values, whether the at least one dynamic state parameter value is within a predefined range associated with the at least one dynamic state parameter value; and in the case that the at least one dynamic state parameter value is within the predefined range associated with the at least one dynamic state parameter value, validating the memristive element.

In Example 142, the subject matter of any one of Examples 127 to 141 can optionally include that the one or more dynamic state parameters are correlated with one or more physical and/or electronic properties of the memristive element.

In Example 143, the subject matter of any one of Examples 127 to 142 can optionally include that the one or more dynamic state parameters include at least one parameter of the following list of parameters: a series resistance of the memristive device, an ideality factor of the memristive device, a reverse saturation current of the memristive device, and/or barrier potential of the memristive device.

In Example 144, the subject matter of any one of Examples 127 to 143 can optionally include that the current/voltage characteristic of the memristive element, preferably after initialization in a high resistance state (HRS) and operated in a positive voltage range, is described based on the following formula:

$$V = n_1 \frac{k_B T}{q} \log\left(\frac{I}{E[I]} + 1\right)\left(1 + K_1 \frac{k_B T}{q} \log\left(\frac{I}{E[I]} + 1\right)\right) + V2$$

with the voltage drop V applied to the memristive element or with the current sourced through the memristive element.

In Example 145, the subject matter of Example 144 can optionally include that, in the formula:

$$V = V_1 + V_2 \text{ and} = -I_{s2,Branch4}\left(e^{\frac{-qV_2}{k_B T(n_2 + K_2 V_2)}} - 1\right) + \frac{V_2}{F[I]} \ \ldots$$

In Example 146, the subject matter of any one of Examples 127 to 145 can optionally include that the current/voltage characteristic of the memristive element, preferably after initialization in a low resistance state (LRS) and operated in a negative voltage range, is described based on the following formula:

$$V = -n_2 \frac{k_B T}{q} \log\left(\frac{I}{G[I]} + 1\right)\left(1 + K_2 \frac{k_B T}{q} \log\left(\frac{I}{G[I]} + 1\right)\right) + V1$$

In Example 147, the subject matter of Example 146 can optionally include that, in the formula:

$$V = V_1 + V_2 \text{ and } = +I_{s1,Branch2}\left(e^{\frac{+qV_1}{k_BT(n_1-K_1V_1)}} - 1\right) + \frac{V_1}{H[I]} \ldots$$

In Example 148, the subject matter of any one of Examples 144 to 147 can optionally include that V is an applied voltage, I is a current through the memristive element responsive to applying a read voltage, $k_B$ is the Boltzmann constant, T is the temperature of the memristive element, q is the electron charge, and E[I], F[I], G[I], and H[I] are dynamic state parameters.

In Example 149, the subject matter of any one of Examples 144 to 148 can optionally include that the physical model is based on the following: $E[I]=I_{s1}[I]$, $F[I]=R_{s2}[I]$, $G[I]=I_{s2}[I]$, $H[I]=R_{s1}[I]$, wherein, after an initialization in high resistance state (HRS) and operated in a positive voltage range:

$$V = n_1\frac{k_BT}{q}\log\left(\frac{I}{I_{s1}[I]} + 1\right)\left(1 + K_1\frac{k_BT}{q}\log\left(\frac{I}{I_{s1}[I]} + 1\right)\right) + V2$$

with $V=V_1+V_2$ and with $$I = -I_{s2,Branch4}\left(e^{\frac{-qV_2}{k_BT(n_2+K_2V_2)}} - 1\right) + \frac{V_2}{R_{s2}[I]}$$

and/or wherein after an initialization in low resistance state (LRS) and operated in a negative voltage range:

$$V = -n_2\frac{k_BT}{q}\log\left(\frac{I}{I_{s2}[I]} + 1\right)\left(1 + K_2\frac{k_BT}{q}\log\left(\frac{I}{I_{s2}[I]} + 1\right)\right) + V1$$

with $V=V_1+V_2$ and with $$I = +I_{s1,Branch2}\left(e^{\frac{+qV_1}{k_BT(n_1-K_1V_1)}} - 1\right) + \frac{V_1}{R_{s1}[I]};$$

and wherein V is an applied write voltage, I is a current through the memristive element responsive to applying a write voltage, $k_B$ is the Boltzmann constant, T is the temperature of the memristive element, q is the electron charge, and $I_{S1}[I]$, $R_{S2}[I]$, $I_{S2}[I]$, and $R_{S1}[I]$ each is a respective dynamic state parameter.

In Example 150, the subject matter of Example 149 can optionally include that $I_{S1}[I]$ represents a saturation current of a top electrode of the memristive element in forward direction, $R_{S2}[I]$ represents a depletion resistance of a bottom electrode of the memristive element in reverse direction, $I_{S2}[I]$ represents a saturation current of the bottom electrode in reverse direction, $R_{S1}[I]$ represents a depletion resistance of the top electrode in forward direction.

In Example 151, the subject matter of any one of Examples 127 to 150 can optionally include that the current-voltage characteristics is a corrected current-voltage characteristics, wherein an effect of ferroelectric polarization is removed from an initial current-voltage characteristics to provide the corrected current-voltage characteristics.

Example 152 is a method for validating a memristive device which includes a plurality of memristive elements, the method including: setting each memristive element of the plurality of memristive elements into a corresponding memristive state by applying a same write operation to each of the memristive elements of the plurality of memristive elements; for each memristive element of the plurality of memristive elements, determining respective one or more dynamic state parameter values, wherein determining the one or more dynamic state parameter values of a respective memristive element includes: determining a current/voltage characteristic of the respective memristive element and fitting the current/voltage characteristic by a physical model to determine the one or more dynamic state parameter values, wherein the physical model is based on dynamic state parameters for which the dynamic state parameter values are determined; for each dynamic state parameter for which the one or more dynamic state parameter values are determined, determining, whether the plurality of memristive elements fulfills one or more predefined criteria, wherein the plurality of memristive elements fulfill the one or more predefined criteria for a respective dynamic state parameter in the case that a variation of the determined dynamic state parameter values associated with the respective dynamic state parameter among the plurality of memristive elements is equal to or less than a predefined threshold variation.

Example 153 is a method for validating a memristive device which includes a plurality of memristive elements, the method including: setting each memristive element of the plurality of memristive elements into a corresponding memristive state by applying a same write operation to each of the memristive elements of the plurality of memristive elements; for each memristive element of the plurality of memristive elements, determining respective one or more dynamic state parameter values, wherein determining the one or more dynamic state parameter values of a respective memristive element includes: determining static state parameters of the memristive element in an initial memristive state from one or more current/voltage characteristics of the respective memristive element in the initial memristive state; determining a current/voltage characteristic associated with a writing of the memristive element from the initial memristive state of a plurality of memristive states into a final memristive state of the plurality of memristive states; determining static state parameters of the memristive element in the final memristive state from one or more current/voltage characteristic of the respective memristive element in the final memristive state; determining the one or more dynamic state parameters based on the current/voltage characteristic of the respective memristive element associated with the writing of the memristive element from the initial memristive state to the final memristive state and based on the determined static state parameters; and for each dynamic state parameter for which the one or more dynamic state parameter values are determined, determining, whether the plurality of memristive elements fulfills one or more predefined criteria, wherein the plurality of memristive elements fulfill the one or more predefined criteria for a respective dynamic state parameter in the case that a variation of the determined dynamic state parameter values associated with the respective dynamic state parameter among the plurality of memristive elements is equal to or less than a predefined threshold variation.

Example 154 is a method for determining one or more dynamic state parameter values associated with a writing of a memristive element, the method including: determining a current/voltage characteristic of the respective memristive element that represents a writing of the memristive element; and fitting the current/voltage characteristic by a physical model to determine the one or more dynamic state parameter values, wherein the physical model is based on dynamic state parameters for which the dynamic state parameter values are determined.

Example 155 is a method for determining one or more dynamic state parameter values associated with a writing of a memristive element, the method including: determining static state parameters of the memristive element in an initial memristive state from one or more current/voltage characteristics of the memristive element in the initial memristive state; determining a current/voltage characteristic of the memristive element associated with a writing of the memristive element from the initial memristive state of a plurality of memristive states into a final memristive state of the plurality of memristive states; determining static state parameters of the memristive element in the final memristive state from one or more current/voltage characteristics of the memristive element in the final memristive state; determining the one or more dynamic state parameters based on the current/voltage characteristic of the memristive element associated with the writing of the memristive element and based on the determined static state parameters of the memristive element in the initial memristive state and in the final memristive state.

In Example 156, the subject matter of Example 153 or 155 can optionally include that determining the one or more dynamic state parameters includes: fitting the current/voltage characteristic of the memristive element associated with the writing of the memristive element by a physical model to determine the one or more dynamic state parameter values, wherein the physical model is based on dynamic state parameters for which the dynamic state parameter values are determined.

In Example 157, the subject matter of any one of Examples 153 to 156 can optionally include that the one or more dynamic state parameters associated with the writing of the memristive element are measured during writing the memristive element from the initial memristive state into the final memristive state.

Example 158 is a memristive device including: one or more memristive elements, and an operation circuit to operate the one or more memristive elements, wherein the operation circuit is configured to operate the one or more memristive elements based on one or more operating parameters, and wherein the operation circuit is configured to select and/or adapt the one or more operating parameters based on a physical model, wherein the physical model includes a set of static state parameters and a set of dynamic state parameters.

In Example 159, the subject matter of Example 158 can optionally include that the one or more operating parameter include one or more of the following operating parameters: a read voltage drop over the memristive element, a read current through the memristive element for reading the memristive state of the memristive element, a write voltage drop over the memristive element, a write current through the memristive element for writing the memristive state of the memristive element, a change in flux and/or a change in charge of the memristive element associated with a writing of the memristive element, and/or an operating temperature.

In Example 160, the subject matter of Example 158 or 159 can optionally include that the set of static state parameters and the set of dynamic state parameters are obtained based on: determining static state parameters of the memristive element in an initial memristive state from one or more current/voltage characteristics of the memristive element in the initial memristive state; determining a current/voltage characteristic of the memristive element associated with a writing of the memristive element from the initial memristive state of a plurality of memristive states into a final memristive state of the plurality of memristive states; determining static state parameters of the memristive element in the final memristive state from one or more current/voltage characteristics of the memristive element in the final memristive state; determining the one or more dynamic state parameters based on the current/voltage characteristic of the memristive element associated with the writing of the memristive element and based on the determined static state parameters of the memristive element in the initial memristive state and in the final memristive state.

Example 161 is a device including: a memristive element; and a write circuit to write the memristive element into a memristive state of a plurality of memristive states (e.g., from an initial memristive state of a plurality of memristive states into a final memristive state of a plurality of memristive states) by a write operation, wherein the memristive state has a characteristic flux and/or a characteristic charge associated therewith, wherein the characteristic flux corresponds to a characteristic voltage drop over the memristive element applied for a saturation time and wherein the characteristic charge corresponds to a characteristic current through the memristive element applied for a saturation time; wherein the write operation includes: causing a write voltage drop over the memristive element that is greater than the characteristic voltage drop associated with the memristive state for a total write time that is shorter than the saturation time; or causing a write current through the memristive element that is higher than the characteristic write current associated with the memristive state for a total write time that is shorter than the saturation time.

In Example 162, the subject matter of Example 161 can optionally include that the characteristic flux is defined by an integral of the characteristic voltage drop over the saturation time and wherein an applied flux defined by the write voltage drop and the write time is substantially equal to the characteristic flux; and/or wherein the characteristic charge is defined by an integral of the characteristic current over the saturation time and wherein an applied charge defined by the write current and the write time is substantially equal to the characteristic charge.

In Example 163, the subject matter of Example 161 or 162 can optionally include that the write circuit is further configured, preferably during the write operation, to determine whether an actual memristive state of the memristive element is the memristive state.

In Example 164, the subject matter of Example 163 can optionally include that the write circuit is configured to end the write operation upon determination that the actual memristive state of the memristive element is the memristive state.

In Example 165, the subject matter of Example 163 or 164 can optionally include that the write circuit is configured to: carry out one or more measurements to determine a current/voltage characteristic of the memristive element, preferably during the write operation, wherein each measurement of the one or more measurements includes: measure a respective voltage drop over the memristive element or a respective current through the memristive element; fit the current/voltage characteristic by a physical model to determine one or more static state parameter values and/or one or more dynamic state parameters, wherein the physical model is based on static state parameters and/or dynamic state parameters for which the static state parameter values and/or the dynamic state parameters are determined, and determine an actual memristive state of the memristive element based on the determined one or more static state parameter values and/or the determined one or more dynamic state parameter values.

In Example 166, the subject matter of Example 165 can optionally include that the write circuit is configured to continue the write operation until the determined actual memristive state of the memristive element is the memristive state to be written.

Example 167 is a device including: a memristive element; and a write circuit to write the memristive element into a memristive state of a plurality of memristive states by a write operation, wherein the memristive state to be written is defined by a change in flux or change in charge in the memristive element between a high resistance state and a low resistance state; wherein the write operation includes: causing a flux change in the memristive element, the flux change being representative of the memristive state to be written; and/or causing a charge change in the memristive element, the charge change being representative of the memristive state to be written.

In Example 168, the subject matter of Example 167 can optionally include that the flux change is caused by a static or dynamic write voltage drop applied over the memristive element for a total write time; or wherein the charge change is caused by a static or dynamic write current applied through the memristive element for a total write time.

In Example 169, the subject matter of Example 167 or 168 can optionally include that the high resistance state is a memristive state of the memristive element that has a highest electric resistance associated therewith and wherein the low resistance state is a memristive state of the memristive element that has a lowest electric resistance associated therewith, and wherein a plurality of intermediate resistance states of the memristive element are distributed between high resistance state and the low resistance state.

In Example 170, the subject matter of Example 169 can optionally include that the write operation includes: causing the flux change and/or the charge change in the memristive element such that the memristive element is set from the high resistance state into any one of the plurality of intermediate resistance states or into the low resistance state; or causing the flux change and/or the charge change in the memristive element such that the memristive element is set from a one of the plurality of intermediate resistance states into another one of the plurality of intermediate resistance states or into the low resistance state.

In Example 171, the subject matter of any one of Examples 167 to 170 can optionally include that the write operation includes: an initialization process to set the memristive element into an initial state prior to the writing of the memristive state to be written, wherein the initial state is preferably the high resistance state.

In Example 172, the subject matter of any one of Examples 167 to 171 can optionally include that the write circuit is further configured, preferably during the write operation, to determine whether an actual memristive state of the memristive element is the memristive state to be written; wherein preferably the write circuit is configured to end the write operation upon determination that the actual memristive state of the memristive element is the memristive state to be written.

In Example 173, the subject matter of any one of Examples 167 to 172 can optionally include that the write circuit is configured to: carry out one or more measurements to determine a current/voltage characteristic of the memristive element, preferably during the write operation, wherein each measurement of the one or more measurements includes: measure a respective voltage drop over the memristive element or a respective current through the memristive element; fit the current/voltage characteristic by a physical model to determine one or more static state parameter values and/or one or more dynamic state parameters, wherein the physical model is based on static state parameters and/or dynamic state parameters for which the static state parameter values and/or the dynamic state parameters are determined, and determine an actual memristive state of the memristive element based on the determined one or more static state parameter values and/or the determined one or more dynamic state parameter values.

In Example 174, the subject matter of Example 173 can optionally include that the write circuit is configured to continue the write operation until the determined actual memristive state of the memristive element is the memristive state to be written.

Example 175 is a device including: a plurality of memristive elements; an operating circuit (e.g., a read circuit and/or write circuit) configured to read out the plurality of memristive elements, wherein the operating circuit is configured to read out a respective memristive element of the plurality of memristive elements by determining a current/voltage characteristic of the respective memristive element, wherein the operating circuit is configured to determine the current/voltage characteristic of the respective memristive element by causing a read voltage drop sequence over the respective memristive element and determining a corresponding read current sequence through the respective memristive element or by causing a read current sequence through the respective memristive element and determining a corresponding read voltage drop sequence over the respective memristive element; and one or more processors configured to: determine respective one or more dynamic state parameter values for each memristive element of the plurality of memristive elements, wherein the determination of the one or more dynamic state parameter values for a respective memristive element of the plurality of memristive elements includes: fitting the current/voltage characteristic determined for the respective memristive element by a physical model to determine the one or more dynamic state parameter values, wherein the physical model is based on dynamic state parameters for which the dynamic state parameter values are determined; and generate a cryptographic key based on the one or more dynamic state parameter values respectively determined for each of the plurality of memristive elements.

In Example 176, the subject matter of Example 175 can optionally include that each memristive element of the plurality of memristive elements includes a respective memristive state of a plurality of memristive states, wherein the memristive states of the plurality of memristive elements are distributed over the plurality of memristive states.

In Example 177, the subject matter of Example 175 or 176 can optionally include that generating the cryptographic key includes: determining a respective logic state for each memristive element of the plurality of memristive elements, wherein determining a logic state for a respective memristive element includes: classifying the respective memristive element into a group of two or more groups based on the one or more dynamic state parameter values determined for the respective memristive element, wherein each group of the two or more groups is unambiguously assigned to a respective logic state; and generating the cryptographic key based on the respective logic state of each memristive element of the plurality of memristive elements.

In Example 178, the subject matter of any one of Examples 175 to 177 can optionally include that the one or more processors are further configured to generate random numbers based on the cryptographic key.

In Example 179, the device of any one of Examples 175 to 178 can optionally the that programming circuit is configured to write each memristive element of the plurality of memristive elements into a respective memristive state of a plurality of memristive states, wherein the one or more dynamic state parameter values for each memristive element of the plurality of memristive elements are determined based on current/voltage measurements during the writing.

In Example 180, the subject matter of any one of Examples 175 to 179 can optionally include that the device is configured as a physical unclonable function device.

Example 181 is a physical unclonable function device including: a plurality of memristive elements; an operation circuit configured to determine from each of the plurality of memristive elements a corresponding current/voltage characteristic, wherein the operation circuit is configured to determine a respective current/voltage characteristic by writing the corresponding memristive element from a first (e.g., initial) memristive state into a second (e.g., final) memristive state and measuring, during the writing, a current/voltage sequence; and one or more processors configured to: determine respective one or more dynamic state parameter values for each memristive element of the plurality of memristive elements, wherein the determination of the one or more dynamic state parameter values for a respective memristive element of the plurality of memristive elements includes: fitting the current/voltage characteristic determined for the respective memristive element by a physical model to determine the one or more dynamic state parameter values, wherein the physical model is based on dynamic state parameters for which the dynamic state parameter values are determined; and generate a cryptographic key based on the one or more dynamic state parameter values respectively determined for each of the plurality of memristive elements.

In Example 182, the subject matter of Example 181 can optionally include that the operation circuit is configured to determine the respective current/voltage sequence by causing a voltage drop sequence over the respective memristive element and determining a corresponding current sequence through the respective memristive element or by causing a current sequence through the respective memristive element and determining a corresponding voltage drop sequence over the respective memristive element.

Example 183 is a device including: a memristive element; and a write circuit to write the memristive element into a memristive state of a plurality of memristive states (e.g., from an initial memristive state of a plurality of memristive states into a final memristive state of a plurality of memristive states) by a flux and/or charge controlled write operation, wherein the flux and/or charge controlled write operation includes: causing a write voltage drop over the memristive element for a characteristic time to cause a change in the flux and/or charge of the memristive element that is characteristic for the memristive state to be written; or causing a write current through the memristive element for a characteristic time to cause a change in the flux and/or charge of the memristive element that is characteristic for the memristive state to be written.

Example 184 is a device including: a memristive element; and a write circuit to write the memristive element into a memristive state of a plurality of memristive states (e.g., from an initial memristive state of a plurality of memristive states into a final memristive state of a plurality of memristive states) by a flux and/or charge controlled write operation, wherein the flux and/or charge controlled write operation includes: causing a time dependent write voltage drop over the memristive element, wherein the time dependent write voltage has a positive curvature in the voltage/time dependency (to enhance a flux and/or charge introduction into the memristive element); or causing a time dependent write current through the memristive element, wherein the time dependent has a positive curvature in the current/time dependency (to enhance a flux and/or charge introduction into the memristive element).

Example 185 is a device including: a memristive element; and an operating circuit (e.g., a read circuit and/or write circuit) to read the memristive element by a read operation, wherein the read operation includes: causing a time dependent read voltage drop over the memristive element, wherein the time dependent read voltage has a negative curvature in the voltage/time dependency (to reduce a flux and/or charge introduction into the memristive element to avoid a write disturbance during reading the memristive element); or causing a time dependent read current through the memristive element, wherein the time dependent read current has a negative curvature in the current/time dependency (to reduce a flux and/or charge introduction into the memristive element to avoid a write disturbance during reading the memristive element).

It is noted, that various aspects are described for a read and/or write procedure to operate the memristive element, wherein reference is made to a read voltage and/or a write voltage. The write voltage may be representative for a memory state to be written, in particular if the write voltage is applied long enough, e.g., for a saturation time. However, in some aspects, a memristive state to be written (or changed) may be defined by a change in charge or flux introduced in the memristive element. A written memory state may be read by a read voltage that is equal to or less than the write voltage that is used to write the memory state in order to avoid a rewriting. However, in the case that the write voltage is applied for a short time, e.g., for a time lower than the saturation time, the effectively induced change in the flux and/or charge is less than a change in the flux and/or the charge that could be introduced by the same voltage if the voltage would be applied for a longer time, e.g., for the saturation time, see, for example, FIGS. 4B and 4C. Therefore, there may be write procedures to write a memristive state based on a boosted write voltage that that is higher than actually needed to write the memristive element into the memristive state to allow for use of a shorter write time such that the flux and/or charge change introduced in the memristive element caused by the boosted write voltage and the correspondingly reduced write time (lower than the saturation time) is the same as the flux and/or charge change that would be instructed by the actually needed lower write voltage applied for the saturation time. This may allow for a more efficient write procedure.

Furthermore, the write signal may be selected time dependent such that a maximal flux and/or charge change is caused by the write signal (e.g., a rectangular write pulse, e.g., a write pulse with a positive curvature in the voltage/time dependency), whereas a read signal may be selected time dependent such that a minimal flux and/or charge change would be caused by the read signal (e.g., an (for example, exponentially) increasing read pulse, e.g., a read pulse with a negative curvature in the voltage/time dependency).

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes, which come within the meaning and range of equivalency of the claims, are therefore intended to be embraced.

What is claimed is:

1. A device, comprising:

a memristive element; and a write circuit configured to write the memristive element into a memristive state of a plurality of memristive states by a write operation, wherein the memristive state has a characteristic flux and/or a characteristic charge associated therewith, wherein the characteristic flux corresponds to a characteristic voltage drop over the memristive element applied for a saturation time and wherein the characteristic charge corresponds to a characteristic current through the memristive element applied for a saturation time;

wherein the write operation comprises:

causing a write voltage drop over the memristive element that is greater than the characteristic voltage drop associated with the memristive state for a total write time that is shorter than the saturation time; or causing a write current through the memristive element that is higher than the characteristic write current associated with the memristive state for a total write time that is shorter than the saturation time.

2. The device according to claim 1, wherein the characteristic flux is defined by an integral of the characteristic voltage drop over the saturation time and wherein an applied flux defined by the write voltage drop and the write time is substantially equal to the characteristic flux; and/or wherein the characteristic charge is defined by an integral of the characteristic current over the saturation time and wherein an applied charge defined by the write current and the write time is substantially equal to the characteristic charge.

3. The device according to claim 1, wherein the write circuit is further configured, preferably during the write operation, to determine whether an actual memristive state of the memristive element is the memristive state.

4. The device according to claim 3, wherein the write circuit is configured to end the write operation upon determination that the actual memristive state of the memristive element is the memristive state.

5. The device according to claim 3, wherein the write circuit is configured to:

carry out one or more measurements to determine a current/voltage characteristic of the memristive element, preferably during the write operation, wherein each measurement of the one or more measurements comprises: measure a respective voltage drop over the memristive element or a respective current through the memristive element;

fit the current/voltage characteristic by a physical model to determine one or more static state parameter values and/or one or more dynamic state parameters, wherein the physical model is based on static state parameters and/or dynamic state parameters for which the static state parameter values and/or the dynamic state parameters are determined, and determine an actual memristive state of the memristive element based on the determined one or more static state parameter values and/or the determined one or more dynamic state parameter values.

6. A device, comprising:

a memristive element; and a write circuit configured to write the memristive element into a memristive state of a plurality of memristive states by a write operation, wherein the memristive state to be written is defined by a change in flux or change in charge in the memristive element between a high resistance state and a low resistance state;

wherein the write operation comprises:

causing a flux change in the memristive element, the flux change being representative of the memristive state to be written; and/or causing a charge change in the memristive element, the charge change being representative of the memristive state to be written.

7. The device according to claim 6, wherein the flux change is caused by a static or dynamic write voltage drop applied over the memristive element for a total write time; or wherein the charge change is caused by a static or dynamic write current applied through the memristive element for a total write time.

8. The device according to claim 6, wherein the high resistance state is a memristive state of the memristive element that has a highest electric resistance associated therewith and wherein the low resistance state is a memristive state of the memristive element that has a lowest electric resistance associated therewith, and wherein a plurality of intermediate resistance states of the memristive element are distributed between high resistance state and the low resistance state.

9. The device according to claim 8, wherein the write operation comprises:

causing the flux change and/or the charge change in the memristive element such that the memristive element is set from the high resistance state into any one of the plurality of intermediate resistance states or into the low resistance state; or causing the flux change and/or the charge change in the memristive element such that the memristive element is set from a one of the plurality of intermediate resistance states into another one of the plurality of intermediate resistance states or into the low resistance state.

10. The device according to claim 6, wherein the write operation comprises:

an initialization process to set the memristive element into an initial state prior to the writing of the memristive state to be written, wherein the initial state is preferably the high resistance state.

11. The device according to claim 6, wherein the write circuit is configured to:

carry out one or more measurements to determine a current/voltage characteristic of the memristive element, preferably during the write operation, wherein each measurement of the one or more measurements comprises: measure a respective voltage drop over the memristive element or a respective current through the memristive element;

fit the current/voltage characteristic by a physical model to determine one or more static state parameter values and/or one or more dynamic state parameters, wherein the physical model is based on static state parameters and/or dynamic state parameters for which the static state parameter values and/or the dynamic state parameters are determined, and determine an actual memristive state of the memristive element based on the determined one or more static state parameter values and/or the determined one or more dynamic state parameter values.

12. The device according to claim 11, wherein the write circuit is configured to continue the write operation until the determined actual memristive state of the memristive element is the memristive state to be written.

13. A device, comprising:

a plurality of memristive elements;

an operating circuit configured to read out the plurality of memristive elements, wherein the operating circuit is configured to read out a respective memristive element of the plurality of memristive elements by determining a current/voltage characteristic of the respective memristive element, wherein the operating circuit is configured to determine the current/voltage characteristic of the respective memristive element by causing a read voltage drop sequence over the respective memristive element and determining a corresponding read current sequence through the respective memristive element or by causing a read current sequence through the respective memristive element and determining a corresponding read voltage drop sequence over the respective memristive element; and one or more processors configured to:

determine respective one or more dynamic state parameter values for each memristive element of the plurality of memristive elements, wherein the determination of the one or more dynamic state parameter values for a respective memristive element of the plurality of memristive elements comprises: fitting the current/voltage characteristic determined for the respective memristive element by a physical model to determine the one or more dynamic state parameter values, wherein the physical model is based on dynamic state parameters for which the dynamic state parameter values are determined; and generate a cryptographic key based on the one or more dynamic state parameter values respectively determined for each of the plurality of memristive elements.

14. The device according to claim 13, wherein generating the cryptographic key comprises:

determining a respective logic state for each memristive element of the plurality of memristive elements, wherein determining a logic state for a respective memristive element comprises: classifying the respective memristive element into a group of two or more groups based on the one or more dynamic state parameter values determined for the respective memristive element, wherein each group of the two or more groups is unambiguously assigned to a respective logic state; and generating the cryptographic key based on the respective logic state of each memristive element of the plurality of memristive elements.

15. The device according to claim 13, wherein the one or more processors are further configured to generate random numbers based on the cryptographic key; and/or wherein the device is configured as a physical unclonable function device.

16. The device according to claim 13, wherein the operating circuit is configured to write each memristive element of the plurality of memristive elements into a respective memristive state of a plurality of memristive states, wherein the one or more dynamic state parameter values for each memristive element of the plurality of memristive elements are determined based on current/voltage measurements during the writing.

17. A physical unclonable function device, comprising:

a plurality of memristive elements;

an operation circuit configured to determine from each of the plurality of memristive elements a corresponding current/voltage characteristic, wherein the operation circuit is configured to determine a respective current/voltage characteristic by writing the corresponding memristive element from a first memristive state into a second memristive state and measuring, during the writing, a current/voltage sequence; and one or more processors configured to:

determine respective one or more dynamic state parameter values (812) for each memristive element of the plurality of memristive elements, wherein the determination of the one or more dynamic state parameter values (812) for a respective memristive element of the plurality of memristive elements comprises: fitting the current/voltage characteristic determined for the respective memristive element by a physical model to determine the one or more dynamic state parameter values (812), wherein the physical model is based on dynamic state parameters for which the dynamic state parameter values are determined; and generate a cryptographic key based on the one or more dynamic state parameter values (812) respectively determined for each of the plurality of memristive elements.

18. The physical unclonable function device according to claim 17, wherein the operation circuit is configured to determine the respective current/voltage sequence by causing a voltage drop sequence over the respective memristive element and determining a corresponding current sequence through the respective memristive element or by causing a current sequence through the respective memristive element and determining a corresponding voltage drop sequence over the respective memristive element.

* * * * *